United States Patent
Yonetani et al.

(10) Patent No.: US 11,941,868 B2
(45) Date of Patent: Mar. 26, 2024

(54) INFERENCE APPARATUS, INFERENCE METHOD, AND COMPUTER-READABLE STORAGE MEDIUM STORING AN INFERENCE PROGRAM

(71) Applicant: OMRON Corporation, Kyoto (JP)

(72) Inventors: Ryo Yonetani, Tokyo (JP); Masaki Suwa, Tokyo (JP); Mohammadamin Barekatain, Tokyo (JP); Yoshihisa Ijiri, Tokyo (JP); Hiroyuki Miyaura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 358 days.

(21) Appl. No.: 17/620,769

(22) PCT Filed: Jun. 25, 2020

(86) PCT No.: PCT/JP2020/024998
§ 371 (c)(1),
(2) Date: Dec. 20, 2021

(87) PCT Pub. No.: WO2021/014878
PCT Pub. Date: Jan. 28, 2021

(65) Prior Publication Data
US 2022/0358749 A1    Nov. 10, 2022

(30) Foreign Application Priority Data
Jul. 25, 2019   (JP) .................... 2019-137318

(51) Int. Cl.
*G06K 9/00* (2022.01)
*G06T 7/00* (2017.01)
(Continued)

(52) U.S. Cl.
CPC .......... *G06V 10/774* (2022.01); *G06T 7/0002* (2013.01); *G06V 10/82* (2022.01); *G06V 20/56* (2022.01)

(58) Field of Classification Search
CPC ...................................................... G06N 20/00
See application file for complete search history.

(56) References Cited

U.S. PATENT DOCUMENTS

| | | | |
|---|---|---|---|
| 10,846,067 B2 * | 11/2020 | Imazawa | G06N 7/01 |
| 2010/0211533 A1 * | 8/2010 | Yang | G06N 20/00 706/12 |

(Continued)

FOREIGN PATENT DOCUMENTS

| | | |
|---|---|---|
| JP | 2011-59924 A | 3/2011 |
| JP | 2012-38794 A | 2/2012 |

(Continued)

OTHER PUBLICATIONS

Fachantidis et al, "Transferring task models in Reinforcement Learning agents", Neurocomputing, Elsevier, Nov. 2, 2012, pp. 23-32, vol. 107, Amsterdam, Netherlands.

(Continued)

*Primary Examiner* — Hadi Akhavannik
(74) *Attorney, Agent, or Firm* — METROLEX IP LAW GROUP, PLLC

(57) ABSTRACT

An inference apparatus provides target data to multiple inference models to cause the inference models each derived from local learning data obtained in a different environment to perform predetermined inference to obtain an inference result from each of the inference models. The inference apparatus determines the value of each combining parameter using environment data, weights the inference result from each of the inference models using the determined value of each combining parameter, and combines the weighted (Continued)

inference result from each inference model together to generate an inference result in a target environment.

20 Claims, 25 Drawing Sheets

(51) Int. Cl.
*G06V 10/774* (2022.01)
*G06V 10/82* (2022.01)
*G06V 20/56* (2022.01)

(56) References Cited

U.S. PATENT DOCUMENTS

| | | |
|---|---|---|
| 2011/0060709 A1 | 3/2011 | Ide et al. |
| 2015/0170442 A1* | 6/2015 | Senalp ................ G07C 5/0808 701/29.1 |
| 2018/0032892 A1* | 2/2018 | Mould .................... G16H 50/50 |
| 2018/0089589 A1 | 3/2018 | Ooba |
| 2018/0114125 A1 | 4/2018 | Ichiboshi et al. |
| 2018/0314975 A1 | 11/2018 | Zang et al. |
| 2019/0126921 A1 | 5/2019 | Gwin et al. |
| 2019/0156247 A1 | 5/2019 | Faulhaber, Jr. et al. |
| 2019/0171962 A1* | 6/2019 | Mould .................... G16H 20/10 |
| 2019/0220676 A1 | 7/2019 | Miyatani et al. |
| 2019/0303698 A1* | 10/2019 | Hwangbo ............ G06V 30/274 |
| 2020/0069210 A1* | 3/2020 | Berenzweig ......... A61B 90/361 |

FOREIGN PATENT DOCUMENTS

| | | |
|---|---|---|
| JP | 2012-216158 A | 11/2012 |
| JP | 2017-173874 A | 9/2017 |
| JP | 2018-51664 A | 4/2018 |
| JP | 2018-72876 A | 5/2018 |
| JP | 2019-67238 A | 4/2019 |
| JP | 2019-87096 A | 6/2019 |
| JP | 2019-95968 A | 6/2019 |
| JP | 2019-125113 A | 7/2019 |

OTHER PUBLICATIONS

Extended European search report (EESR) dated Nov. 14, 2022 in a counterpart European patent application.
Naoki Kotani et al., Directivity Design of Ultrasonic Array Sensor Based on Reinforcement Learning, Transactions of the Institute of Systems, Control and Information Engineers. 2010, pp. 291-293, vol. 23, No. 12; Concise explanation of relevance provided in the specification.
English translation of the International Search Report ("ISR") of PCT/JP2020/024998 dated Sep. 24, 2020.
Written Opinion("WO") of PCT/JP2020/024998 dated Sep. 24, 2020.

* cited by examiner

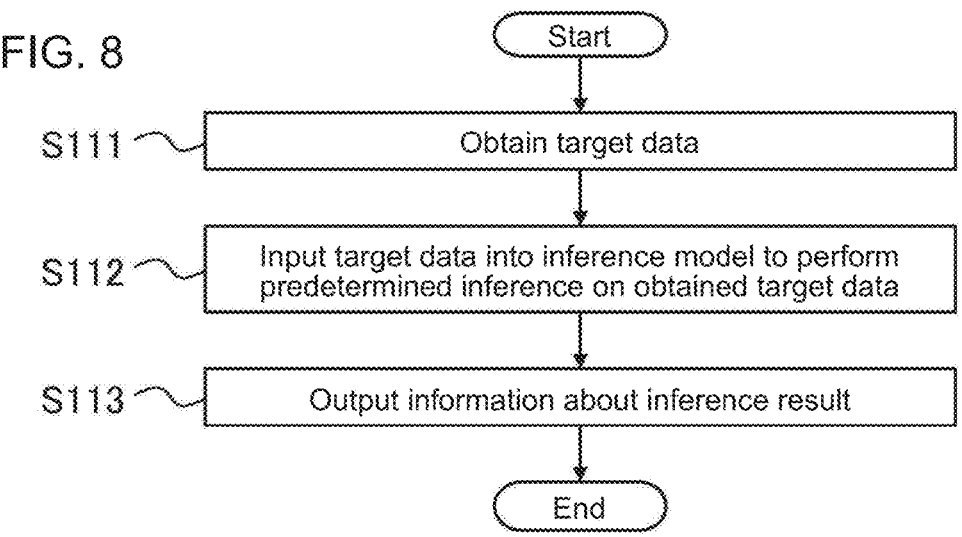
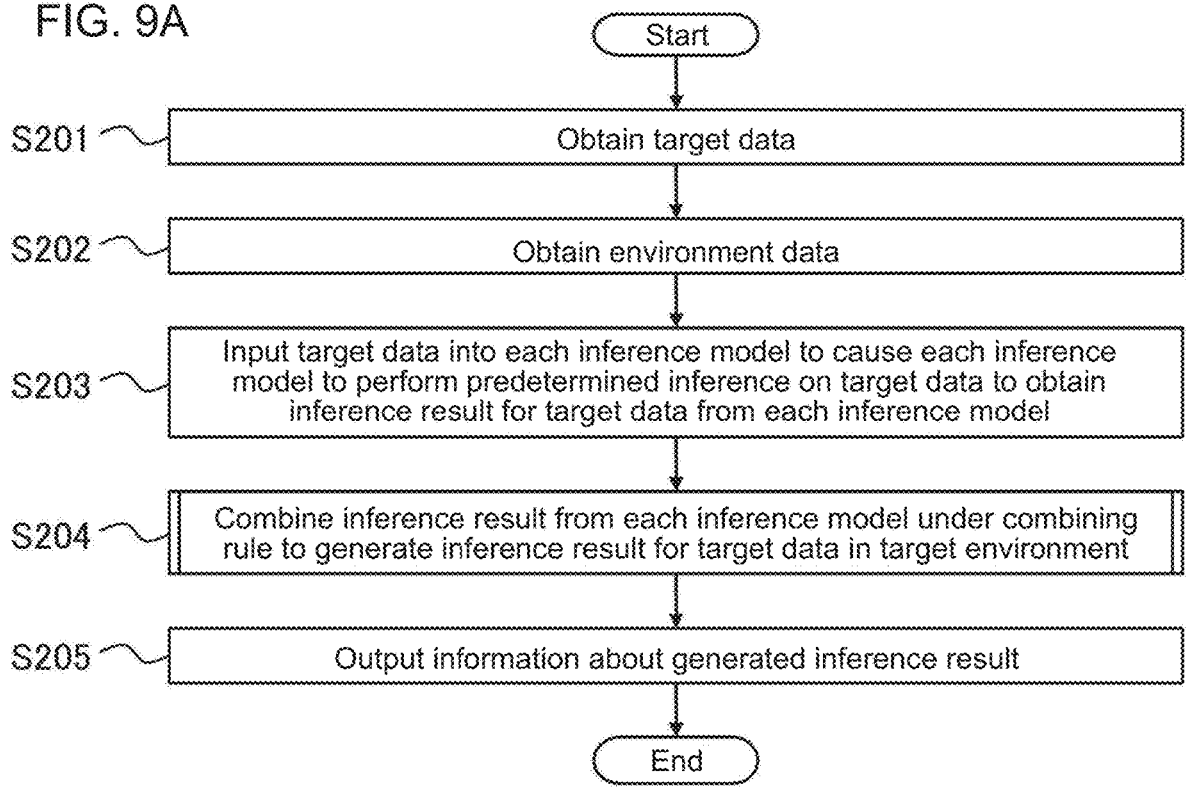

INFERENCE APPARATUS, INFERENCE METHOD, AND COMPUTER-READABLE STORAGE MEDIUM STORING AN INFERENCE PROGRAM

FIELD

The present disclosure relates to an inference apparatus, an inference method, and non-transitory computer-readable storage medium storing an inference program.

BACKGROUND

Sensors such as cameras (imaging devices), microphones, temperature sensors, and illumination sensors have been used for observing objects in various situations. For example, a manufacturing line for manufacturing products may include an imaging device that captures an image of a product being manufactured. The obtained image data is used in product inspection to determine whether the product is acceptable or to be rejected.

An optimum method for observing an object using sensors may differ at different observation sites. For inspecting the state of a product with an imaging device, for example, the shutter speed of the imaging device is to be higher for inspection at a bright site and is to be lower for inspection at a dark site. An optimum method for observing an object using sensors at the same site may also differ at different times of a day. For example, an object can be at different levels of brightness at different times of a day. For example, an object can be at different levels of brightness at the same time of a day but in different seasons of a year. Thus, an optimum method for observing an object with sensors can differ in different environments for observation.

For appropriate observation, an object is to be observed with sensors systematically across different environments. An example approach to such systematic observation with sensors can be to manually standardize methods for observation with sensors. However, the observation methods can be difficult to standardize in varying observation environments. Further, standardizing the observation methods can be restricted by human subjectivity in installing sensors. In other words, standardizing the observation methods in different environments can be restricted by human factors.

The methods for observation with sensors are to be optimized systematically in different environments without involving manual standardization. For example, Patent Literature 1 describes a technique for optimizing the conditions for detecting alignment marks on a substrate. In detail, multiple marks on a substrate are detected using a mark detector under multiple illumination conditions and multiple imaging conditions. A detection signal from the mark detector is then analyzed using a predetermined signal processing algorithm to generate a determination quantity associated with the waveform of the detection signal. The obtained determination quantity is used to evaluate the reproducibility of the detected multiple marks. The illumination conditions and the imaging conditions are then optimized based on the evaluation results. The technique described in Patent Literature 1 can optimize the illumination conditions and the imaging conditions to fit the detection results of the marks from the predetermined signal processing algorithm in different environments.

Other techniques using machine learning have been developed to optimize methods for observation with sensors. For example, Patent Literature 2 describes a classification system that classifies an object into a class based on observation data obtained by repeatedly observing actions for the object through reinforcement learning based on rewards defined in accordance with a decrease in the entropy derived based on the classification probability of the object. The classification system with the technique described in Patent Literature 2 uses reinforcement learning to learn observed actions to fit the identified class of the object in different environments. Non-Patent Literature 1 describes, for example, another technique for optimizing the directivity of ultrasonic array sensors using reinforcement learning.

CITATION LIST

Patent Literature

Patent Literature 1: Japanese Unexamined Patent Application Publication No. 2012-038794
Patent Literature 2: Japanese Unexamined Patent Application Publication No. 2012-216158
Patent Literature 3: Japanese Unexamined Patent Application Publication No. 2011-059924
Patent Literature 4: Japanese Unexamined Patent Application Publication No. 2017-173874
Patent Literature 5: Japanese Unexamined Patent Application Publication No. 2018-051664
Patent Literature 6: Japanese Unexamined Patent Application Publication No. 2019-067238
Patent Literature 7: Japanese Unexamined Patent Application Publication No. 2019-087096

Non-Patent Literature

Non-Patent Literature 1: Naoki Kotani; Kenji Taniguchi, "Directivity Design of Ultrasonic Array Sensor Based on Reinforcement Learning," Transactions of the Institute of Systems, Control and Information Engineers. 2010, Vol. 23, No. 12, pp 291-293

SUMMARY

The inventors have noticed issues associated with the above known optimization techniques.

The known techniques optimize observation methods with sensors for each individual environment. For optimizing observation methods with sensors through machine learning such as supervised learning, unsupervised learning, or reinforcement learning, the training data is collected in each environment, and the trained machine learning model is built through machine learning using the collected training data. The trained machine learning model can appropriately perform predetermined inference (inferring an optimum observation method with sensors in this example) when used in the same environment as in the environment in which the training data has been collected.

However, in an environment different from the environment in which the training data has been collected, the trained machine learning model may perform the predetermined inference inappropriately. Optimizing the methods of observation with sensors in a new target environment thus basically uses training data collected in the new target environment in building a new trained machine learning model through machine learning. Optimizing the methods of observation with sensors in a new environment with the known technique is thus costly.

This issue is not limited to optimizing methods of observation with sensors. A similar issue occurs in any situations involving predetermined inference performed using a trained machine learning model. Situations involving predetermined inference performed using a trained machine learning model may be, in addition to the above situation in which an optimum observation method with a sensor is estimated, situations in which a path to be traveled by a movable object is estimated, a conversation strategy to fit a user is estimated, and a motion command for a robot device to fit a task is estimated.

Cited Literature 3 describes a specific example using a hidden Markov model trained to be capable of predicting a path traveled by a user. Cited Literature 4 describes use of deep reinforcement learning in training a learner to be capable of determining a response that directs subsequent verbal remarks in a meeting toward achieving the aim of the meeting. Cited Literature 5 describes a technique for training a learning model through reinforcement learning to be capable of determining, as a robot device, the operating conditions of an industrial robot with a hand, such as the operating conditions associated with the position and orientation of an object, the cycle time, torque, and damping. Cited Literature 6 describes a technique for training a learning model through reinforcement learning to be capable of determining the details of control over control target equipment as a robot device. Cited Literature 7 describes a technique for training a learning model through reinforcement learning to be capable of determining the action of an autonomous vehicle as a robot device.

In such situations as well, the trained machine learning model may perform predetermined inference inappropriately in an environment different from the environment in which the training data has been collected. Building a trained machine learning model that appropriately performs predetermined inference in a new environment can thus be costly.

This issue is not limited to building a trained machine learning model through machine learning. A similar issue occurs in any situations involving, for example, deriving an inference model from training data designed to perform predetermined inference with a technique other than machine learning, such as using manually created rules. For example, an inference model may be generated using manually created rules. In this situation as well, the inference model used in an environment different from the environment in which the training data has been collected may receive an input unexpected at the design stage. The inference model may perform predetermined inference inappropriately. Building an inference model that appropriately performs predetermined inference in a new environment can thus be costly.

In response to these issues, one or more embodiments are directed to a technique for reducing the cost of building an inference model for appropriately performing predetermined inference in a new environment.

The inferential apparatus, method, and program according to one or more embodiments have the structure described below.

An inference apparatus according to one or more embodiments may include a first data obtainer, a second data obtainer, a result obtainer, a combiner, and an output unit. The first data obtainer obtains predetermined target data usable in predetermined inference. The second data obtainer obtains environment data about a target environment in which the predetermined inference is to be performed. The result obtainer provides the target data to a plurality of inference models and obtains an inference result for the target data from each of the plurality of inference models. Each of the plurality of inference models is derived from local learning data obtained in a different environment. Each of the plurality of inference models performs the predetermined inference using the target data. The combiner combines the inference result from each of the plurality of inference models under a combining rule to generate an inference result for the target data in the target environment. The combining rule includes a plurality of combining parameters. Each of the plurality of combining parameters defines a priority on an inference result from a corresponding inference model of the plurality of inference models in the target environment. Combining the inference result from each of the plurality of inference models under the combining rule includes determining a value of each of the plurality of combining parameters using the obtained environment data, weighting the inference result from each of the plurality of inference models using the determined value of each of the plurality of combining parameters, and combining the weighted inference result from each of the plurality of inference models. The output unit outputs information about the inference result generated from the combining.

The inference apparatus with the above structure performs predetermined inference in a target environment using multiple inference models each derived from local learning data obtained in a different environment. More specifically, the inference apparatus with the above structure provides target data usable in predetermined inference to each inference model and causes each inference model to perform predetermined inference using the target data to obtain an inference result for the target data from each of the inference models. The inference apparatus with the above structure then combines the inference result from each of the inference models together under the combining rule to generate an inference result for the target data in the target environment. In this manner, the inference apparatus with the above structure uses the inference models that have already been built, rather than building a new inference model, to perform predetermined inference in the target environment.

The combining rule includes multiple combining parameters each defining the priority on the inference result from the corresponding inference model in the target environment. Typically, an inference model derived from local learning data obtained in a training environment closer to the target environment is expected to have higher accuracy of inference for the target data obtained in the target environment. An inference model derived from local learning data obtained in a training environment less close to the target environment is expected to have lower accuracy of inference for the target data obtained in the target environment. The multiple inference models may include an inference model to be used with a higher priority in the target environment.

The inference apparatus with the above structure thus determines the value of each combining parameter under the combining rule in accordance with environment data about the target environment in which predetermined inference is to be performed. For example, the value of each combining parameter may be determined to have a higher priority on at least one of an inference model in the training environment closer to the target environment or an inference model with a higher priority. The inference apparatus with the above structure then weights the inference result from each inference model using the determined value of each combining parameter and combines the inference result from each weighted inference model together. This structure adjusts the priority on the inference from each inference model in the target environment to customize the knowledge (inference models) obtained in various environments to fit the new environment. The predetermined inference can thus be performed appropriately in the target environment.

The above identified structure may allow the predetermined inference to be performed appropriately in the target environment using multiple inference models derived from local learning data obtained in different environments. More specifically, the inference models that have already been built may be used to build a new inference model to appropriately perform the predetermined inference in the target environment. Using inference models that have already been built eliminates the burden of collecting new training data in the target environment and deriving a new inference model from the collected new training data and reduces the cost of building an inference model for appropriately performing the predetermined inference in a new environment.

Performing predetermined inference includes performing an estimation process based on unknown target data. The details of the inference may be determined as appropriate in each embodiment. The inference may include regression or discrimination. The predetermined inference may include estimating an optimum observation method with a sensor, predicting a path to be traveled by a movable object, estimating a conversation strategy to fit a user, and estimating a motion command for a robot device to fit a task. An inference result may be represented in a manner determined as appropriate for the details of the inference. The inference result may be represented by using, for example, a set of continuous values resulting from regression or the probability of classification into a class. The inference result may be represented by using, for example, one or more numerical values or one or more classes.

The target data may be of any type that can be used in the predetermined inference and may be selected as appropriate for the details of the inference. The target data may be, for example, image data, sound data, numerical data, text data, and other observation data obtained with a sensor. The target data is replaceable by input data.

The environment data may be of any type that is associated with a target environment in which the predetermined inference is to be performed and may be selected as appropriate in each embodiment. The environment in which the predetermined inference is performed may be, for example, an environment in which the target data is obtained. The attributes of the environment in which the target data is obtained may include any factor possibly relevant to inference, such as the attributes of the object or the user directly or indirectly relevant to the predetermined inference. Similarly to the target data, the environment data may be, for example, image data, sound data, numerical data, text data, and other observation data obtained with a sensor.

The target data and the environment data may be obtained with any method selected as appropriate in each embodiment. The target data and the environment data may be derived from the same observation data obtained with the same sensor or may be derived from different sets of observation data obtained with different sensors. The target data and the environment data may at least partially include common data.

Each inference model may have any structure that can perform the predetermined inference and may be determined as appropriate in each embodiment. Each inference model may be expressed using, for example, a data table, a functional expression, and a rule. The format and the details of an output (inference result) may not be identical for each inference model used for inference. At least either the format or the details of an output may differ for each inference model by a degree that allows the inference result from each inference model to be combined together. For example, multiple inference models for estimating motion commands for robot devices with different numbers of joints may be used to estimate motion commands for the robot devices in the target environment. The inference result from each inference model may be combined together with any method selected as appropriate in each embodiment. For example, combining the inference result from each inference model together may include averaging the inference results or selecting one of the inference results based on majority rules.

The local learning data being obtained in a different environment includes, for example, local learning data being obtained in an environment that differs at least partially in a factor that can affect the predetermined inference, such as time, a location, an object, or a user. For example, the local learning data obtained in a different environment may be local learning data obtained at a different location. For example, the local learning data obtained in a different environment may be local learning data obtained at a different time at the same location. The local learning data used to derive each inference model may include at least partially identical data.

Each inference model may be derived with any method selected as appropriate in each embodiment. Each inference model may be derived either manually or through machine learning. Examples of machine learning include supervised learning, unsupervised learning, and reinforcement learning. The local learning data may be in any format or of any type and may be selected as appropriate for the method for deriving each inference model or the details of the predetermined inference.

In the inference apparatus according to the above aspect, each of the plurality of inference models may include a trained machine learning model trained to perform the predetermined inference through machine learning using the local learning data. This structure reduces the cost of building a trained machine learning model for appropriately performing predetermined inference in a new environment.

The inference apparatus according to the above aspect may further include a training unit that trains, through machine learning, a computational model for calculating the value of each of the plurality of combining parameters using the environment data. The machine learning includes training the computational model to calculate the value of each of the plurality of combining parameters to fit the predetermined inference in the target environment. The combining rule may further include a trained computational model built through the machine learning. Determining the value of each of the combining parameters using the environment data may include providing the environment data to the trained computational model and causing the trained computational model to perform a computational operation to receive an output from the trained computational model as the value of each of the plurality of combining parameters. This structure uses the combining rule including the trained computational model built through machine learning to more appropriately perform the predetermined inference in the target environment.

The number of parameters for each inference model is determined based on the number of dimensions of the target data and the representation format of an inference result. In contrast, the number of parameters for the computational model is determined based on the number of dimensions of the environment data and the number of inference models used for the predetermined inference performed in the target environment. For at least either the target data or the details of the inference being more complex, the inference models use more parameters but the computational model uses fewer parameters.

For example, an optimum observation method with a camera is to be estimated using image data obtained with the camera in a target environment defined based on brightness. In this case, the number of parameters for each inference model is determined based on the number of pixels in the image data and the number of possible states of the camera. The number of parameters can be a number on the order of greater than 1,000. In contrast, the number of parameters for the computational model is determined based on the number of dimensions of the brightness and the number of inference models used. For tens of inference models used to estimate the optimum observation method, the number of parameters is a number on the order of tens to hundreds at most.

Typically, the number of parameters for a computational model is less than the number of parameters for an inference model. The cost of machine learning depends on the number of parameters used. Thus, the cost of building a trained computational model through machine learning can be lower than the cost of building a new inference model as a trained machine learning model. This structure also reduces the cost of building a trained machine learning model for appropriately performing predetermined inference in a new environment.

The computational model is trained through machine learning that may be performed by an information processor (computer) other than the inference apparatus. The computational model includes multiple computational parameters for calculating the value of each combining parameter. The computational model is trained through machine learning that may include adjusting the value of each computational parameter to yield an intended output to fit the target environment. More specifically, training the computational model to cause the calculated value of each combining parameter to fit the predetermined inference in the target environment may include adjusting the value of each computational parameter for the computational model to calculate the value of each combining parameter using the environment data for causing the result from combining the inference result from each inference model using the calculated value of each combining parameter to fit the inference result in the target environment.

In the inference apparatus according to the above aspect, the machine learning to train the computational model may include reinforcement learning using a reward defined in accordance with appropriateness of the inference result generated from the combining. Training the computational model may include repeatedly correcting a value of a computational parameter included in the computational model to have a higher reward. Correcting the value of each computational parameter may be repeated until a predetermined condition is satisfied, or for example, until the correction of the value of each computational parameter is less than or equal to a threshold. This structure uses the combining rule including the trained computational model built through reinforcement learning to more appropriately perform the predetermined inference in the target environment.

The appropriateness indicates the degree by which an inference result generated from the combining is appropriate. For estimating an optimum observation method with a sensor, for example, an estimation result of the observation method may be determined to be more appropriate for a higher likelihood of obtaining observation data (e.g., image data to fit visual inspection of a product) satisfying a predetermined condition with the sensor after the observation state with the sensor is changed with the observation method resulting from the combining. For predicting a path to be traveled by a movable object, for example, a prediction result of the path may be determined to be more appropriate for a more accurate predicted path generated from the combining. For estimating a conversation strategy to fit a user, for example, an estimation result of the conversation strategy may be determined to be more appropriate for a conversation strategy obtained from the combining being more appropriate for the user. For estimating a motion command for a robot device to fit a task, for example, an estimation result of the motion strategy may be determined to be more appropriate for the motion command obtained from the combining being more appropriate for the task. The appropriateness may be calculated automatically by a computer based on a predetermined index, or may be specified by an operator input. More specifically, the appropriateness may be evaluated by a computer or by an operator.

In the inference apparatus according to the above aspect, determining the value of each of the plurality of combining parameters using the environment data may include obtaining learning-environment data about an environment in which the local learning data used to derive each of the plurality of inference models is obtained, calculating a degree of fitting between the obtained learning-environment data and the environment data, and determining the value of each of the plurality of combining parameters for the corresponding inference model of the plurality of inference models using the calculated degree of fitting. This structure can determine the value of each combining parameter to have a higher priority on an inference result from an inference model in the training environment closer to the target environment based on the result of comparison between the environment data and the learning-environment data (or the degree of fitting). This structure reduces, with such a simple process, the cost of building an inference model for appropriately performing predetermined inference in a new environment.

The inference apparatus according to the above aspect may further include a parameter setter that receives a specified value of at least one combining parameter of the plurality of combining parameters and sets a value of the at least one combining parameter to the specified value. Thus, weighting the inference result from each of the plurality of inference models may include weighting an inference result from an inference model corresponding to the at least one combining parameter using the set value. This structure determines the value of at least one of the combining parameters for the inference result from each inference model as specified by an operator. The predetermined inference performed in the target environment can thus reflect the operator's intention (e.g., an intention for placing a higher priority on an inference result from a specific inference model).

The inference apparatus according to any one of the above aspects may be used in any situation in which any inference is performed using an inference model. A situation in which any inference is performed may be, for example, a situation in which an optimum observation method with a sensor is estimated, a situation in which a path to be traveled by a movable object is predicted, a situation in which a conversation strategy to fit a user is estimated, or a situation in which a motion command for a robot device to fit a task is estimated. The situation in which any inference is performed may include a situation in which a characteristic in observation data obtained with a sensor is estimated, or for example, an attribute of a subject included in image data obtained with a camera is estimated. The situation in which any inference is performed may include a situation in which a characteristic associated with an observation condition for a sensor is estimated using observation data obtained with the sensor. The characteristic associated with the observation condition may include any factor possibly relevant to the observation condition, or for example, the distance between the sensor and an observation target, or ambient brightness around the observation target.

In the inference apparatus according to the above aspect, for example, the predetermined inference may include estimating a characteristic in observation data obtained with a sensor from the observation data. The target data may be observation data obtained with the sensor. The environment data may be data about an environment in which the observation data is obtained. Estimating the characteristic in observation data obtained with the sensor may include estimating an attribute of a subject included in image data obtained with a camera. This structure reduces, in a situation in which a characteristic in observation data obtained with a sensor is estimated, the cost of building an inference model for appropriately performing predetermined inference in a new environment. The inference apparatus may be replaced by, for example, an inspection apparatus, a prediction apparatus, a conversation apparatus, or a control apparatus as appropriate for the details of inference to be performed.

For example, in the inference apparatus according to the above aspect, the predetermined inference may include estimating a changing method of changing from a current observation state in which an attribute of a target is observable with a sensor to an appropriate observation state in which observation data satisfying a predetermined condition is to be obtained with a sensor. The target data may include data about a current observation state with a target sensor. The environment data may include data about a target observation environment in which the target sensor observes the attribute of the target. This structure reduces, in a situation in which an attribute of a target is observed with a sensor, the cost of building an inference model for appropriately estimating an optimum observation method with the sensor in a new environment.

Obtaining the observation data satisfying the predetermined condition corresponds to the observation state with the sensor being appropriate. The predetermined condition may be defined as appropriate for the purpose of observation with the sensor. For example, for obtaining observation data to detect a defect of a product, the predetermined condition may be defined based on the observation data obtained with the sensor in accordance with the performance of other inference associated with the observation data obtained with the sensor, including whether the defect detection can be performed or whether the accuracy of the defect detection satisfies a criterion. The defect detection of a product is replaceable by quality evaluation of a subject (e.g., evaluation of the growth state of a crop). Estimating the changing method of changing to the appropriate observation state may include directly estimating the changing method, or indirectly estimating the changing method by first estimating the appropriate observation state and then calculating the difference between the estimated appropriate observation state and the current observation state to derive the appropriate observation state.

In the inference apparatus according to the above aspect, the environment data may be obtainable with a sensor different from the target sensor. The sensor different from the target sensor may observe the target observation environment. This structure can easily obtain environment data and thus simplifies the series of processing steps for combining the inference result from each inference model together. This structure can also appropriately obtain observation data and thus improves the accuracy of the inference result generated from the combining.

The inference apparatus according to the above aspect may be connected to an intervening device that changes an observation state with the target sensor by intervening in the observation state. The information about each inference result may include command information for causing the intervening device to perform an operation to change the observation state with the target sensor with the estimated changing method. The output unit may transmit the command information to the intervening device to cause the intervening device to perform the operation to change the observation state with the target sensor with the estimated changing method. This structure can automatically optimize the observation state with the sensor.

The intervening device may be of any type that can intervene in the observation state with the sensor and may be selected as appropriate in each embodiment. Examples of the intervening device include a pan-tilt table and an illuminator. The pan-tilt table may be used to change at least one of the position or the orientation of the sensor. The illuminator may be used to change the brightness around the target for observation with the sensor. The intervening device may include a control apparatus that controls an operation of the intervening device. In this case, the inference apparatus may transmit command information to the control apparatus to cause the control apparatus to control the operation for changing the observation state with the target sensor.

In the inference apparatus according to the above aspect, the information about the inference result may include prompt information for prompting a user to change the observation state with the target sensor with the changing method. The output unit may output the prompt information to an output device and present, to the user, the changing method for optimizing the observation state with the sensor. Outputting in the above described manner may allow a user with no expertise to optimize the observation state with the sensor in the target environment.

In the inference apparatus according to the above aspect, the sensor may include a camera. The observation data may include image data. The predetermined condition may include a condition under which the target is included in the image data to allow an inspection of the attribute of the target. This structure reduces, in a situation in which an attribute of a target is inspected based on image data obtained with a camera, the cost of building an inference model for appropriately estimating an optimum observation method with a camera in a new environment.

In the inference apparatus according to the above aspect, for example, the predetermined inference may include predicting a path to be traveled by a movable object based on a state of the movable object. The target data may include data about a state of a target movable object observable with a sensor. The environment data may include data about a target observation environment in which travel of the target movable object is observable with the sensor. This structure reduces, in a situation in which the travel of a movable object is monitored, the cost of building an inference model for appropriately predicting a path to be traveled by the movable object in a new environment. Examples of the movable object include an organism (e.g., a human) and a machine (e.g., a vehicle).

In the inference apparatus according to the above aspect, for example, the predetermined inference may include estimating, from a conversational action of a user, a conversation strategy to fit the user. The target data may include data about a conversational action of a target user. The environment data may include data about a conversational environment in which the target user performs the conversational action. This structure reduces, in a situation in which a conversation for a user is generated, the cost of building an inference model for appropriately estimating a conversation strategy to fit the user in a new environment. The conversation strategy may be defined in any manner associated with determination of the conversational action for the user and may be selected as appropriate in each embodiment. Examples of the conversation strategy include defining the details of a conversation, the timing of utterance, the frequency of conversations, and the tone of voice.

In the inference apparatus according to the above aspect, for example, the predetermined inference may include estimating a motion command for a robot device to fit a task based on a state of the robot device. The target data may include data about a state of a target robot device. The environment data may include data about a target task environment in which the target robot device performs the task. This structure reduces, in a situation in which an operation of a robot device is controlled, the cost of building an inference model for appropriately estimating a motion command for the robot device to fit a task in a new environment.

The robot device and the task may be selected as appropriate in each embodiment. Examples of the robot device include an industrial robot, equipment, and an autonomous driving vehicle. Examples of the equipment include an air conditioning system (air conditioner) and an illumination system. For the robot device being an industrial robot, the task may be to place a workpiece at a target position. For the robot device being a piece of equipment such as an air conditioning system, the task may be determined in accordance with the type of the equipment. The task may be, for example, to maintain a target at a predetermined temperature. For the robot device being an autonomous driving vehicle, the task may be, for example, to travel from a current location to a destination through autonomous driving.

A computational model generation apparatus according to an aspect of embodiments may include a data obtainer, a training unit, and a storing unit. The data obtainer obtains training data usable to train, through machine learning, a computational model usable in calculating values of a plurality of combining parameters in a target environment. Each of the plurality of combining parameters defines a priority on an inference result from a corresponding inference model of a plurality of inference models each derived from local learning data obtained in a different environment to perform predetermined inference. The training unit trains the computational model through the machine learning using the obtained training data. The machine learning includes training the computational model to cause a value of each of the calculated combining parameters to fit the predetermined inference in the target environment. The storing unit stores, into a predetermined storage area, a result from training the computational model through the machine learning. The computational model generation apparatus is replaceable by a model generation apparatus or a learner apparatus. The method for training each model (e.g., each machine learning model) corresponds to a method for generating a trained model (e.g., a trained machine learning model).

Another implementation of the inference apparatus according to the above aspects may be an information processing method, a program, or a storage medium storing the program readable by a computer for implementing the components of the inference apparatus or the model generation apparatus. The computer-readable storage medium includes a medium storing a program or other information in an electrical, magnetic, optical, mechanical, or chemical manner. An inference system according to one or more embodiments may include the inference apparatus according to any of the above aspects and at least one inference model generation apparatus that derives an inference model from local learning data. The inference model generation apparatus is replaceable by a model generation apparatus or a local learner apparatus. The inference system may further include the above computational model generation apparatus.

For example, an inference method according to one or more embodiments may be implementable by a computer. The method includes obtaining predetermined target data, obtaining environment data, providing, combining, and outputting. The obtaining the predetermined target data includes obtaining predetermined data usable in predetermined inference. The obtaining the environment data includes obtaining environment data about a target environment in which the predetermined inference is to be performed. The providing includes providing the target data to a plurality of inference models and obtaining an inference result for the target data from each of the plurality of inference models. Each of the plurality of inference models is derived from local learning data obtained in a different environment. Each of the plurality of inference models performs the predetermined inference using the target data. The combining includes combining the inference result from each of the plurality of inference models under a combining rule to generate an inference result for the target data in the target environment. The combining rule includes a plurality of combining parameters. Each of the plurality of combining parameters defines a priority on an inference result from a corresponding inference model of the plurality of inference models in the target environment. Combining the inference result from each of the plurality of inference models under the combining rule includes determining a value of each of the plurality of combining parameters using the obtained environment data, weighting the inference result from each of the plurality of inference models using the determined value of each of the plurality of combining parameters, and combining the weighted inference result from each of the plurality of inference models. The outputting includes outputting information about the inference result generated from the combining.

For example, an inference program according to one or more embodiments may include a program for causing a computer to perform operations including obtaining predetermined target data, obtaining environment data, providing, combining, and outputting. The obtaining the predetermined target data includes obtaining predetermined data usable in predetermined inference. The obtaining the environment data includes obtaining environment data about a target environment in which the predetermined inference is to be performed. The providing includes providing the target data to a plurality of inference models and obtaining an inference result for the target data from each of the plurality of inference models. Each of the plurality of inference models is derived from local learning data obtained in a different environment. Each of the plurality of inference models performs the predetermined inference using the target data.

The combining includes combining the inference result from each of the plurality of inference models under a combining rule to generate an inference result for the target data in the target environment. The combining rule includes a plurality of combining parameters. Each of the plurality of combining parameters defines a priority on an inference result from a corresponding inference model of the plurality of inference models in the target environment. Combining the inference result from each of the plurality of inference models under the combining rule includes determining a value of each of the plurality of combining parameters using the environment data, weighting the inference result from each of the plurality of inference models using the determined value of each of the plurality of combining parameters, and combining the weighted inference result from each of the plurality of inference models. The outputting includes outputting information about the inference result generated from the combining.

The technique according to the above described one or more embodiments may reduce the cost of building a trained machine learning model for appropriately performing predetermined inference in a new environment.

BRIEF DESCRIPTION OF THE DRAWINGS

FIG. 8 is a flowchart illustrating a procedure performed by a local learner apparatus according to one or more embodiments.

FIG. 9A is a flowchart illustrating an inference procedure performed by an inference apparatus according to one or more embodiments.

DETAILED DESCRIPTION

One or more embodiments of the present invention (hereafter, the present embodiment) will now be described with reference to the drawings. The present embodiments described below are mere examples in any aspect. The embodiments may be variously modified or altered without departing from the scope of the present invention. More specifically, the present invention may be implemented as appropriate using the structure specific to each embodiment. Although data used in the present embodiments is described in a natural language, such data may be specifically defined using any computer-readable language, such as a pseudo language, commands, parameters, or a machine language.

1. Example Use

Figure 1A:
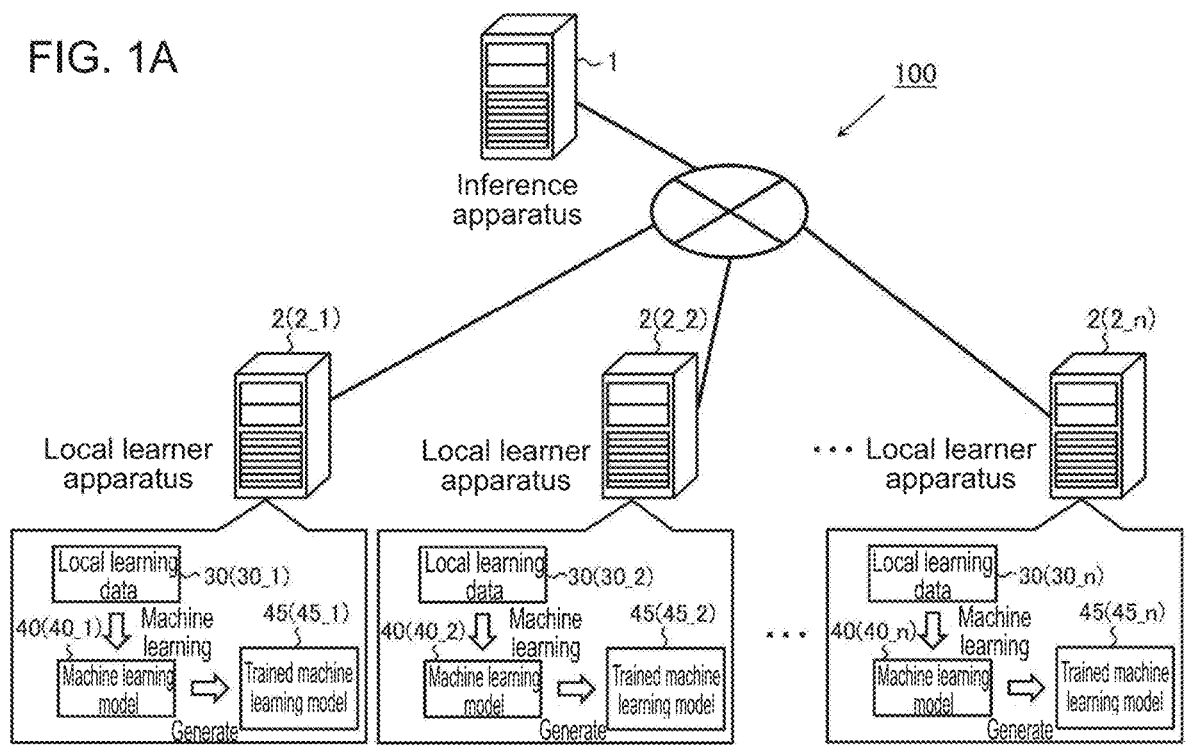
FIG. 1A is a schematic diagram illustrating an inference system according to one or more embodiments in one example use.
Figure 1B:
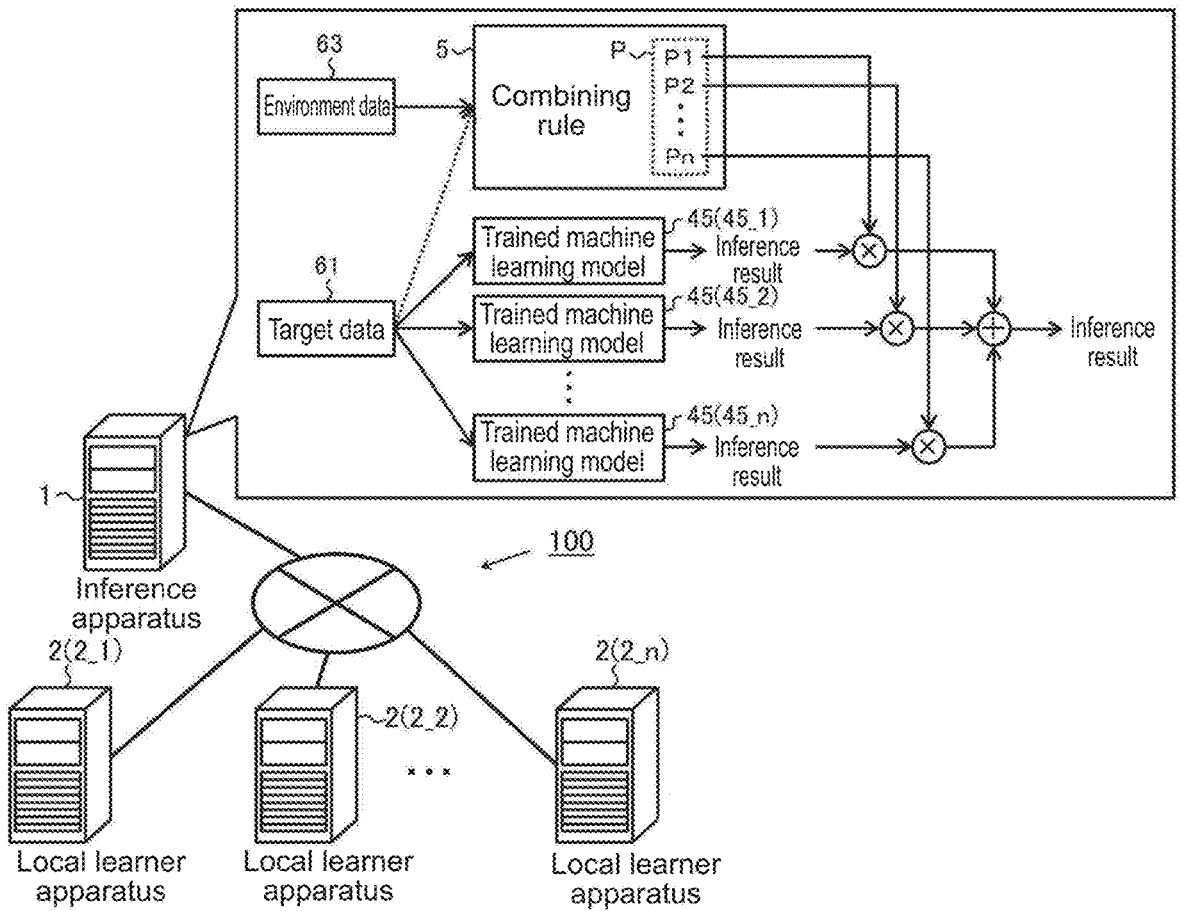
FIG. 1B is a schematic diagram further illustrating an inference system according to one or more embodiments in one example use.

An example use of the present invention will now be described with reference to FIGS. 1A and 1B. FIGS. 1A and 1B are schematic diagrams of an example use of the present invention. As shown in FIGS. 1A and 1B, an inference system 100 according to the present embodiment includes an inference apparatus 1 and multiple local learner apparatuses 2. The inference apparatus 1 and the local learner apparatuses 2 may be connected to each other with a network. The network may be selected as appropriate from, for example, the Internet, a wireless communication network, a movable communication network, a telephone network, and a dedicated network.

Each of the local learner apparatuses 2 in the present embodiment is a computer that trains a machine learning model 40 through machine learning using local learning data 30. As shown in FIG. 1A, each local learner apparatus 2 collects local learning data 30 in a different environment and uses the obtained local learning data 30 to train the machine learning model 40 through machine learning. Through such machine learning, each local learner apparatus 2 builds a trained machine learning model 45 capable of performing predetermined inference.

Each trained machine learning model 45 is an example of each inference model derived to perform predetermined inference using local learning data obtained in a different environment in an aspect of the present invention. More specifically, each inference model in the present embodiment includes a trained machine learning model 45. The trained machine learning model 45 is hereafter replaceable by an inference model.

Examples of machine learning include supervised learning, unsupervised learning, and reinforcement learning. The local learning data 30 may be in any format or of any type and may be selected as appropriate for the method of machine learning or the details of the predetermined inference. Each local learner apparatus 2 is replaceable by an inference model generation apparatus or a model generation apparatus.

Performing predetermined inference includes performing an estimation process based on unknown target data. The details of the inference may be determined as appropriate in each embodiment. The inference may include regression or discrimination. The predetermined inference may include estimating an optimum observation method with a sensor, predicting a path to be traveled by a movable object, estimating a conversation strategy to fit a user, and estimating a motion command for a robot device to fit a task. The predetermined inference may also include estimating a characteristic in observation data obtained with a sensor, or more specifically, for example, estimating an attribute of a subject included in image data obtained with a camera (imaging device). The predetermined inference may also include estimating a characteristic associated with an observation condition for a sensor based on observation data obtained with the sensor. The characteristic associated with the observation condition may include any factor possibly associated with the observation condition, or more specifically, for example, the distance between the sensor and an observation target or ambient brightness around the observation target. An inference result may be represented in a manner determined as appropriate for the details of the inference. The inference result may be represented by using, for example, a set of continuous values resulting from regression or the probability of classification into a class. The inference result may be represented by using, for example, one or more numerical values or one or more classes.

The local learning data 30 being obtained in a different environment refers to, for example, local learning data being obtained in an environment that differs at least partially in a factor that can affect the predetermined inference, such as time, a location, an object, or a user. In one example, the local learning data 30 obtained in a different environment may be local learning data obtained at a different location. In another example, the local learning data 30 obtained in a different environment may be local learning data obtained at a different time at the same location. The local learning data 30 used to build the trained machine learning model 45 may include at least partially identical data.

The environment in which the local learning data 30 is obtained and the environment in which the inference apparatus 1 performs predetermined inference may each be represented by using one or more classes or one or more numerical values. Each environment represented by using numerical value(s) may be represented by using a range of numerical values. A first environment and a second environment being different may include a first numerical range representing the first environment and a second numerical range representing the second environment not overlapping each other, or the first numerical range and the second numerical range partially overlapping each other.

In the examples of FIGS. 1A and 1B, the inference system 100 includes n local learner apparatuses 2_1 to 2_n. For ease of explanation, the reference numerals may have additional numbers such as _1, _2, and to _n to differentiate individual items or may have no such numbers and without differentiation as in, for example, the local learner apparatus 2. The local learner apparatuses 2_1 to 2_n collect the respective sets of local learning data 30_1 to 30_n, and train the respective machine learning models 40_1 to 40_n through machine learning using the collected sets of local learning data 30_1 to 30_n. The local learner apparatuses 2_1 to 2_n thus build the respective trained machine learning models 45_1 to 45_n. More specifically, the local learner apparatuses 2_1 to 2_n generate the n trained machine learning models 45_1 to 45_n. The number (n) of local learner apparatuses 2 and the number (n) of trained machine learning models 45 to be generated may be determined as appropriate in each embodiment. Each local learner apparatus 2 may generate two or more trained machine learning models 45, rather than a single trained machine learning model 45.

The inference apparatus 1 according to the present embodiment is a computer that performs predetermined inference in a target environment using each trained machine learning model 45 derived from the local learning data 30 obtained in a different environment. As shown in FIG. 1B, the inference apparatus 1 according to the present embodiment obtains predetermined target data 61 usable in the predetermined inference. The inference apparatus 1 according to the present embodiment also obtains environment data 63 about a target environment in which the predetermined inference is to be performed.

The target data 61 may be of any type that can be used in the predetermined inference and may be selected as appropriate for the details of the inference. The target data 61 may be, for example, image data, sound data, numerical data, text data, and other observation data obtained with a sensor. The target data 61 may be either unprocessed data or processed data (e.g., a feature quantity calculated from unprocessed data). The target data 61 is replaceable by input data.

The environment data 63 may be of any type that is associated with a target environment in which the predetermined inference is to be performed and may be selected as appropriate in each embodiment. The environment in which the predetermined inference is performed may be, for example, an environment in which the target data 61 is obtained. The attributes of the environment in which the target data 61 is obtained may include any factor possibly relevant to inference, such as any attribute of the object or the user directly or indirectly relevant to the predetermined inference. Similarly to the target data 61, the environment data 63 may be, for example, image data, sound data, numerical data, text data, and other observation data obtained with a sensor. The environment data 63 may be unprocessed data or processed data.

The target data 61 and the environment data 63 may be obtained with any method selected as appropriate in each embodiment. The target data 61 and the environment data 63 obtained with sensor(s) may be derived from the same observation data obtained with the same sensor or may be derived from different sets of observation data obtained with different sensors. Also, the target data 61 and the environment data 63 may at least partially include common data.

The inference apparatus 1 according to the present embodiment inputs the obtained target data 61 into each trained machine learning model 45 (45_1 to 45_n) and causes each trained machine learning model 45 (45_1 to 45_n) to perform the predetermined inference using the target data 61. The inference apparatus 1 according to the present embodiment thus obtains an inference result from each trained machine learning model 45 (45_1 to 45_n) for the obtained target data 61. The inference apparatus 1 according to the present embodiment then combines the inference result from each trained machine learning model 45 (45_1 to 45_n) together under a combining rule 5 to generate an inference result for the target data 61 in the target environment.

More specifically, the combining rule 5 includes multiple combining parameters P (P1 to Pn) each defining the priority on the inference result of the corresponding trained machine learning model 45 (45_1 to 45_n) in the target environment. The number of combining parameters may be determined as appropriate for the number of inference models (trained machine learning models 45). Each trained machine learning model 45 may have one or more combining parameters defined.

The inference apparatus 1 according to the present embodiment determines the value of each combining parameter P (P1 to Pn) in accordance with the obtained environment data 63. The value of each combining parameter P (P1 to Pn) may be determined based further on the target data 61 in addition to the environment data 63. More specifically, the inference apparatus 1 according to the present embodiment may determine the value of each combining parameter P (P1 to Pn) in accordance with the target data 61 and the environment data 63.

The inference apparatus 1 according to the present embodiment then weights the inference result from each trained machine learning model 45 (45_1 to 45_n) using the value of the corresponding determined combining parameter P (P1 to Pn). The inference apparatus 1 according to the present embodiment then combines the weighted inference result of each trained machine learning model 45 (45_1 to 45_n) together. The inference apparatus 1 according to the present embodiment thus combines the inference result from each trained machine learning model 45 (45_1 to 45_n) together under the combining rule 5.

The inference results may be combined together with any method selected as appropriate in each embodiment. For example, combining the inference result from each trained machine learning model 45 together may include averaging the inference results or selecting one of the inference results based on majority rules. For the predetermined inference being regression, combining each inference result together may mainly include averaging. For the predetermined inference being discrimination, combining each inference result together may mainly include selecting one of the inference results based on majority rules. The combining process generates an inference result for the target data 61 in the target environment. The inference apparatus 1 according to the present embodiment outputs information about the generated inference result.

As described above, the inference apparatus 1 according to the present embodiment uses the multiple inference models that have already been built (trained machine learning models 45_1 to 45_n), rather than building a new inference model, to perform predetermined inference in the target environment. Typically, an inference model derived from local learning data obtained in a training environment closer to the target environment is expected to have higher accuracy of inference for the target data obtained in the target environment. An inference model derived from local learning data obtained in a training environment less close to the target environment is expected to have lower accuracy of inference for the target data obtained in the target environment. The multiple inference models may include an inference model to be used with a higher priority in the target environment.

The inference apparatus 1 according to the present embodiment thus determines the value of each combining parameter P (P1 to Pn) under the combining rule 5 in accordance with the environment data 63 about a target environment in which the predetermined inference is to be performed. For example, the value of each combining parameter P (P1 to Pn) may be determined to have a higher priority on at least one of the trained machine learning model 45 in the training environment close to the target environment or the trained machine learning model 45 with a higher priority. The structure according to the present embodiment adjusts the priority on each trained machine learning model 45 in the target environment to customize the knowledge (trained machine learning models 45) obtained in various environments to fit the new environment. The predetermined inference can thus be performed appropriately in the target environment based on the customized knowledge, or in other words, based on the result obtained by combining the weighted inference result of each trained machine learning model 45 together.

In the present embodiment, the predetermined inference can be performed appropriately in the target environment using multiple trained machine learning models 45 derived from the local learning data 30 obtained in different environments. More specifically, the trained machine learning models 45 that have already been built can be used to build a new inference model to appropriately perform the predetermined inference in the target environment. This eliminates the burden of collecting new training data in the target environment and deriving a new inference model (trained machine learning model in the present embodiment) from the collected new training data. This structure reduces the cost of building an inference model for appropriately performing predetermined inference in a new environment.

2. Example Configuration

Hardware Configuration
Inference Apparatus

Figure 2:
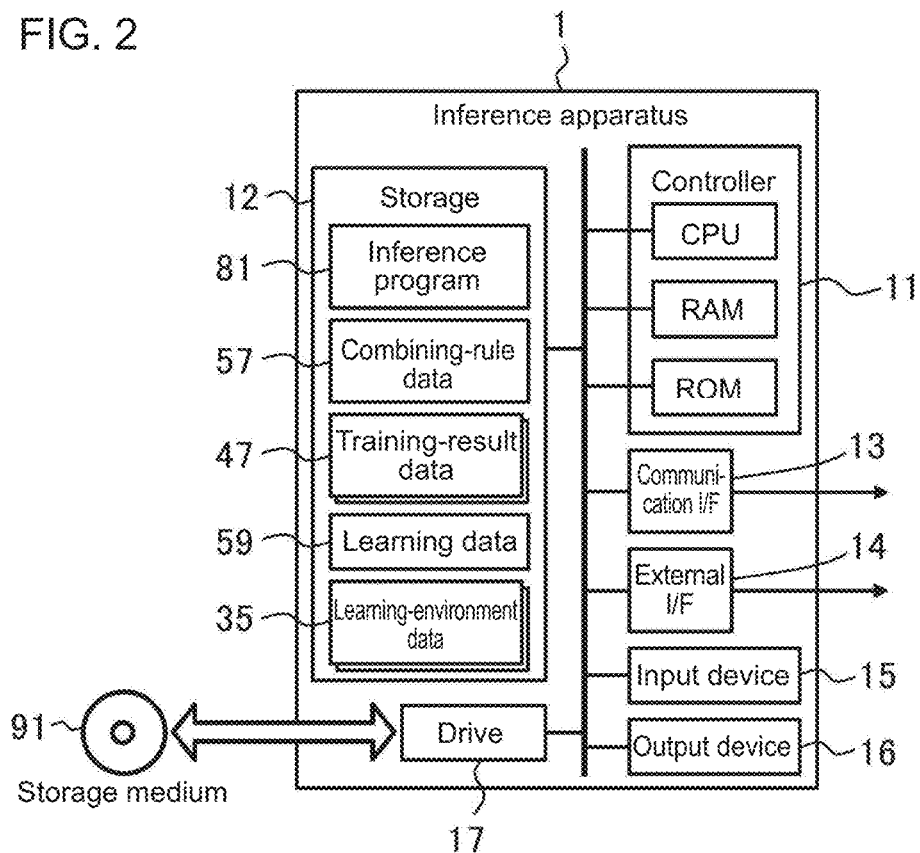
FIG. 2 is a schematic diagram illustrating an inference apparatus according to one or more embodiments showing an example hardware configuration.

The hardware configuration of the inference apparatus 1 according to the present embodiment will now be described with reference to FIG. 2. FIG. 2 is a schematic diagram of the inference apparatus 1 according to the present embodiment showing its example hardware configuration.

As shown in FIG. 2, the inference apparatus 1 according to the present embodiment is a computer including a controller 11, a storage 12, a communication interface 13, an external interface 14, an input device 15, an output device 16, and a drive 17 that are electrically connected to one another. In FIG. 2, the communication interface and the external interface are abbreviated as a communication I/F and an external I/F.

The controller 11 includes, for example, a central processing unit (CPU) as a hardware processor, a random-access memory (RAM), and a read-only memory (ROM). The controller 11 performs information processing based on various sets of data. The storage 12 is an example memory and may include a hard disk drive and a solid-state drive. In the present embodiment, the storage 12 stores various items of information such as an inference program 81, combining-rule data 57, training-result data 47, learning data 59, and learning-environment data 35.

The inference program 81 causes the inference apparatus 1 to perform information processing described later (FIGS. 9A and 9B) associated with predetermined inference in a target environment. The inference program 81 includes a series of commands for the information processing. The combining-rule data 57 represents information about the combining rule 5. Each set of training-result data 47 is information about the corresponding trained machine learning model 45 built through machine learning. As described later, a computational model may be used to calculate the value of each combining parameter P (P1 to Pn) using the environment data 63. The combining rule 5 may further include a trained computational model built through machine learning. The learning data 59 is used to build a trained computational model through machine learning. Each set of learning-environment data 35 is information about an environment in which the local learning data 30 used to derive the corresponding inference model (machine learning for the corresponding trained machine learning model 45 in the present embodiment) is obtained. This will be described in detail later.

The communication interface 13 is, for example, a wired local area network (LAN) module or a wireless LAN module for wired or wireless communication through a network. The inference apparatus 1 uses the communication interface 13 to communicate data with other information processing apparatuses (e.g., the local learner apparatus 2) with a network.

The external interface 14 is an interface for connection to an external device and may be, for example, a universal serial bus (USB) port or a dedicated port. The type and the number of external interfaces 14 may be selected as appropriate for the type and the number of external devices to be connected to the network. The inference apparatus 1 may be connected to sensors for obtaining at least one of the target data 61, the environment data 63, or data associated with the target data 61 or the environment data 63 through the external interface 14. The inference apparatus 1 may be connected to a target device (e.g., an intervening device or a robot device described later) to be controlled based on inference results through the external interface 14.

The input device 15 is, for example, a mouse or a keyboard. The output device 16 is, for example, a display or a speaker. An operator may operate the inference apparatus 1 using the input device 15 and the output device 16.

The drive 17 is, for example, a compact disc (CD) drive or a digital versatile disc (DVD) drive for reading a program stored in a storage medium 91. The type of drive 17 may be selected as appropriate for the type of storage medium 91. At least one of the inference program 81, the combining-rule data 57, the training-result data 47, the learning data 59, or the learning-environment data 35 may be stored in the storage medium 91.

The storage medium 91 stores programs or other information in an electrical, magnetic, optical, mechanical, or chemical manner to allow a computer or another device or machine to read the recorded programs or other information. The inference apparatus 1 may obtain at least one of the inference program 81, the combining-rule data 57, the training-result data 47, the learning data 59, or the learning-environment data 35 from the storage medium 91.

In FIG. 2, the storage medium 91 is a disc-type storage medium, such as a CD or a DVD. However, the storage medium 91 is not limited to a disc. One example of the storage medium other than a disc is a semiconductor memory such as a flash memory.

For the specific hardware configuration of the inference apparatus 1, components may be eliminated, substituted, or added as appropriate in each embodiment. For example, the controller 11 may include multiple hardware processors. The hardware processors may be a microprocessor, a field-programmable gate array (FPGA), a digital signal processor (DSP), and other processors. The storage 12 may be the RAM and the ROM included in the controller 11. At least one of the communication interface 13, the external interface 14, the input device 15, the output device 16, or the drive 17 may be eliminated. The inference apparatus 1 may include multiple computers, each of which may have the same or a different hardware configuration. The inference apparatus 1 may also be an information processor dedicated to a relevant service, or may be a general-purpose server or a personal computer (PC).

Local Learner Apparatus

Figure 3:
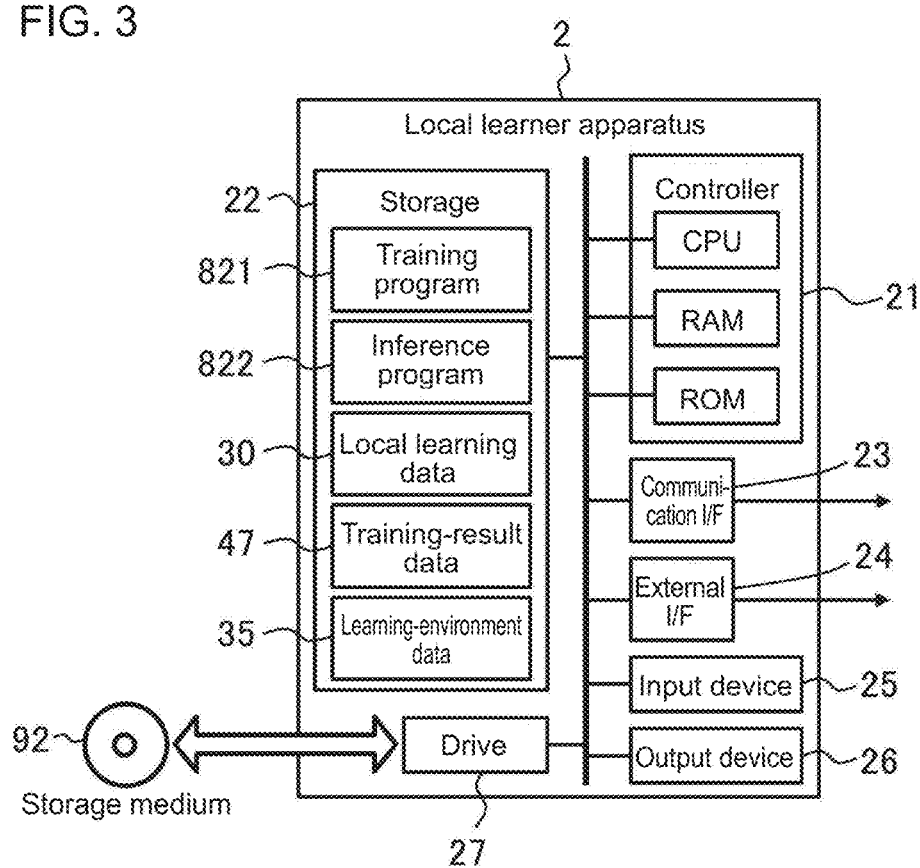
FIG. 3 is a schematic diagram illustrating a local learner apparatus according to one or more embodiments showing an example hardware configuration.

The hardware configuration of each local learner apparatus 2 in the present embodiment will now be described with reference to FIG. 3. FIG. 3 is a schematic diagram of each local learner apparatus 2 in the present embodiment showing its example hardware configuration.

As shown in FIG. 3, each local learner apparatus 2 in the present embodiment is a computer including a controller 21, a storage 22, a communication interface 23, an external interface 24, an input device 25, an output device 26, and a drive 27 that are electrically connected to one another. In FIG. 3, the communication interface and the external interface are abbreviated as a communication I/F and an external I/F as in FIG. 2.

The components of each local learner apparatus 2 from the controller 21 to the drive 27 may have the same structure as the corresponding components, or from the controller 11 to the drive 17, in the above inference apparatus 1. More specifically, the controller 21 includes, for example, a CPU as a hardware processor, a RAM, and a ROM, and performs various information processing operations based on programs and data. The storage 22 includes, for example, a hard disk drive or a solid-state drive. The storage 22 stores various items of information such as a training program 821, an inference program 822, the local learning data 30, the training-result data 47, and the learning-environment data 35.

The training program 821 causes each local learner apparatus 2 to perform the information processing (FIG. 6) for training the machine learning model 45 through machine learning. The training program 821 includes a series of instructions for this information processing. The inference program 822 causes each local learner apparatus 2 to perform the information processing (FIG. 8) for predetermined inference using the trained machine learning model 40. The inference program 822 includes a series of instructions for this information processing. The local learning data 30 is collected in each individual environment and used to train the machine learning model 40 to be capable of performing predetermined inference through machine learning. This will be described in detail later.

The communication interface 23 is an interface for wired or wireless communication through a network, and may be a wired local area network (LAN) module or a wireless LAN module. Each local learner apparatus 2 uses the communication interface 23 to communicate data with other information processing apparatuses (e.g., the inference apparatus 1) with a network.

The external interface 24 is an interface for connection with external devices and may be, for example, a USB port or a dedicated port. The type and the number of external interfaces 24 may be selected as appropriate for the type and the number of external devices to be connected to the network. Each local learner apparatus 2 may be connected to sensors for obtaining at least one of the local learning data 30, the learning-environment data 35, target data (described later), or data associated with these data sets through the external interface 24. Each local learner apparatus 2 may be connected to a target device (e.g., an intervening device or a robot device described later) to be controlled based on the inference results through the external interface 24.

The input device 25 is, for example, a mouse or a key board. The output device 26 is, for example, a display or a speaker. An operator may operate each local learner apparatus 2 using the input device 25 and the output device 26.

The drive 27 is, for example, a CD drive or a DVD drive for reading a program stored in a storage medium 92. At least one of the training program 821, the inference program 822, or the local learning data 30 may be stored in the storage medium 92. Each local learner apparatus 2 may obtain at least one of the training program 821, the inference program 822, or the local learning data 30 from the storage medium 92.

For the specific hardware configuration of each local learner apparatus 2, components may be eliminated, substituted, or added as appropriate in each embodiment. For example, the controller 21 may include multiple hardware processors. Each hardware processor may include a microprocessor, an FPGA, a DSP, or other processors. The storage 22 may be the RAM and the ROM included in the controller 21. At least one of the communication interface 23, the external interface 24, the input device 25, the output device 26, or the drive 27 may be eliminated. Each local learner apparatus 2 may include multiple computers, each of which may have the same or a different hardware configuration. In the present embodiment, each local learner apparatus 2 has the same hardware configuration. However, the hardware configuration of each local learner apparatus 2 is not limited to the above example. One local learner apparatus 2 may have a hardware configuration different from the hardware configuration of another local learner apparatus 2. Each local learner apparatus 2 may also be an information processor dedicated to a relevant service, or may be a general-purpose server or a general-purpose PC.

Software Configuration

Inference Apparatus

Figure 4:
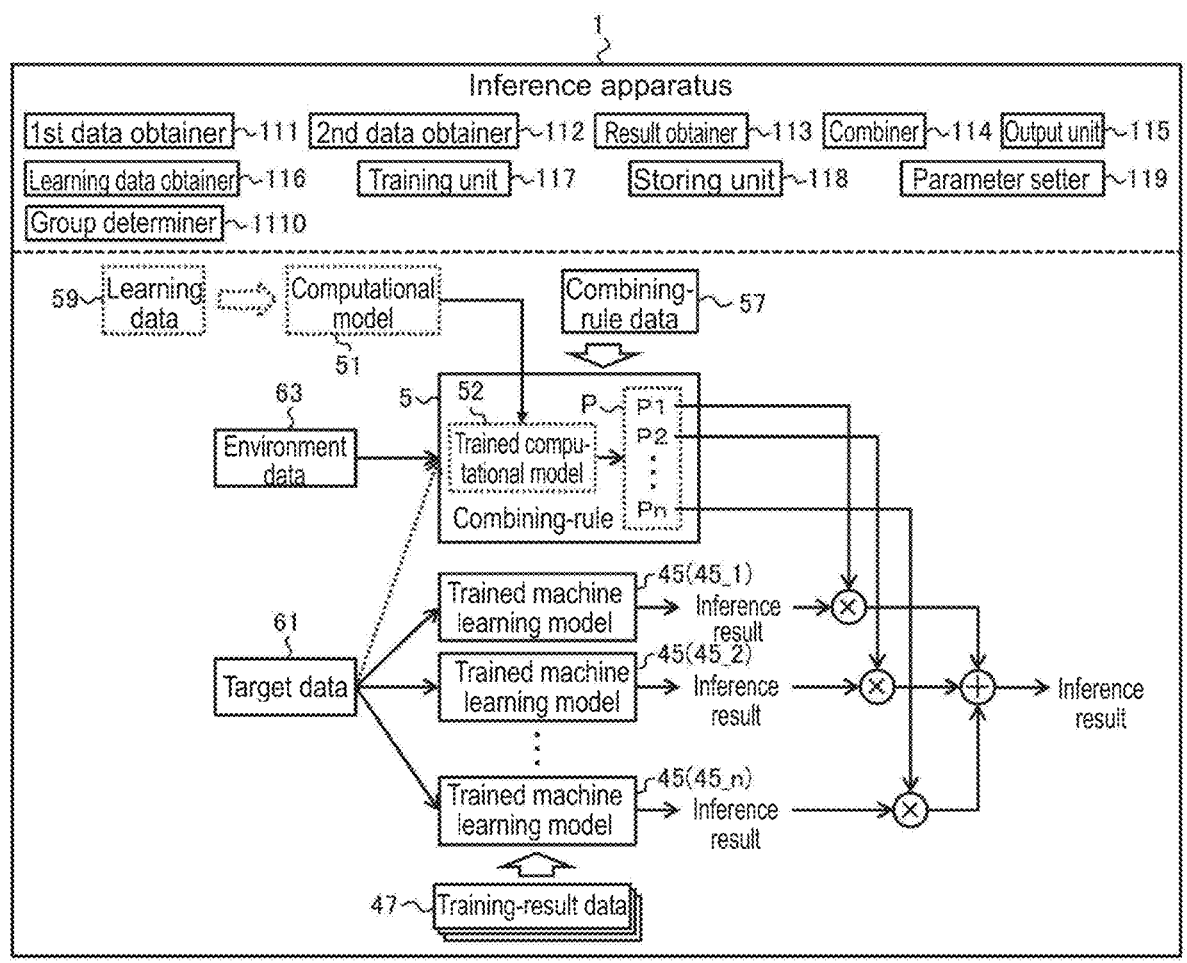
FIG. 4 is a schematic diagram illustrating an inference apparatus according to one or more embodiments showing an example software configuration.

The software configuration of the inference apparatus 1 according to the present embodiment will now be described with reference to FIG. 4. FIG. 4 is a schematic diagram of the inference apparatus 1 according to the present embodiment showing its example software configuration.

The controller 11 in the inference apparatus 1 loads the inference program 81 stored in the storage 12 into the RAM. The CPU in the controller 11 then interprets and executes a command included in the inference program 81 loaded in the RAM to control each unit. The inference apparatus 1 according to the present embodiment thus operates as a computer including a first data obtainer 111, a second data obtainer 112, a result obtainer 113, a combiner 114, an output unit 115, a learning data obtainer 116, a training unit 117, a storing unit 118, a parameter setter 119, and a group determiner 1110 as software modules as shown in FIG. 4. In other words, in the present embodiment, each software module in the inference apparatus 1 is implemented by the controller 11 (CPU).

The first data obtainer 111 obtains predetermined target data 61 usable in predetermined inference. The second data obtainer 112 obtains environment data 63 about a target environment in which predetermined inference is performed. The result obtainer 113 inputs the target data 61 into multiple inference models to cause the inference models derived from local learning data 30 obtained in a different environment to perform predetermined inference using the target data 61 to obtain an inference result for the obtained target data 61 from each of the inference models.

In the present embodiment, each inference model includes a trained machine learning model 45 capable of performing predetermined inference through machine learning using local learning data 30 obtained in a different environment. In the present embodiment, the result obtainer 113 includes each trained machine learning model 45 stored as the corresponding set of training-result data 47. The result obtainer 113 refers to each set of training-result data 47 to define the corresponding trained machine learning model 45. The result obtainer 113 inputs the target data 61 into each trained machine learning model 45 and causes each trained machine learning model 45 to perform predetermined inference using the target data 61 to obtain an inference result from each trained machine learning model 45 for the obtained target data 61.

The combiner 114 combines the inference result from each inference model together under the combining rule 5. The combining rule 5 includes multiple combining parameters P each defining the priority on the inference result from the corresponding inference model in the target environment. In the present embodiment, each combining parameter P (P1 to Pn) defines the priority on the inference result from the corresponding trained machine learning model 45 (45_1 to 45_n). The combiner 114 has information about the combining rule 5 stored as the combining-rule data 57. The combiner 114 refers to the combining-rule data 57 and defines the combining rule 5. The combiner 114 combines the inference result from each trained machine learning model 45 (45_1 to 45_n) together under the combining rule 5.

More specifically, the combiner 114 determines the value of each combining parameter P (P1 to Pn) in accordance with the obtained environment data 63. The value of each combining parameter P (P1 to Pn) may be determined based further on the target data 61 in addition to the environment data 63. The combiner 114 then weights the inference result from each combining parameter using the determined value of the corresponding combining parameter P. The combiner 114 combines the weighted inference result from each inference model together.

In the present embodiment, the combiner 114 then weights the inference result from each trained machine learning model 45 (45_1 to 45_n) using the value of the corresponding determined combining parameter P (P1 to Pn). The combiner 114 combines the weighted inference result of each trained machine learning model 45 (45_1 to 45_n) together. In this manner, the combiner 114 combines the inference result from each trained machine learning model 45 (45_1 to 45_n) together under the combining rule 5.

Through the combining process described above, the combiner 114 generates an inference result for the target data 61 in the target environment. The output unit 115 outputs information about the generated inference result.

In the present embodiment, a computational model may be used to determine the value of each combining parameter P (P1 to Pn) using the environment data 63. The learning data obtainer 116, the training unit 117, and the storing unit 118 perform information processing associated with generation of the trained computational model. More specifically, the learning data obtainer 116 obtains learning data 59 to be used for training, through machine learning, the computational model 51 for calculating the value of each combining parameter P (P1 to Pn) using the environment data 63. The training unit 117 trains the computational model 51 through machine learning using the obtained learning data 59. Machine learning includes training the computational model 51 to cause the value of each calculated combining parameter P (P1 to Pn) to fit the predetermined inference in the target environment. A trained computational model 52 is generated in this manner. The storing unit 118 generates information about the result from training the computational model 51 through machine learning (or the trained computational model 52) and stores the generated information in a predetermined storage area. The information about the generated trained computational model 52 may be included in the combining-rule data 57.

In this case, the combiner 114 inputs the environment data 63 (and the target data 61) into the trained computational model 52 and causes the computational model 52 to perform a computational operation to receive an output from the trained computational model 52 as the value of each combining parameter P (P1 to Pn). In this manner, the combiner 114 may determine the value of each combining parameter P (P1 to Pn) in accordance with the environment data 63 (and the target data 61).

In the present embodiment, the value of at least one of the combining parameters P (P1 to Pn) may be specified by an operator such as a user. The parameter setter 119 performs information processing associated with the specification of the value of each combining parameter. More specifically, the parameter setter 119 receives the specified value of at least one of the multiple combining parameters P (P1 to Pn). The parameter setter 119 then sets the value of at least one combining parameter to the specified value. Information about the specified setting may be included in the combining-rule data 57. In this case, weighting the inference result from each of the above inference models (trained machine learning models 45) includes weighting an inference result from an inference model (trained machine learning model 45) corresponding to at least one combining parameter.

In the present embodiment, each inference model (trained machine learning model 45) may be grouped. The groups may be determined as appropriate for the type or the purpose of the inference or the target environment. The group determiner 1110 performs information processing for grouping inference models (trained machine learning models 45). More specifically, the group determiner 1110 assigns each inference model (trained machine learning model 45) to at least one of multiple groups. The result obtainer 113 may identify a group to be used in the target environment from multiple groups determined and may perform a process for obtaining the above inference result for an inference model (trained machine learning model 45) in the identified group. Similarly, the combiner 114 may perform the combining process of the inference result from each inference model (trained machine learning models 45) included in the identified group. Information about the group assigned to each inference model (trained machine learning model 45) may be stored as appropriate in a predetermined storage area.

Local Learner Apparatus (A) Training Process

Figure 5A:
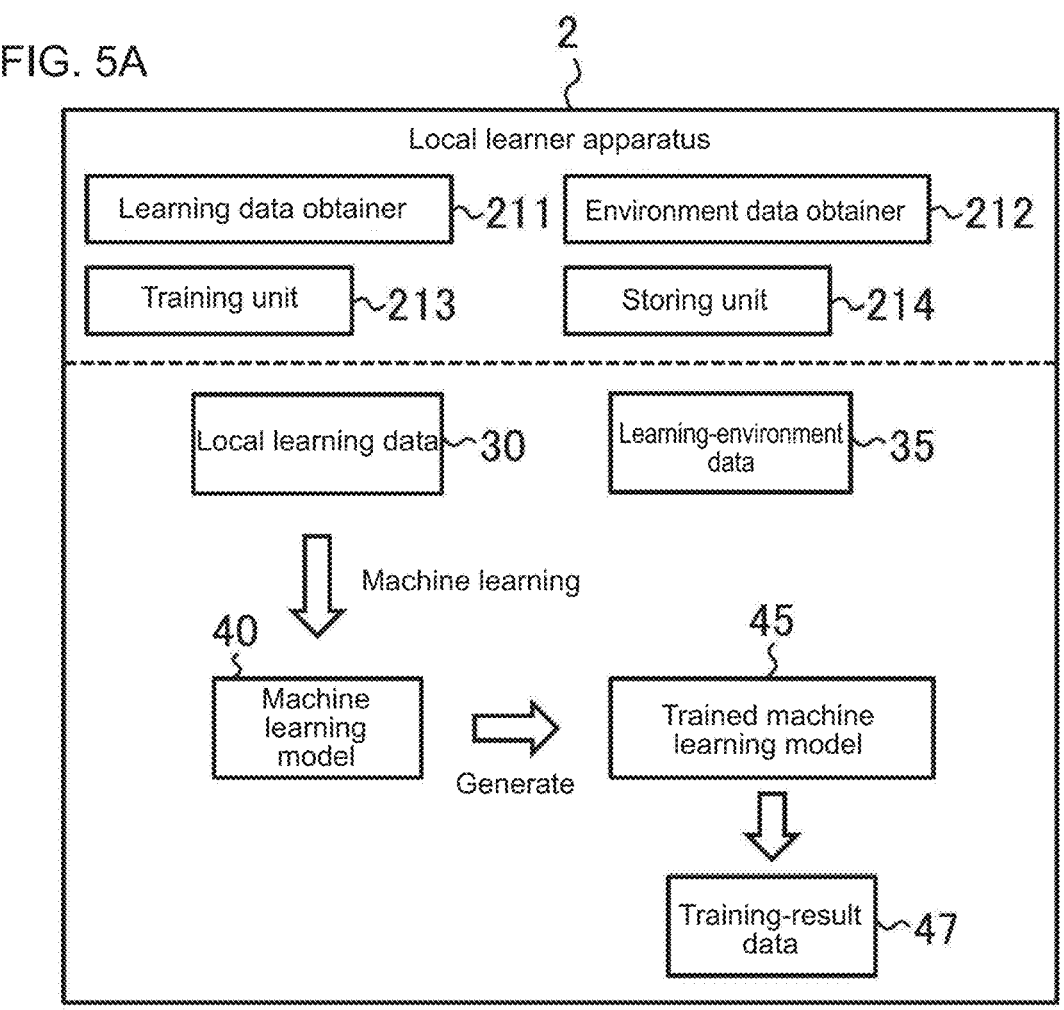
FIG. 5A is a schematic diagram illustrating a local learner apparatus according to one or more embodiments showing an example software configuration associated with machine learning.

The software configuration of each local learner apparatus 2 in the present embodiment associated with a training process will now be described with reference to FIG. 5A. FIG. 5A is a schematic diagram of each local learner apparatus 2 in the present embodiment showing its example software configuration associated with a training process.

The controller 21 in each local learner apparatus 2 loads the training program 821 stored in the storage 22 into the RAM. The CPU in the controller 21 then interprets and executes a command included in the training program 821 loaded in the RAM to control each unit. Each local learner apparatus 2 in the present embodiment thus operates as a computer including a learning data obtainer 211, an environment data obtainer 212, a training unit 213, and a storing unit 214 as software modules as shown in FIG. 5A. In other words, in the present embodiment, each software module in each local learner apparatus 2 is implemented by the controller 21 (CPU).

In the present embodiment, the learning data obtainer 211 obtains local learning data 30 to be used for deriving an inference model. In the present embodiment, the learning data obtainer 211 obtains local learning data 30 to be used for training the machine learning model 40 through machine learning. The environment data obtainer 212 obtains the learning-environment data 35 associated with the environment (also training environment) in which the local learning data 30 is obtained. The learning-environment data 35 is of the same type as the environment data 63.

The training unit 213 trains the machine learning model 40 through machine learning using the obtained local learning data 30. Through such machine learning, a trained machine learning model 45 capable of performing predetermined inference is built (generated). The storing unit 214 generates information about the trained machine learning model 45 as training-result data 47 and stores the generated training-result data 47 into a predetermined storage area.

In the present embodiment, the local learning data 30 for each local learner apparatus 2 is collected in a different environment. The trained machine learning model 45 is then generated using the obtained local learning data 30. This generates multiple trained machine learning models 45 derived to perform predetermined inference using the local learning data 30 obtained in a different environment.

(B) Inference Process

Figure 5B:
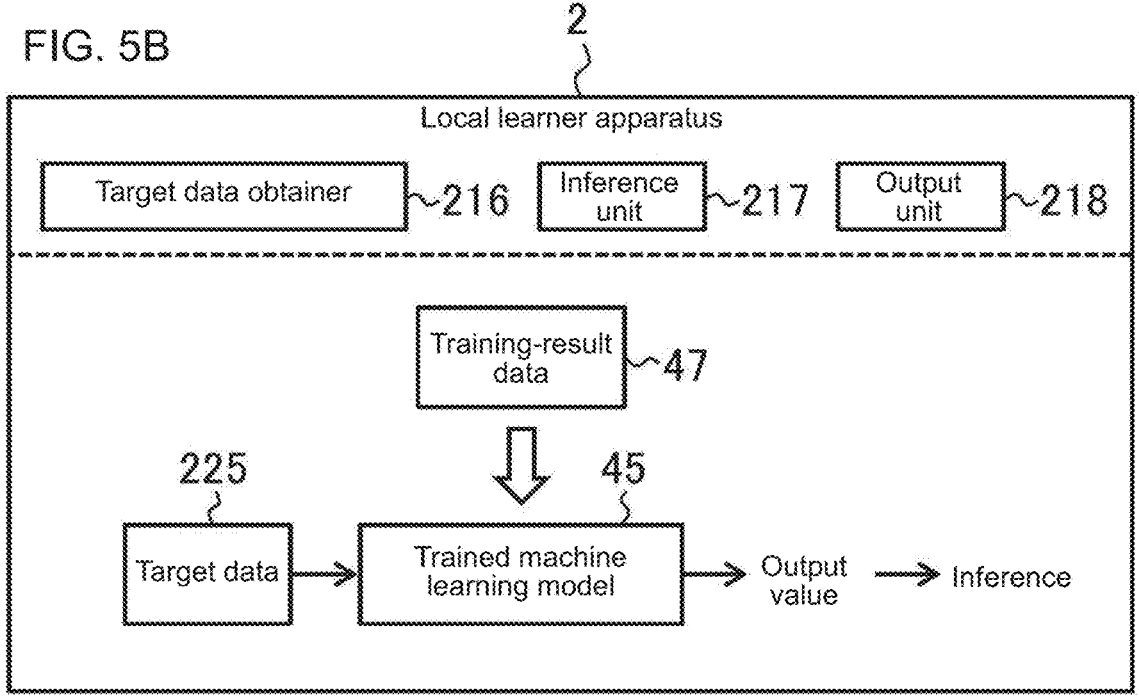
FIG. 5B is a schematic diagram illustrating a local learner apparatus according to one or more embodiments showing an example software configuration associated with an inference apparatus.

The software configuration of each local learner apparatus 2 in the present embodiment associated with an inference process will now be described with reference to FIG. 5B. FIG. 5B is a schematic diagram of each local learner apparatus 2 in the present embodiment showing its example software configuration associated with an inference process.

The controller 21 in each local learner apparatus 2 loads the inference program 822 stored in the storage 22 into the RAM. The CPU in the controller 21 then interprets and executes a command included in the inference program 822 loaded in the RAM to control each unit. Each local learner apparatus 2 in the present embodiment thus operates as a computer including a target data obtainer 216, an inference unit 217, and an output unit 218 as software modules as shown in FIG. 5B. In other words, in the present embodiment, each software module in each local learner apparatus 2 associated with the inference process is implemented by the controller 21 (CPU).

The target data obtainer 216 obtains target data 225 usable in predetermined inference. The target data 225 is of the same type as the target data 61 obtained by the inference apparatus 1. The inference unit 217 includes an inference model derived from the local learning data 30. The inference unit 217 performs predetermined inference on the target data 225 using the inference model. In the present embodiment, the inference unit 217 includes the trained machine learning model 45 stored as the training-result data 47. The inference unit 217 refers to the training-result data 47 to define the trained machine learning model 45. The inference unit 217 inputs target data 225 into the trained machine learning model 45 and performs a computational operation of the trained machine learning model 45. The inference unit 217 receives an output from the trained machine learning model 45 as the result from the predetermined inference on the target data 225. The output unit 218 outputs information about the inference result obtained for the target data 225.

Others

Each software module in the inference apparatus 1 and the local learner apparatus 2 will be described in detail in the operation examples below. In the present embodiment, each software module in the inference apparatus 1 and the local learner apparatus 2 is implemented by a general-purpose CPU. However, some or all of the software modules may be implemented by one or more dedicated processors. For the software configurations of the inference apparatus 1 and the local learner apparatus 2, software modules may be eliminated, substituted, or added as appropriate in each embodiment.

3. Operation Examples

Local Learner Apparatus (A) Training Process

Figure 6:
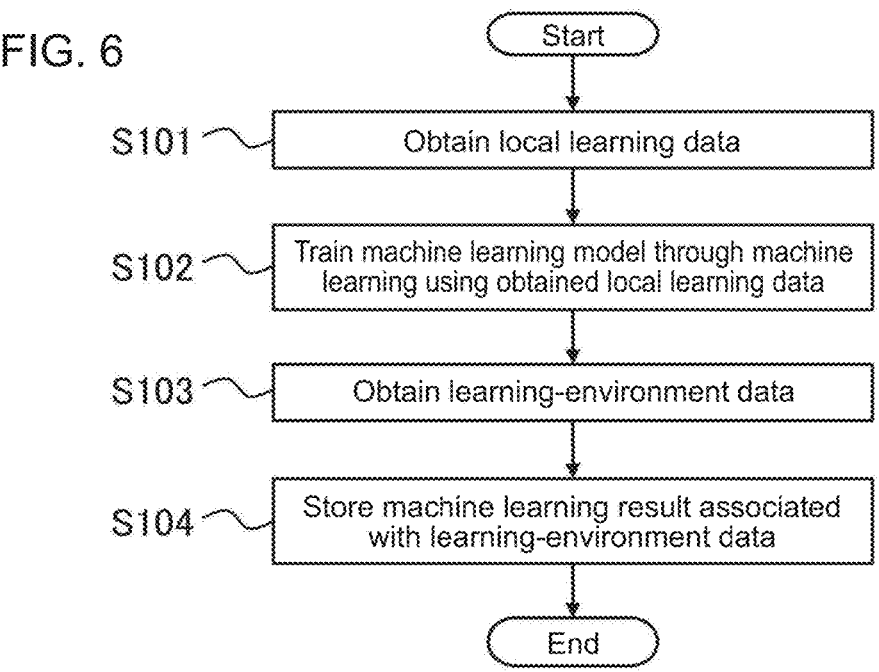
FIG. 6 is a flowchart illustrating a procedure for generating a trained machine learning model for a local learner apparatus according to one or more embodiments.

An operation example of each local learner apparatus 2 for generating an inference model will now be described with reference to FIG. 6. FIG. 6 is a flowchart of a procedure for generating the trained machine learning model 45 for each local learner apparatus 2. However, the procedure below is a mere example, and each of its steps may be modified in any possible manner. In the procedure below, steps may be eliminated, substituted, or added as appropriate in each embodiment.

Steps S101 and S102

In step S101, the controller 21 operates as the learning data obtainer 211 and obtains local learning data 30 to be used for deriving an inference model. In the present embodiment, the controller 21 obtains local learning data 30 to be used for training the machine learning model 40 through machine learning.

In step S102, the controller 21 operates as the training unit 213 and trains the machine learning model 40 through machine learning using the obtained local learning data 30. Through such machine learning, the controller 21 generates a trained machine learning model 45 trained to be capable of performing predetermined inference.

The machine learning model 40 may have any configuration and may use any method of machine learning selected as appropriate in each embodiment. Examples of machine learning include supervised learning, unsupervised learning, and reinforcement learning. The machine learning model 40 may include a data table or a functional expression. The machine learning model 40 being a functional expression may include a neural network, a linear function, or a decision tree. The neural network may be of any type that may be selected as appropriate for each embodiment. The neural network for building the machine learning model 40 may be, for example, a fully connected neural network, a convolutional neural network, a recurrent neural network, or any combination of these networks. Three examples for the configuration of the machine learning model 40 and the machine learning method will now be described.

1. First Example

Figure 7A:
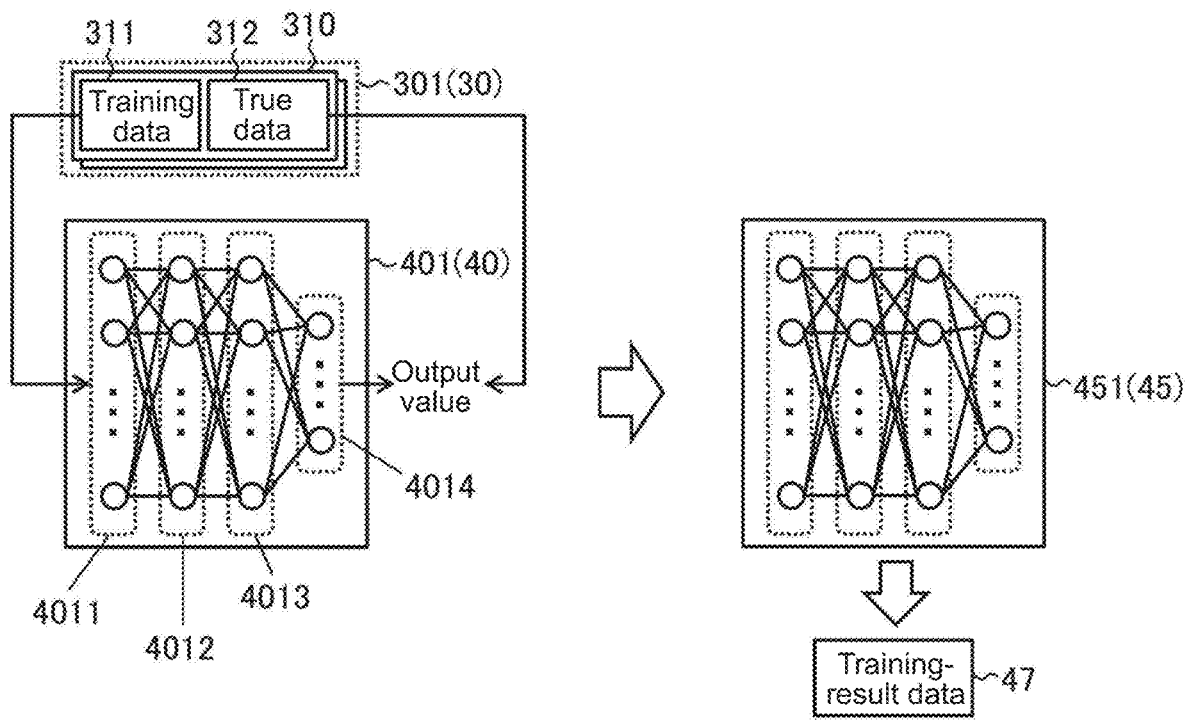
FIG. 7A is a diagram illustrating a machine learning model and a machine learning method according to one or more embodiments.

FIG. 7A is a schematic diagram of the machine learning model 40 showing its configuration and a machine learning method in a first example. In the first example, the machine learning model 40 uses a neural network, and the method of machine learning is supervised learning. In FIG. 7A, examples of the local learning data 30, the machine learning model 40, and the trained machine learning model 45 are local learning data 301, a machine learning model 401, and a trained machine learning model 451 for ease of explanation.

1-1. Example Configuration of Machine Learning Model

In the first example, the machine learning model 401 includes a four-layered fully coupled neural network. In detail, the machine learning model 401 has, in order from its input end, an input layer 4011, intermediate (hidden) layers (4012 and 4013), and an output layer 4014. However, the configuration of the machine learning model 401 is not limited to the above example and may be selected as appropriate in each embodiment. For example, the machine learning model 401 may include one or no intermediate layer or three or more intermediate layers. The intermediate layers may be eliminated. The machine learning model 401 may include other layers, such as a convolutional layer, a pooling layer, and a recursion layer. For example, long short-term memory may be used for recursion layers.

Each of the layers 4011 to 4014 may include any number of neurons (nodes) that may be selected as appropriate in each embodiment. Neurons in neighboring layers are connected to each other as appropriate. Each connection has a preset weight (coupling weight). In the example of FIG. 7A, neurons in each of the layers 4011 to 4014 are coupled to all neurons in its adjacent layer. The neurons may be coupled in a manner other than in this example and may be determined as appropriate in each embodiment. Each neuron has a preset threshold. An output of each neuron is determined basically depending on whether the sum of the product of each input and the corresponding weight exceeds the threshold. The coupling weight between neurons included in each of the layers 4011 to 4014 and the threshold of each neuron are examples of the computational parameters to be adjusted through machine learning.

1-2. Example Structure of Local Learning Data

The local learning data 301 used in supervised learning for the machine learning model 401 includes multiple learning datasets 310 each including a set of training data 311 (input data) and true data 312 (supervisory signal). The training data 311 is used for predetermined inference. The training data 311 is of the same type as the target data (61 and 225). The true data 312 indicates a result (true result) from predetermined inference performed on the training data 311. The true data 312 may be referred to as a label.

The details of the training data 311 and the true data 312 may be selected as appropriate for the details of the inference to be learned by the machine learning model 401. For training the machine learning model 401 to be capable of estimating an optimum observation method with a sensor, for example, the training data 311 may include data about the current observation state with the sensor, and the true data 312 may include data indicating a method of changing from the current observation state to an appropriate observation state. For training the machine learning model 401 to be capable of predicting a path to be traveled by a movable object, for example, the training data 311 may include data about the state of the movable object, and the true data 312 may include data indicating a path traveled either actually or virtually by the movable object. For training the machine learning model 401 to be capable of estimating a conversation strategy to fit a user, for example, the training data 311 may include data about the conversational action of the user, and the true data 312 may include data indicating a conversation strategy to fit the user. For training the machine learning model 401 to be capable of estimating a motion command for a robot device to fit a task, for example, the training data 311 may include data about the state of the robot device, and the true data 312 may include data indicating a motion command to fit the task. For training the machine learning model 401 to be capable of estimating a characteristic in observation data obtained with a sensor, for example, the training data 311 may include data about the observation data obtained with the sensor, and the true data 312 may include data indicating the characteristic in the observation data.

1-3. Step S101

In step S101 above, the controller 21 obtains local learning data 301 including multiple learning datasets 310. Each learning dataset 310 may be generated with any method selected as appropriate in each embodiment. For example, various situations in which predetermined inference is to be performed are created either actually or virtually, and the same type of data as the target data (61 and 225) may be obtained in the created various situations as the training data 311. For obtaining the target data (61 and 225) with a sensor in a specific example, the same type of sensor as the sensor used for obtaining the data is prepared. The predetermined inference is then performed using the prepared sensor in various situations that are then observed to obtain the training data 311. The predetermined inference is then performed on the obtained training data 311. In this situation, the predetermined inference may be performed manually by, for example, an operator. The result (true result) from the predetermined inference performed on the training data 311 is then associated with the training data 311. Each learning dataset 310 is generated in this manner.

Each learning dataset 310 may be generated automatically through a computer operation or manually through an operator operation. Each learning dataset 310 may be generated by the corresponding local learner apparatus 2 or by a computer other than the corresponding local learner apparatus 2. When each local learner apparatus 2 generates the corresponding learning dataset 310, the controller 21 may perform the series of processing steps described above automatically or in response to a manual operation performed on the input device 25 by an operator to obtain multiple learning datasets 310. When another computer generates each learning dataset 310, the controller 21 may obtain multiple learning datasets 310 generated by the other computer through, for example, a network or the storage medium 92. Some of the learning datasets 310 may be generated by each local learner apparatus 2, and the remaining other learning datasets 310 may be generated by one or more other computers. The number of learning datasets 310 to be obtained may be selected as appropriate in each embodiment.

1-4. Step S102

In step S102 above, the controller 21 trains the machine learning model 401 through machine learning (supervised learning) using the obtained local learning data 301. In the first example, the controller 21 trains, for each learning dataset 310, the machine learning model 401 through machine learning to output an output value to fit the true data 312 from the output layer 4014 in response to an input of the training data 311 into the input layer 4011. The controller 21 thus generates a trained machine learning model 451 capable of performing the predetermined inference.

As an example specific procedure for supervised learning, the controller 21 first prepares the machine learning model 401 to be trained through machine learning. The configuration of the machine learning model 401 (e.g., the number of layers, the number of neurons in each layer, and the connections between neurons in adjacent layers) to be prepared, and the default values of the computational parameters (e.g., the default values of the connection weights between neurons and the default threshold of each neuron) may be preset using a template or may be input by an operator. For retraining, the controller 21 may prepare the machine learning model 401 based on training-result data previously obtained through past supervised learning.

The controller 21 then uses the training data 311 included in each learning dataset 310 as input data, and uses the true data 312 as a supervisory signal to perform a training process for training the neural network in the machine learning model 401. The training process may include batch gradient descent, stochastic gradient descent, and mini-batch gradient descent.

In the first step, for example, the controller 21 inputs, for each learning dataset 310, the training data 311 into the machine learning model 401 and performs a computational operation of the machine learning model 401. The controller 21 inputs the training data 311 into the input layer 4011 and then determines neuronal firing in each of the layers 4011 to 4014 sequentially from the layer on the input end. Through the computational operation, the controller 21 obtains, from the output layer 4014, an output value corresponding to the result from the predetermined inference of the machine learning model 401 during training on the training data 311.

In the second step, the controller 21 calculates an error between the output value obtained from the output layer 4014 and the true data 312 based on a loss function. A loss function is used to evaluate a difference between an output from the machine learning model 401 and a true result. An error calculated using the loss function is larger as a difference between the output value obtained from the output layer 4014 and the true data 312 is larger. The loss function used for calculating such an error may be of any type selected as appropriate in each embodiment.

In the third step, the controller 21 calculates an error in the coupling weights between neurons and an error in the values of the computational parameters of the machine learning model 401, such as the threshold of each neuron, using the gradient of the calculated error in the output value with a back propagation through time method. In the fourth step, the controller 21 updates the values of the computational parameters for the machine learning model 401 based on the calculated error. The computational parameters may be updated by the degree adjusted based on the learning rate.

Through the first to fourth steps described above performed repeatedly, the controller 21 adjusts, for each learning dataset 310, the value of each computational parameter for the machine learning model 401 to output an output value to fit the true data 312 from the output layer 4014 in response to an input of the corresponding training data 311 into the input layer 4011. For example, the controller 21 may repeat, for each learning dataset 310, the above first to fourth steps until the sum of the errors between the output values obtained from the output layer 4014 and the corresponding true data 312 is less than a threshold. The value of the true data 312 fitting the output value from the output layer 4014 may include an error occurring due to the threshold between the value of the true data 312 and the output value of the output layer 4014. The threshold may be determined as appropriate in each embodiment. The controller 21 may repeat the above first to fourth steps a predetermined number of times. The adjustment may be repeated the number of times specified with, for example, a set value in the training program 821 or with an input from an operator.

The controller 21 can thus generate the trained machine learning model 451 trained to output an output value fitting the corresponding true data 312 in response to the input of the training data 311. For estimating the above optimum observation method with the sensor, for example, a trained machine learning model 451 capable of estimating the changing method from the current observation state with the sensor to the appropriate observation state can be generated.

1-5. Others

When the method of machine learning is supervised learning, the machine learning model 40 may not rely on a neural network but may have other configurations. For example, the machine learning model 40 may be a regression model, a support vector machine, or a decision tree model. The method of supervised learning may be other than described in the above example but may be selected as appropriate for the configuration of the machine learning model 40.

2. Second Example

Figure 7B:
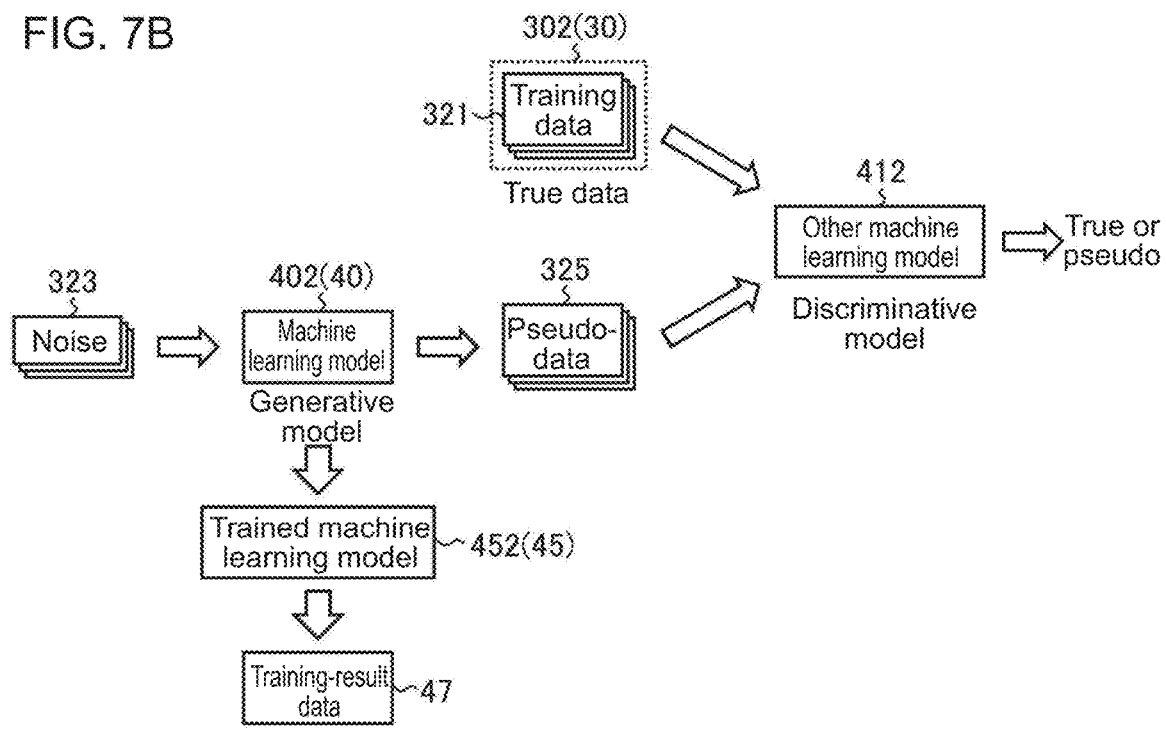
FIG. 7B is a diagram further illustrating a machine learning model and a machine learning method according to one or more embodiments.

FIG. 7B is a schematic diagram of the machine learning model 40 showing its configuration and a machine learning method in a second example. In the second example, the machine learning model 40 is a generative model, and the method of machine learning is supervised learning. In FIG. 7B, examples of the local learning data 30, the machine learning model 40, and the trained machine learning model 45 are local learning data 302, a machine learning model 402, and a trained machine learning model 452 for ease of explanation.

2-1. Example Configuration of Machine Learning Model

In the second example, the machine learning model 402 generates pseudo-data 325 from a noise element 323. The machine learning model 402 is used as a generative model. The machine learning model 402 is trained through machine learning together with another machine learning model 412. The other machine learning model 412 can discriminate the source of the received input data, or more specifically, whether the received input data is training data 321 included in the local learning data 302 or pseudo-data 325 generated by the machine learning model 402. The other machine learning model 412 is used as a discriminative model.

In the second example, adversarial learning is performed between the machine learning model 402 and the other machine learning model 412. Similarly to the machine learning model 401, the machine learning model 402 and the other machine learning model 412 each include computational parameters. The machine learning model 402 and the other machine learning model 412 each may have any configuration as appropriate to allow each model to perform information processing as appropriate. The machine learning model 402 and the other machine learning model 412 each may include a neural network. The machine learning model 402 and the other machine learning model 412 may receive an input of data indicating conditions (referred to as labels). This allows data generation and discrimination under selected conditions.

2-2. Example Structure of Local Learning Data

The local learning data 302 used for adversarial learning includes multiple sets of training data 321. Through adversarial learning, the machine learning model 402 is trained to be capable of generating pseudo-data 325 fitting (e.g., similar to) the training data 321 included in the local learning data 302. The training data 321 thus includes data to be generated by the machine learning model 402 intended through adversarial learning.

For training the machine learning model 402 to be capable of predicting a path to be traveled by a movable object (in other words, generate a predicted path to be traveled by a movable object), for example, the training data 321 may include data indicating a path traveled either actually or virtually by the movable object. For training the machine learning model 402 to be capable of estimating a conversation strategy to fit a user, for example, the training data 321 may include data about a conversation strategy either actually or virtually used between any users. When the machine learning model 402 and the other machine learning model 412 are each built to further receive an input of data indicating a condition, the training data 321 may be associated with data indicating the condition.

2-3. Step S101

In step S101 above, the controller 21 obtains the local learning data 302 including multiple sets of training data 321. The training data 321 may be generated with any method selected as appropriate in each embodiment. For example, various situations in which data is to be generated may be created either actually or virtually, and data reflecting the created various situations can be obtained as the training data 321. The obtained training data 321 may be associated with data indicating a condition (e.g., a category) for discriminating the situation.

The training data 321 may be generated automatically through a computer operation or manually through an operator operation. The training data 321 may be generated by the corresponding local learner apparatus 2 or by a computer other than the corresponding local learner apparatus 2. When each local learner apparatus 2 generates the training data 321, the controller 21 may perform the series of processing steps described above automatically or in response to a manual operation performed on the input device 25 by an operator to obtain the local learning data 302 including multiple sets of training data 321. When another computer generates the training data 321, the controller 21 may obtain the local learning data 302 including multiple sets of training data 321 generated by the other computer through, for example, a network or the storage medium 92. Some sets of training data 321 may be generated by each local learner apparatus 2, and the remaining other sets of training data 321 may be generated by one or more other computers. Any number of sets of training data 321 may be obtained as appropriate in each embodiment.

2-4. Step S102

In step S102 above, the controller 21 performs adversarial learning of the machine learning model 402 and the other machine learning model 412 through adversarial learning using the obtained local learning data 302. An example procedure for the adversarial learning will be described below. In the procedure below, the machine learning model 402 and the other machine learning model 412 each may include a neural network for ease of explanation. The machine learning model 402 and the other machine learning model 412 may have any other configurations. At least one of the machine learning model 402 or the other machine learning model 412 may be a model other than a model including a neural network.

Preprocessing

For preprocessing, the controller 21 prepares the machine learning model 402 and the other machine learning model 412 to be processed. The configurations of the machine learning model 402 and the other machine learning model 412 to be prepared, and the default values of the computational parameters may be preset using a template or may be input by an operator. For retraining, the controller 21 may prepare the machine learning model 402 and the other machine learning model 412 based on training-result data previously obtained through past supervised learning.

Training Discriminative Model Through Machine Learning

The controller 21 first sets the computational parameters for the machine learning model 402 to fixed values and then trains the other machine learning model 412 through machine learning. More specifically, the controller 21 extracts multiple noise elements 323 from a predetermined probability distribution (e.g., a Gaussian distribution). The controller 21 then inputs each of the extracted noise elements 323 into the machine learning model 402 and performs a computational operation of the machine learning model 402. In other words, the controller 21 inputs each noise element into the input layer in the machine learning model 402 and then determines neuronal firing in each of the layers sequentially from the layer on the input end. The controller 21 receives an output from the output layer in the machine learning model 402 as the pseudo-data 325 generated from the noise elements 323. The number of sets of pseudo-data 325 to be generated may be selected as appropriate in each embodiment.

The controller 21 performs a training process for the other machine learning model 412 using the multiple sets of training data 321 and the generated multiple sets of pseudo-data 325 included in the local learning data 302. Through the training process, the other machine learning model 412 is trained to discriminate the source of the received input data, or in other words, to be capable of discriminating the received input data to be either training data 321 or pseudo-data 325. The training process may use, for example, a stochastic gradient descent method or a mini-batch gradient descent method.

More specifically, the controller 21 inputs the pseudo-data 325 generated by the machine learning model 402 into the other machine learning model 412 and performs a computational operation of the other machine learning model 412. In other words, the controller 21 inputs the pseudo-data 325 into the input layer in the other machine learning model 412 and then determines neuronal firing in each of the layers sequentially from the layer on the input end. The controller 21 receives an output from the output layer in the other machine learning model 412 as the output value corresponding to the result from the other machine learning model 412 discriminating the source of the input pseudo-data 325.

In this situation, the input data is the pseudo-data 325, for which the true result is the determination of being pseudo by the other machine learning model 412. The controller 21 calculates the error between the output value obtained from the output layer and the true result for each set of pseudo-data 325 generated by the machine learning model 402. As in the first example above, a loss function may be used to calculate the error.

The controller 21 also inputs the training data 321 included in the local learning data 302 into the other machine learning model 412 and performs a computational operation of the other machine learning model 412. In other words, the controller 21 inputs the training data 321 into the input layer in the other machine learning model 412 and then determines neuronal firing in each of the layers sequentially from the layer on the input end. The controller 21 receives an output from the output layer in the other machine learning model 412 as the output value corresponding to the result from the other machine learning model 412 discriminating the source of the input training data 321.

In this situation, the input data is the training data 321, for which the true result is the discrimination of being true by the other machine learning model 412. The controller 21 calculates the error between the output value obtained from the output layer and the true result for each set of training data 321 included in the local learning data 302. As in the example above, a loss function may be used to calculate the error.

As in the first example above, the controller 21 calculates an error in the values of the computational parameters for the other machine learning model 412 using the gradient of the error in the calculated output value by the error back propagation method. The controller 21 updates the values of the computational parameters for the other machine learning model 412 based on the calculated error. The computational parameters may be updated by the degree adjusted based on the learning rate.

The controller 21 extracts samples from multiple sets of training data 321 included in the local learning data 302 and multiple sets of pseudo-data 325 generated from the machine learning model 402 and performs the series of training steps using the extracted samples. The controller 21 thus adjusts the values of the computational parameters for the other machine learning model 412. The adjustment may be repeated the number of times determined as appropriate.

For example, the controller 21 may repeatedly perform the series of training steps until the sum of the errors between the calculated output values is less than or equal to a threshold as in the first example above. In some embodiments, the controller 21 may repeatedly adjust the values of the computational parameters through the series of training steps described above a predetermined number of times. In this case, the adjustment may be repeated the number of times specified with, for example, a set value in the training program 821 or with an input from an operator.

The controller 21 can thus build the other machine learning model 412 trained to be capable of discriminating the source of the received input data for multiple sets of training data 321 included in the local learning data 302 and multiple sets of pseudo-data 325 generated by the machine learning model 402.

Training Generative Model Through Machine Learning

The controller 21 then sets the computational parameters for the other machine learning model 412 to fixed values and trains the machine learning model 402 through machine learning. In other words, the controller 21 uses the trained other machine learning model 412 to perform a training process for training the machine learning model 402. In the training process, the controller 21 trains the machine learning model 402 to generate data (pseudo-data 325) that lowers the discriminative performance of the other machine learning model 412. The controller 21 trains the machine learning model 402 to generate data for which the true result is the incorrect discrimination of being true by the other machine learning model 412 (in other words, as resulting from the local learning data 302).

More specifically, the controller 21 extracts multiple noise elements 323 from a predetermined probability distribution in the same manner as described above. The controller 21 then inputs each of the extracted noise elements 323 into the machine learning model 402 and performs a computational operation of the machine learning model 402. In other words, the controller 21 inputs each noise element into the input layer in the machine learning model 402 and then determines neuronal firing in each of the layers sequentially from the layer on the input end. The controller 21 receives an output from the output layer in the machine learning model 402 as the pseudo-data 325 generated from the noise elements 323. The number of sets of pseudo-data 325 to be generated may be selected as appropriate in each embodiment. The training process for the machine learning model 402 may also use the pseudo-data 325 generated in training the other machine learning model 412 through machine learning. In this case, the training process for the machine learning model 402 may eliminate the series of processing steps for generating the pseudo-data 325.

The controller 21 then inputs each of the generated sets of pseudo-data 325 into the other machine learning model 412 and performs a computational operation of the other machine learning model 412. In other words, the controller 21 inputs the sets of pseudo-data 325 into the input layer in the other machine learning model 412 and then determines neuronal firing in each of the layers sequentially from the layer on the input end. The controller 21 receives an output from the output layer in the other machine learning model 412 as the output value corresponding to the result from the other machine learning model 412 discriminating the source of the input pseudo-data 325.

In this situation, the true result for the input data is the incorrect discrimination of being true by the other machine learning model 412. The controller 21 calculates the error between the output value obtained from the output layer in the other machine learning model 412 and the true result for each set of pseudo data 325 generated by the machine learning model 402. The controller 21 thus calculates the error in the output value to lower the discriminative performance of the other machine learning model 412. As in the example above, a loss function may be used to calculate the error.

The controller 21 uses the error back propagation method to calculate an error in the values of the computational parameters for the machine learning model 402 by back propagation of the gradient of the error in the calculated output value into the computational parameters for the machine learning model 402 through the other machine learning model 412. The controller 21 updates the value of each computational parameter for the machine learning model 402 based on the calculated error. In the same manner as described above, the values of the computational parameters may be updated by the degree adjusted based on the learning rate.

The controller 21 adjusts the values of the computational parameters for the machine learning model 402 by repeatedly performing the series of training steps described above. The adjustment may be repeated the number of times determined as appropriate. In the same manner as described above, the controller 21 may repeat the series of training steps described above until the calculated sum of the errors between the output values is less than or equal to a threshold, or until the values of the computational parameters may be adjusted repeatedly a predetermined number of times through the series of training steps. The controller 21 thus trains the machine learning model 402 to generate data that lowers the discriminative performance of the other machine learning model 412.

Repeating Training Process

The controller 21 alternately performs the training process for the other machine learning model 412 and the training process for the machine learning model 402. The processes may be performed alternately the number of times determined as appropriate. The processes may be performed repeatedly the number of times specified with, for example, a set value in the training program 821 or with an input from an operator. When the data indicating a condition is associated with the training data 321, the data indicating the condition may be further input into each of the machine learning model 402 and the other machine learning model 412 in the corresponding training processes.

The accuracy of each of the other machine learning model 412 and the machine learning model 402 can be increased alternately. Thus, the machine learning model 402 is trained to be capable of generating pseudo-data 325 to fit the training data 321 included in the local learning data 302. In other words, the controller 21 generates the trained machine learning model 452 capable of generating pseudo-data 325 to fit the training data 321 included in the local learning data 302. For predicting a path to be traveled by a movable object, for example, the trained machine learning model 452 is trained to be capable of generating data indicating the predicted path to be traveled by the movable object.

2-5. Others

When the method of machine learning is unsupervised learning, the machine learning model 40 may not be the model generated as described above but may be a different model. The method of machine learning may be, for example, clustering. The machine learning model 40 may include a one-class support vector machine, a self-organizing map, or another discriminative model.

3. Third Example

Figure 7C:
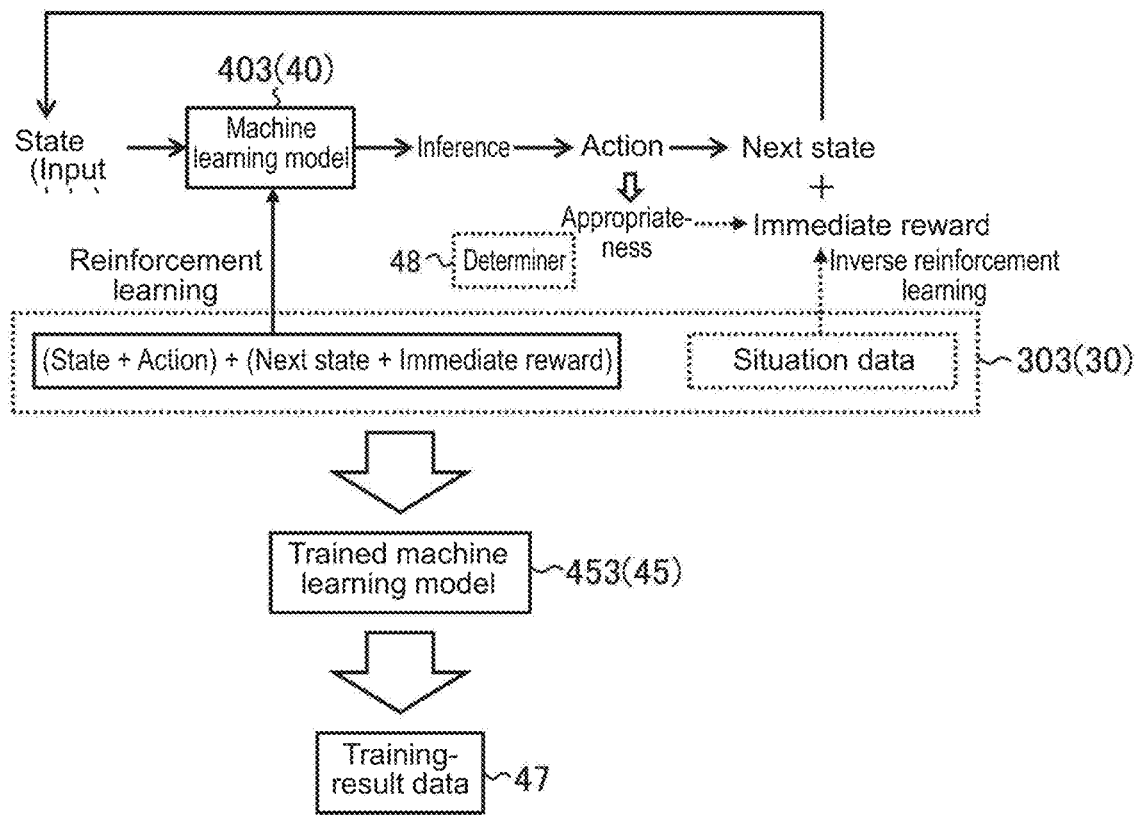
FIG. 7C is a diagram further illustrating a machine learning model and a machine learning method according to one or more embodiments.

FIG. 7C is a schematic diagram of a machine learning model 40 showing its configuration and a machine learning method in a third example. In the third example, the method of machine learning may be reinforcement learning. In FIG. 7C, examples of the local learning data 30, the machine learning model 40, and the trained machine learning model 45 are local learning data 303, a machine learning model 403, and a trained machine learning model 453 for ease of explanation.

3-1. Example Configuration of Machine Learning Model

In the third example, the machine learning model 403 may be value-based, policy-based, or both value-based and policy-based. The machine learning model 403 being value-based may include a value function, such as a state-value function or an action-value function (Q function). The state-value function returns the value of a given state. The action-value function returns the value of each action in a given state. The machine learning model 403 being policy-based may include a policy function. The policy function returns the probability of selecting each action in a given state. The machine learning model 403 being both value-based and policy-based may include a value function (critic) and a policy function (actor). Each function may include a data table or a functional expression. The machine learning model 403 being a functional expression may include a neural network, a linear function, or a decision tree.

3-2. Example Structure of Local Learning Data

Reinforcement learning uses an agent defined to interact with a training environment through an action in accordance with a policy. An agent is, for example, a CPU. The machine learning model 403 has the structure described above and operates as a policy to determine an action. The agent observes a state for an action to be reinforced in a defined training environment.

The details of the state to be observed and the action to be performed may be set as appropriate for the details of the inference to be learned by the machine learning model 403. For estimating an optimum observation method with a sensor, for example, the state to be observed may be an observation state with the sensor, and the action to be performed may be a change in the observation state with the sensor. For predicting a path to be traveled by a movable object, for example, the state to be observed may be information about the path to be traveled by the movable object, and the action to be performed may be the travel of the movable object. For estimating a conversation strategy to fit a user, for example, the state to be observed may be related to a conversational action of the user, and the action to be performed may be a conversation with the user. For estimating a motion command for a robot device to fit a task, for example, the state to be observed may be information about a situation of at least either the inside or the outside of the robot device, and the action to be performed may be an operation based on the motion command. The training environment may be created manually or automatically as appropriate.

The agent uses the machine learning model 403 to perform predetermined inference on the observed current state (input data) and determines an action to be performed based on the obtained inference result. The action to be performed may be determined randomly. The state to be observed changes to the next state once the determined action is performed. The agent may possibly receive an immediate reward from the training environment.

Through repeated trial and error for determining and performing the action, the agent updates the machine learning model 403 to maximize the total immediate reward (referred to as the value). This reinforces an optimum action, or more specifically an action expected to obtain a high value, and defines a policy (trained machine learning model 453) that enables the selection of such an action.

In reinforcement learning, the local learning data 303 includes state-change data resulting from the trial-and-error process. The state-change data indicates a state change from the current state to the next state through the action, from which an immediate reward may possibly be obtained. A single set of state-change data may be data representing the trajectories of all state changes for a single episode, or may be data representing state changes of a predetermined number of times (one or more times).

A reward function may be used to calculate an immediate reward in accordance with the state change. The reward function may be expressed using, for example, a data table, a functional expression, or a rule. The reward function being a functional expression may include a neural network, a linear function, or a decision tree. The reward function may be manually defined, for example, by an operator, in accordance with the details of the inference to be learned by the machine learning model 403.

In some embodiments, the reward function may be defined to provide an immediate reward based on the appropriateness of an inference result (or a determined action) obtained for the machine learning model 403. The appropriateness of an inference result may be expressed in a predetermined number of grades, such as five grades or ten grades. In some embodiments, the appropriateness of an inference result may be expressed using a set of continuous values. The appropriateness of an inference result may be provided manually by, for example, an operator. In some embodiments, the appropriateness of an inference result may be evaluated based on a predetermined criterion using a determiner 48. The predetermined criterion may be defined as appropriate for the details of the inference. The determiner 48 may have the structure defined as appropriate to evaluate the appropriateness of an inference result based on a predetermined criterion.

For inspecting a product using image data, for example, the machine learning model 403 may be trained through reinforcement learning to be capable of estimating an optimum method for observing with a camera for detecting any defect in the product. An example situation in which an optimum observation method with a sensor is estimated includes estimating the optimum observation method with the camera. Multiple products having different defects may be prepared to create different environments for reinforcement learning, in which the products are photographed with the camera.

The predetermined criterion may be used to determine whether a defect can be detected in each product from the image data obtained with the camera. The determiner 48 may include a detector that can detect a defect in each product from image data. The detector may detect a defect through image processing such as edge detection or may include a trained machine learning model such as a neural network.

The reward function may be defined to calculate an immediate reward based on the detection accuracy of a defect by the detector. In one example, such defect detection may be performed multiple times as trial with a detector using image data obtained with the camera. The reward function may return, based on the results of multiple trials of defect detection, a value indicating a positive immediate reward in response to a success probability greater than or equal to a threshold, and a value indicating a negative immediate reward (penalty) in response to a failure in defect detection. The number of trials and the threshold as a criterion for providing a positive immediate reward may be determined with a set value in a program or with a manual operation by an operator.

In other situations as well, the reward may be defined in accordance with the appropriateness of the inference result. For predicting a path to be traveled by a movable object, for example, such path prediction may be performed multiple times as trial. The reward function returns, based on the results of multiple trials of prediction, a value indicating a positive immediate reward in response to the accuracy of prediction greater than or equal to a threshold, and a value indicating a negative immediate reward (penalty) in response to the accuracy of prediction less than a permissible value. For estimating a conversation strategy to fit a user, for example, such strategy estimation may be performed multiple times as trial. The reward function returns, based on the results of multiple trials of estimation, a value indicating a positive immediate reward in response to the accuracy of estimation greater than or equal to a threshold, and a value indicating a negative immediate reward (penalty) in response to the estimation accuracy less than a permissible value. In estimating a motion command for a robot device to fit a task as well, the reward function may be defined in the same manner as described above. The appropriateness may be evaluated with any method other than the above method based on the accuracy of an inference result. In estimating an optimum observation method with a sensor, for example, the time taken by the sensor to measure the same target is to be shorter. The reward function may thus be defined to return an immediate reward with a more negative value in response to a longer time taken for the observation with the sensor and an immediate reward with a more positive value in response to a shorter time taken for the observation with the sensor. In this manner, the reward function may be defined to return a higher immediate reward for a result that is more intended and a lower or a more negative immediate reward for a result that is less intended.

In some embodiments, the reward function may be estimated through inverse reinforcement learning using situation data obtained from an expert. The situation data may be data representing a demonstration by an expert (its trajectory). For estimating an optimum observation method with a sensor, the situation data may include data indicating a method of changing the sensor obtained by an operation performed by an expert. For predicting a path to be traveled by a movable object, for example, the situation data may include data indicating a path traveled actually by the movable object. For estimating a conversation strategy to fit a user, for example, the situation data may include data indicating a conversation strategy specified by an expert. For estimating a motion command for a robot device to fit a task, for example, the situation data may include data representing the trajectory of the robot device operated by an expert. The situation data may be generated with any method selected as appropriate in each embodiment. For example, the situation data may be generated by storing the trajectory of a demonstration performed by an expert using, for example, a sensor.

The method of inverse reinforcement learning may be selected as appropriate in each embodiment. Example methods of inverse reinforcement learning include maximum entropy reinforcement learning, minimum relative entropy reinforcement learning, and reinforcement learning using adversarial generative networks (e.g., Justin Fu, et al., Learning Robust Rewards with Adversarial Inverse Reinforcement Learning, arXiv:1710.11248, 2018). For the reward function using inverse reinforcement learning, the local learning data 303 may further include situation data used for inverse reinforcement learning.

3-3. Steps S101 and S102

In step S101 above, the controller 21 may obtain the state-change data through the trial-and-error process using the trained machine learning model 403 that is being trained. In some embodiments, the controller 21 may obtain the state-change data generated by another computer. In this case, the controller 21 may obtain the state-change data generated by the other computer through, for example, a network or the storage medium 92 in step S101 above.

In step S102 above, the controller 21 updates the values of the computational parameters for the machine learning model 403 to maximize the value based on the obtained state-change data. The values of the computational parameters for the machine learning model 403 may be adjusted with any method selected as appropriate for the configuration of the machine learning model 403. For the machine learning model 403 including a neural network, for example, the values of the computational parameters for the machine learning model 403 may be adjusted in a manner similar to the manner described in the first and second examples above by, for example, the error back propagation method.

The controller 21 repeats the processing in steps S101 and S102 and adjusts the value of each computational parameter for the machine learning model 403 to maximize the resultant value (expected value) (e.g., until the update is less than or equal to a threshold). More specifically, training the machine learning model 403 includes repeatedly correcting the value of each computational parameter for the machine learning model 403 to have a higher reward until the predetermined condition is satisfied. The controller 21 can thus generate a trained machine learning model 453 capable of performing predetermined inference (determining an action expected to yield a high value in the third example). For estimating the above optimum observation method with the sensor, for example, a trained machine learning model 453 capable of estimating the method of changing from the current measurement state of the sensor to the appropriate measurement state can be generated.

For the machine learning model 403 being value-based, the method of reinforcement learning may be a temporal difference (TD) method, a TD($\lambda$) method, a Monte Carlo method, or dynamic programming. The action may be determined by trial and error through on-policy learning or off-policy learning. Example methods of reinforcement learning include Q-learning and SARSA. In trial and error, a random action may be used with probability E (epsilon-Greedy learning).

For the machine learning model 403 being policy-based, the method of reinforcement learning may be a policy gradient method. In this case, the controller 21 calculates the gradients of the computational parameters for the policy function to yield a higher value and updates the values of the computational parameters for the policy function based on the calculated gradients. The gradients for the policy function may be calculated using, for example, the REINFORCE algorithm.

For the machine learning model 403 being both value-based and policy-based, the method of reinforcement learning may be an actor critic method.

For inverse reinforcement learning, the controller 21 further obtains situation data in step S101 above before the above reinforcement learning process. The situation data may be generated by each local learner apparatus 2 or by another computer. When the situation data is generated by another computer, the controller 21 may obtain the situation data generated by the other computer through, for example, a network or the storage medium 92. The controller 21 then performs inverse reinforcement learning using the obtained situation data to define a reward function. The controller 21 uses the reward function defined through inverse reinforcement learning to perform the above reinforcement learning process. The controller 21 can thus generate a trained machine learning model 453 capable of performing predetermined inference using the reward function defined through inverse reinforcement learning.

4. Brief Summary

In the present embodiment, the machine learning model 40 may have at least one configuration selected from the three configurations described above. The controller 21 using at least one of the three methods of machine learning described above can generate the trained machine learning model 45 capable of performing predetermined inference (trained to be capable of performing predetermined inference). After generating the trained machine learning model 45, the controller 21 advances the processing to step S103.

Step S103

In step S103, the controller 21 operates as the environment data obtainer 212 and obtains learning-environment data 35 associated with an environment in which the local learning data 30 is obtained. The attributes of the environment in which the local learning data 30 is obtained may include any factor possibly relevant to inference, such as any attribute of the object or the user directly or indirectly relevant to the predetermined inference. The learning-environment data 35 is of the same type as the environment data 63 obtained by the inference apparatus 1.

The details of the learning-environment data 35 may be selected as appropriate for the details of the environment to be reflected in the combining process performed by the inference apparatus 1. For estimating an optimum observation method with a sensor, for example, the learning-environment data 35 may include information about an environmental attribute (e.g., brightness and temperature) that affects the observation with the sensor. For estimating a conversation strategy to fit a user, for example, the learning-environment data 35 may include information about the attributes of the user (e.g., age, gender, occupation, hometown, and personality).

The learning-environment data 35 may be obtained with any method selected as appropriate in each embodiment. For example, the learning-environment data 35 may be obtained based on an input from an operator, such as a user, through the input device 25. For example, the learning-environment data 35 may be obtained with a sensor.

The learning-environment data 35 may be obtained with a sensor as observation data obtained directly with the sensor or as data resulting from any information processing (e.g., feature extraction) performed on the observation data. An example situation of performing information processing on the observation data includes obtaining information about the gender of a user as the learning-environment data 35 in estimating a conversation strategy to fit the user. In this case, the controller 21 may use a camera as the sensor for obtaining the learning-environment data 35 and may obtain image data including the face of the user. The controller 21 may then perform image processing on the obtained image data and estimates the gender from the face. The controller 21 may obtain information about the gender of the user based on the result from the estimation process.

The learning-environment data 35 may be obtained in any route selected as appropriate in each embodiment. The controller 21 may directly obtain the learning-environment data 35 through, for example, the external interface 24 and the input device 25. In some embodiments, the controller 21 may obtain the learning-environment data 35 indirectly through, for example, a network or the storage medium 92.

After obtaining the learning-environment data 35, the controller 21 advances the processing to step S104. The processing in step S103 may be performed at the time not limited to the above example. The processing in step S103 may be performed at any selected time before the processing in the subsequent step S104 is performed.

Step S104

The controller 21 operates as the storing unit 214 and generates information about the generated trained machine learning model 45 as the training-result data 47. In the examples of FIGS. 7A to 7C, the controller 21 generates information about the generated trained machine learning models 451 to 453 as the training-result data 47. The information about the trained machine learning model 45 may include information indicating the configuration of the trained machine learning model 45 and information indicating the values of the computational parameters adjusted by machine learning. The controller 21 stores, into a predetermined storage area, the generated training-result data 47 in a manner associated with the learning-environment data 35.

The predetermined storage area may be, for example, the RAM in the controller 21, the storage 22, an external storage, a storage medium, or a combination of these. The storage medium is, for example, a CD or a DVD. The controller 21 may store the training-result data 47 into the storage medium through the drive 27. The controller 21 may store the generated training-result data 47 into an external storage including a data server, such as a network attached storage (NAS). In this case, the controller 21 may use the communication interface 23 to store the training-result data 47 into a data server through a network. The external storage may be connected to each local learner apparatus 2.

Upon storage of the training-result data 47, the controller 21 ends the series of information processing steps for generating the trained machine learning model 45.

The training-result data 47 and the learning-environment data 35 may be provided to the inference apparatus 1 at any selected time. For example, the controller 21 may transfer the training-result data 47 and the learning-environment data 35 to the inference apparatus 1 in step S104 or in a step separate from step S104. The controller 11 included in the inference apparatus 1 may receive the transferred data to obtain the training-result data 47 and the learning-environment data 35. In another example, the controller 11 may use the communication interface 13 to access each local learner apparatus 2 or a data server through a network and obtain the training-result data 47 and the learning-environment data 35. In still another example, the controller 11 may obtain the training-result data 47 and the learning-environment data 35 through the storage medium 91. For example, the inference apparatus 1 may prestore the training-result data 47 and the learning-environment data 35.

Further, the controller 21 may regularly update or newly generate the training-result data 47 and the learning-environment data 35 by periodically repeating the processing in steps S101 to S104 above. During the repeated processes, the local learning data 30 may undergo changes, modifications, additions, and deletions as appropriate. The controller 21 may provide the updated or newly generated training-result data 47 and learning-environment data 35 to the inference apparatus 1 through every training process to regularly update the training-result data 47 and the learning-environment data 35 held by the inference apparatus 1.

(B) Inference Process

An operation example of each local learner apparatus 2 for performing predetermined inference will now be described with reference to FIG. 8. FIG. 8 is a flowchart of a procedure performed by each local learner apparatus 2 for predetermined inference. However, the procedure below is a mere example, and each of its steps may be modified in any possible manner. In the procedure below, steps may be eliminated, substituted, or added as appropriate in each embodiment.

Step S111

In step S111, the controller 21 operates as the target data obtainer 216 and obtains target data 225 usable in predetermined inference. The target data 225 is of the same type as the target data 61 obtained by the inference apparatus 1.

The details of the target data 225 may be selected as appropriate for the details of the predetermined inference. For estimating an optimum observation method with a sensor, for example, the target data 225 may include, as information about the current observation state with the sensor, information about the attributes of the current installation state of the sensor (e.g., the installation angle of the sensor and the distance between the sensor and the observation target). For estimating a conversation strategy to fit a user, the target data 225 may include information about the conversational action of the user obtained by an input device (e.g., a keyboard or a touchscreen), a camera, and a microphone. For the trained machine learning model 45 being a generative model, the target data 225 may include noise extracted from a predetermined probability distribution.

The target data 225 may be obtained with any method selected as appropriate in each embodiment. For example, the target data 225 may be obtained based on an input from an operator, such as a user, through the input device 25. For example, the target data 225 may be obtained with a sensor.

Similarly to the learning-environment data 35, the target data 225 may be obtained with a sensor as observation data obtained directly with the sensor or as data resulting from information processing performed on the observation data. An example situation of performing the information processing on the observation data includes obtaining a character string representing a speech of a user as the target data 225 in estimating a conversation strategy to fit the user. In this case, the controller 21 may use a microphone as the sensor for obtaining the target data 225 and may obtain sound data including the speech of the user. The controller 21 may perform speech analysis on the obtained sound data. The controller 21 may obtain the character string representing the speech of the user based on the result from the speech analysis.

Further, the learning-environment data 35 and the target data 225 may be derived from the same observation data obtained with the same sensor, or may be derived from different sets of observation data obtained with different sensors. An example situation derived from the same observation data includes using a video camera in estimating a conversation strategy to fit the user. In this case, the controller 21 may estimate the gender of the user from the image data obtained with the video camera and obtain information about the estimated gender of the user as the learning-environment data 35. The controller 21 may also obtain, as the target data 225, a character string representing a speech of the user obtained by analyzing the character string representing the user speech from sound data obtained with the video camera.

The target data 225 may be obtained in any route selected as appropriate in each embodiment. The controller 21 may directly obtain the target data 225 through, for example, the external interface 24 and the input device 25. In some embodiments, the controller 21 may obtain the target data 225 indirectly through, for example, a network or the storage medium 92.

After obtaining the target data 225, the controller 21 advances the processing to step S112.

Step S112

In step S112, the controller 21 operates as the inference unit 217 and performs the predetermined inference on the obtained target data 225 using the inference model derived from the local learning data 30. In the present embodiment, the controller 21 includes the trained machine learning model 45 stored as the training-result data 47. The controller 21 refers to the training-result data 47 to define the trained machine learning model 45. The controller 21 then inputs the target data 225 into the trained machine learning model 45 and performs a computational operation of the trained machine learning model 45.

The computational operation may be selected as appropriate for the structure of the trained machine learning model 45. For the trained machine learning model 45 being a functional expression, the controller 21 substitutes the target data 225 into the functional expression and performs a computational operation of the functional expression. For the trained machine learning model 45 including a neural network, the controller 21 inputs the target data 225 into the input layer and then determines neuronal firing in each of the layers sequentially from the layer on the input end. For the trained machine learning model 45 including a data table, the controller 21 checks the target data 225 with the data table.

The controller 21 receives an output from the trained machine learning model 45 (an execution result from a computational operation) as the result from the predetermined inference performed on the target data 225. The inference result obtained depends on the capability learned by the trained machine learning model 45. For training the trained machine learning model 45 to be capable of estimating the above optimum observation method with the sensor, for example, the controller 21 can obtain information about the method of changing from a current observation state with the sensor to an appropriate observation state with the sensor. After obtaining the estimation result, the controller 21 advances the processing to step S113.

Step S113

In step S113, the controller 21 operates as the output unit 218 and outputs information about the inference result for the target data 225.

The output destination and the details of the information to be output may be selected as appropriate in each embodiment. For example, the controller 21 may output the result from the predetermined inference performed on the target data 225 in step S112 directly to the output device 26. For example, the controller 21 may perform information processing based on the result from the predetermined inference. The controller 21 may then output the processed information as information about the inference result. The processed information being output may include a specific message being output in accordance with the inference result, and the operation of a control target device being controlled in accordance with the inference result. The information may be output to, for example, the output device 26, an output device for another computer, or a control target device.

Upon output of the information about the inference result, the controller 21 ends the series of information processing steps for the predetermined inference. The controller 21 may continuously and repeatedly perform the series of information processing steps S111 to S113 for a predetermined period of time. The processing may be repeated at any selected time. Each local learner apparatus 2 may thus continuously perform the predetermined inference.

Inference Apparatus

An operation example of the inference apparatus 1 for predetermined inference will now be described with reference to FIG. 9A. FIG. 9A is a flowchart of a procedure performed by the inference apparatus 1 for predetermined inference. The procedure described below is an example of an inference method in an aspect of the present invention. However, the procedure below is a mere example, and each of its steps may be modified in any possible manner. In the procedure below, steps may be eliminated, substituted, or added as appropriate in each embodiment.

Steps S201 and S202

In step S201, the controller 11 operates as the first data obtainer 111 and obtains predetermined target data 61 usable in predetermined inference. The processing for obtaining the target data 61 in step S201 may be the same as the processing for obtaining the target data 225 in step S111 above, except its difference in the processing environment.

More specifically, the details of the target data 61 may be selected as appropriate for the details of the predetermined inference. The method and the route for obtaining the target data 61 may be selected as appropriate in each embodiment. The target data 61 may be obtained based on an input from an operator through the input device 15. The target data 61 may be obtained with the same type of sensor as the sensor used to obtain the target data 225. The target data 61 may be obtained with a sensor as observation data obtained directly with the sensor or as data resulting from information processing performed on the observation data. The controller 11 may directly obtain the target data 61 through, for example, the external interface 14 or the input device 15 or may indirectly obtain the target data 61 through, for example, a network or the storage medium 91.

In step S202, the controller 11 operates as the second data obtainer 112 and obtains environment data 63 about a target environment in which the predetermined inference is to be performed. The processing for obtaining the environment data 63 in step S202 may be the same as the processing for obtaining the learning-environment data 35 in step S103 above, except its difference in the processing environment.

More specifically, the details of the environment data 63 may be selected as appropriate for the details of the environment to be reflected in the combining process. The method and the route for obtaining the environment data 63 may be selected as appropriate in each embodiment. The environment data 63 may be obtained based on an input from an operator through the input device 15. The environment data 63 may be obtained with the same type of sensor as the sensor used to obtain the learning-environment data 35. The environment data 63 may be obtained with a sensor as observation data obtained directly with the sensor or as data resulting from information processing performed on the observation data. The target data 61 and the environment data 63 obtained with sensor(s) may be derived from the same observation data obtained with the same sensor or may be derived from different sets of observation data obtained with different sensors. The controller 11 may directly obtain the environment data 63 through, for example, the external interface 14 or the input device 15 or may indirectly obtain the environment data 63 through, for example, a network or the storage medium 91.

The environment data 63 is obtained for the target environment in which the target data 61 is obtained, whereas the learning-environment data 35 is obtained for the environment in which the local learning data 30 is obtained. The local learning data 30 stores the same type of data as the target data 61 (e.g., the training data 311 described above). Thus, the learning-environment data 35 may have a larger coverage than the environment data 63. For example, the learning-environment data 35 may store attributes of the environment, such as time, location, an object, and a user. The environment data 63 and the learning-environment data 35 may be in formats that are different but allow comparison between their respective environments.

Through the above processing, the controller 11 obtains the target data 61 and the environment data 63. Steps S201 and S202 may be performed in any order. Either step S201 or step S202 may be performed earlier. Step S201 and step S202 may be performed in parallel. After obtaining the target data 61 and the environment data 63, the controller 11 advances the processing to step S203.

Step S203

In step S203, the controller 11 operates as the result obtainer 113 and inputs the target data 61 into multiple inference models to cause the inference models derived from local learning data 30 obtained in a different environment to perform predetermined inference using the target data 61. The controller 11 thus obtains an inference result for the obtained target data 61 from each inference model.

Each inference model in the present embodiment includes each trained machine learning model 45 generated by the corresponding local learner apparatus 2. In the present embodiment, the inference apparatus 1 includes each trained machine learning model 45 stored as the corresponding set of training-result data 47 generated by the corresponding local learner apparatus 2. The controller 11 refers to each set of training-result data 47 to define the corresponding trained machine learning model 45. The controller 11 then inputs target data 61 into each trained machine learning model 45 and performs a computational operation of each trained machine learning model 45. The computational operation of each trained machine learning model 45 may be the same as the computational operation of the trained machine learning model 45 in step S112 above. The controller 11 can receive an output from each trained machine learning model 45 as the inference result from each trained machine learning model 45 for the target data 61. The trained machine learning model 45 to be used for the inference process may be selected as, for example, specified by an operator. After obtaining an inference result from each trained machine learning model 45 for the target data 61, the controller 11 advances the processing to step S204.

Step S204

In step S204, the controller 11 operates as the combiner 114 and combines the inference result from each inference model obtained in step S203 together under the combining rule 5. In the present embodiment, the controller 11 combines the inference result from each trained machine learning model 45 together under the combining rule 5. The controller 11 thus generates the inference result for the target data 61 in the target environment.

In the present embodiment, the controller 11 has information about the combining rule 5 stored as the combining-rule data 57. The combining rule 5 includes multiple combining parameters P each defining the priority on the inference result from the corresponding trained machine learning model 45 in the target environment. The controller 11 refers to the combining-rule data 57 to define the combining rule 5. The controller 11 thus combines the inference result from each trained machine learning model 45 together under the combining rule 5 through the processing described below.

Figure 9B:
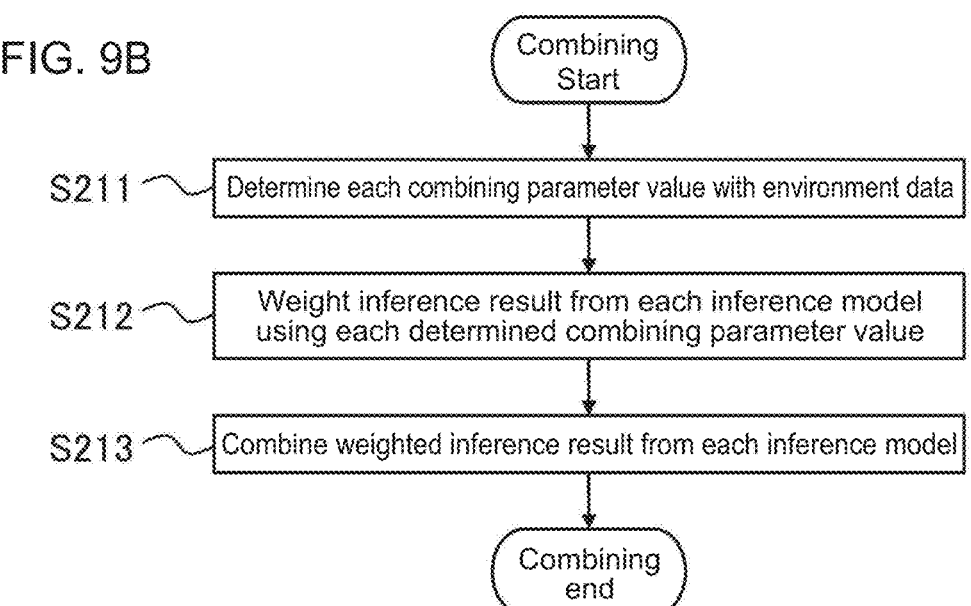
FIG. 9B is a flowchart illustrating a subroutine for a combining procedure performed by an inference apparatus according to one or more embodiments.

FIG. 9B is a flowchart of a subroutine for the combining process in step S204. The processing in step S204 in the present embodiment includes the processing in steps S211 to S213 described below. However, the procedure below is a mere example, and each of its steps may be modified in any possible manner. In the procedure below, steps may be eliminated, substituted, or added as appropriate in each embodiment.

In step S211, the controller 11 determines the value of each combining parameter P in accordance with the obtained environment data 63. The method for determining the value of each combining parameter P will be described in detail later. The value of each combining parameter P may be determined based further on the target data 61, in addition to the environment data 63. More specifically, the controller 11 may determine the value of each combining parameter P in accordance with the target data 61 and the environment data 63.

In step S212, the controller 11 weights the inference result from each combining parameter using the determined value of the corresponding combining parameter P. In step S213, the controller 11 combines the weighted inference result from each inference model together. In the present embodiment, the controller 11 weights the inference result from each trained machine learning model 45 using the determined value of the corresponding combining parameter P. The controller 11 then combines the weighted inference result from each trained machine learning model 45 together.

The inference results may be weighted and combined together in any manner that prioritizes the inference results in accordance with the weights, and may be selected as appropriate in each embodiment. For example, combining the weighted inference result from each trained machine learning model 45 may include calculating the average of the weighted values of the inference results from the trained machine learning models 45. For example, combining the weighted inference result from each trained machine learning model 45 may include selecting one inference result from the inference results from the trained machine learning models 45 based on majority rules after the inference results are weighted. For the predetermined inference being regression, combining each inference result together may mainly include averaging of the weighted values as described above. For the predetermined inference being discrimination, combining each inference result together may mainly include the selection based on majority rules after the weighting as described above.

Upon combining each inference result together in step S213, the controller 11 ends the subroutine for the combining process in step S204. The controller 11 can thus generate the inference result for the target data 61 in the target environment. After generating the inference result through the combining process, the controller 11 advances the processing to step S205.

Step S205

Referring back to FIG. 9A, in step S205, the controller 11 operates as the output unit 115 and outputs information about the generated inference result. The processing for outputting the information in step S205 may be the same as the processing for outputting the information in step S113 above, except its difference in the processing environment.

More specifically, the output destination and the details of the information to be output may be selected as appropriate in each embodiment. For example, the controller 11 may output the inference result generated in step S204 directly to the output device 16. For example, the controller 11 may perform information processing based on the generated inference result. The controller 11 may then output the processed information as information about the inference result. The processed information being output may include a specific message being output in accordance with the inference result, and the operation of a control target device being controlled in accordance with the inference result. The information may be output to, for example, the output device 16, an output device for another computer, or a control target device.

Upon output of the information about the inference result, the controller 11 ends the series of information processing steps for the predetermined inference. The controller 11 may continuously and repeatedly perform the series of information processing steps S201 to S205 for a predetermined period of time. The processing may be repeated at any selected time. The inference apparatus 1 may thus continuously perform the predetermined inference.

Determining Values of Combining Parameters

An example method for determining the value of each combining parameter P in step S211 above will now be described. In the present embodiment, the controller 11 can determine the value of each combining parameter P with at least one of the three methods described below.

(1) First Method

Figure 10A:
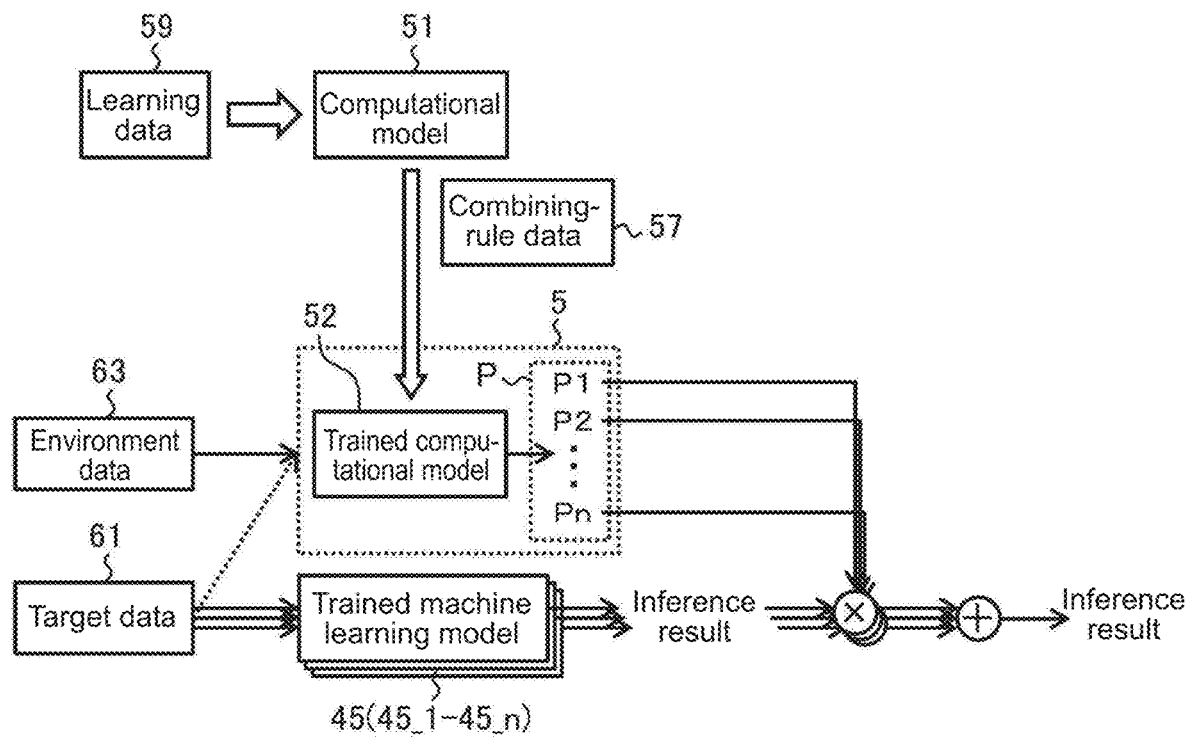
FIG. 10A is a describing illustrating a method for determining values of combining parameters in one or more embodiments.

FIG. 10A is a schematic block diagram describing a situation of determining each combining parameter P with a first method. With the first method, the controller 11 uses a computational model to calculate the value of each combining parameter P using the environment data 63 (and the target data 61).

(1-1) Determining Values of Combining Parameters

In the present embodiment, the controller 11 trains the computational model 51 through machine learning using the learning data 59. The computational model 51 may include a data table or a functional expression, similarly to the machine learning model 40 described above. The controller 11 trains (generates), through machine learning, the computational model 51 to cause the value of each calculated combining parameter P to fit the predetermined inference in the target environment. With the first method, the combining rule 5 further includes the trained computational model 52 built through the machine learning. The information about the trained computational model 52 may be stored as at least a part of the combining-rule data 57, or may be stored separately from the combining-rule data 57.

In step S211 above, the controller 11 refers to the information as appropriate to define the trained computational model 52. The controller 11 inputs the environment data 63 into the trained computational model 52 and performs a computational operation of the trained computational model 52. For the process based further on the target data 61, the controller 11 further inputs the target data 61 into the trained computational model 52 and performs a computational operation of the trained computational model 52. The computational operation of each trained computational model 52 may be the same as the computational operation of the trained machine learning model 45 described above. The controller 11 can receive an output from the trained computational model 52 as the value of each combining parameter P for each inference model. After obtaining the value of each combining parameter P in the present embodiment, the controller 11 combines the inference result from each trained machine learning model 45 together by performing the processing in step S212 and subsequent steps.

(1-2) Training Computational Model through Machine Learning

Figure 10B:
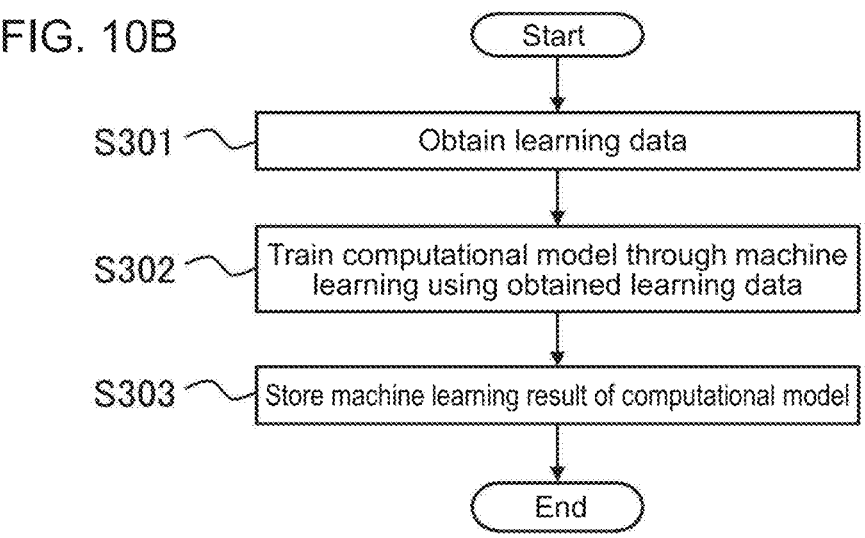
FIG. 10B is a flowchart illustrating a machine learning procedure for a computational model used to determine values of combining parameters in one or more embodiments.

An operation example of the inference apparatus 1 for generating the trained computational model 52 will now be described. FIG. 10B is a flowchart of a procedure performed by the inference apparatus 1 for generating the trained computational model 52. However, the procedure below is a mere example, and each of its steps may be modified in any possible manner. In the procedure below, steps may be eliminated, substituted, or added as appropriate in each embodiment.

Steps S301 and S302

In step S301, the controller 11 operates as the learning data obtainer 116 and obtains the learning data 59 to be used for training the computational model 51 through machine learning. In step S302, the controller 11 operates as the training unit 117 and trains the computational model 51 through machine learning using the obtained learning data 59.

Machine learning in step S302 includes training the computational model 51 to cause the value of each calculated combining parameter P to fit the predetermined inference in the target environment. The computational model 51 is trained through machine learning that may include adjusting the value of each computational parameter of the computational model 51 to yield an intended output to fit the target environment. More specifically, training the computational model 51 to cause the calculated value of each combining parameter P to fit the predetermined inference in the target environment may include adjusting the value of each computational parameter for the computational model 51 to calculate the value of each combining parameter P using the environment data (and the target data) for causing the result from combining the inference result from each inference model (each machine learning model 45) using the calculated value of each combining parameter P to fit the inference result in the target environment through the processing in steps S212 and S213 above. Through the machine learning, the controller 11 generates the trained computational model 52 capable of estimating the value of each combining parameter P to fit the predetermined inference in the target environment using the environment data (and the target data).

The computational model 51 and the method of machine learning may be selected as appropriate in each embodiment. The trained computational model 52 is used to calculate the value of each combining parameter P. In the combining process described above, the inference result from each combining parameter is weighted using the determined value of the corresponding calculated combining parameter P. The inference apparatus 1 generates an inference result through the above combining process. In contrast, the trained machine learning model 45 directly derives an inference result for the target data. The computational model 51 (trained computational model 52) thus differs from the above machine learning model 40 (trained machine learning model 45) in the data to be processed and in the process of obtaining the inference result. The computational model 51 may have the same configuration as and use the same method of machine learning as the machine learning model 40 described above.

The computational model 51 may include a data table or a functional expression. The computational model 51 being a functional expression may include a neural network, a linear function, or a decision tree. The neural network may be of any type that may be selected as appropriate for each embodiment. The neural network for building the computational model 51 may be, for example, a fully connected neural network, a convolutional neural network, a recurrent neural network, or any combination of these networks. Two examples for the configuration of the computational model 51 and the machine learning method will now be described.

I. First Example

Figure 10C:
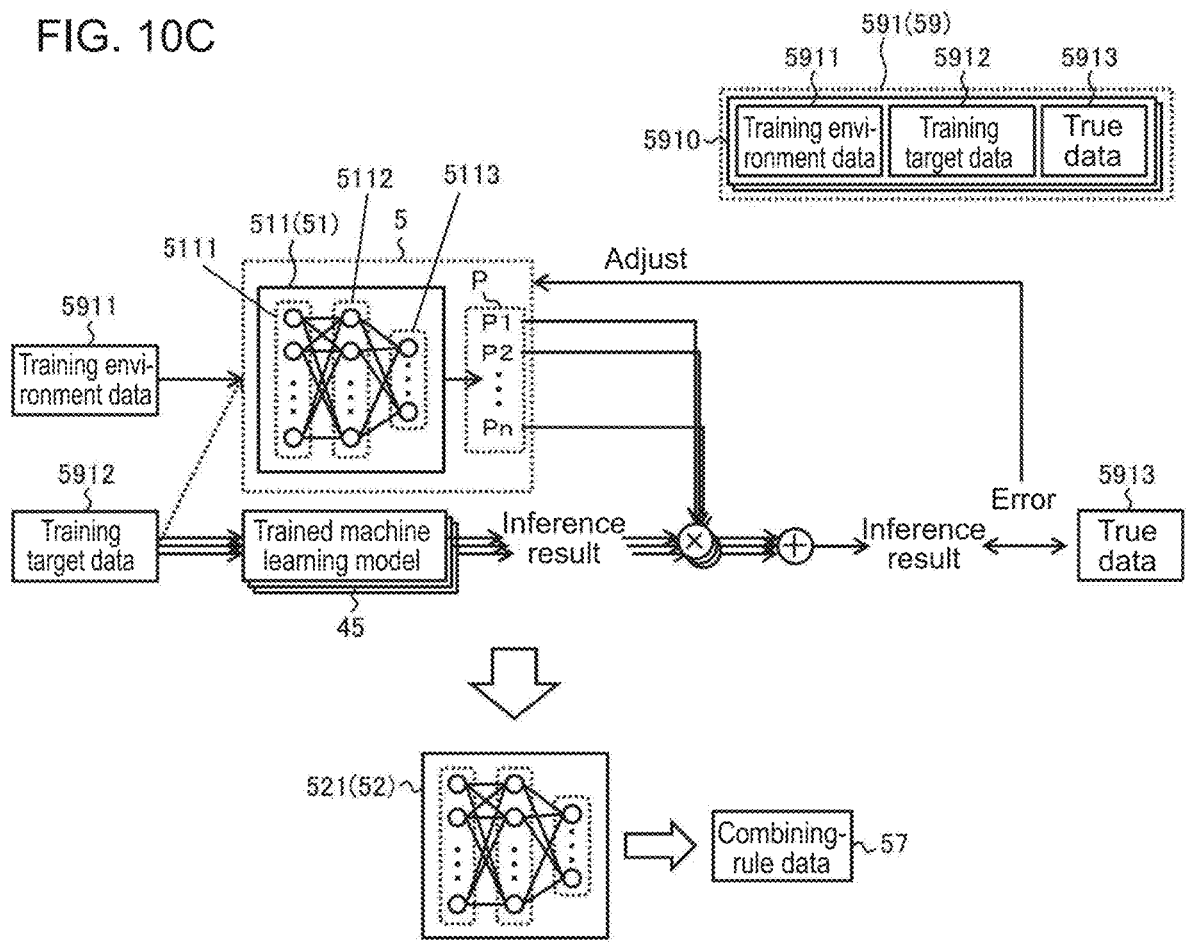
FIG. 10C is a diagram illustrating a computational model and a machine learning method according to one or more embodiments.

FIG. 10C is a schematic diagram of a computational model 51 showing its configuration and a machine learning method in a first example. In the first example, the computational model 51 is a neural network, and the method of machine learning is supervised learning, similarly to the machine learning model 40 in the first example described above. In FIG. 10C, examples of the learning data 59, the computational model 51, and the trained computational model 52 are learning data 591, a computational model 511, and a trained computational model 521 for ease of explanation.

I-1. Example Configuration of Computational Model

In the first example, the computational model 511 includes a three-layered fully coupled neural network. More specifically, the computational model 511 has, in order from its input end, an input layer 5111, intermediate (hidden) layers (5112), and an output layer 5113. Similarly to the machine learning model 401 described above, the configuration of the computational model 511 may be determined as appropriate in each embodiment. For example, the computational model 511 may include two or more intermediate layers. The intermediate layers 5112 may be eliminated. The computational model 511 may also include other layers, such as a convolutional layer, a pooling layer, and a recursion layer. Except these differences, the computational model 511 may be the same as the machine learning model 401 described above. The computational model 511 includes computational parameters including the connection weights between neurons included in each of the layers 5111 to 5113 and the threshold of each neuron.

I-2. Example Structure of Training Data

The learning data 591 used in supervised learning for the computational model 511 includes multiple learning datasets 5910 each including a set of training environment data 5911, training target data 5912, and true data 5913 (supervisory signal). The training environment data 5911 is of the same type as the environment data 63 and is used as training data (input data). The training target data 5912 is of the same type as the target data 61. For the process based further on the target data 61, the training target data 5912 may be used as the training data (input data) together with the training environment data 5911. The true data 5913 indicates a result (true result) from the predetermined inference performed on the training target data 5912 in the target environment. The true data 5913 may be referred to as a label.

The details of the training environment data 5911 may be selected as appropriate for the details of the environment to be reflected in the combining process. The training environment data 5911 may be the same as the environment data 63 except that the training environment data 5911 is obtained for training. The details of the training target data 5912 and the true data 5913 may be selected as appropriate for the details of the inference to be learned by each inference model (trained machine learning model 45). The training target data 5912 may be the same as the target data 61 except that the training target data 5912 is obtained for training. The training target data 5912 and the true data 5913 may be the same as the training data 311 and the true data 312 described above except that the training target data 5912 and the true data 5913 are obtained to reflect the target environment in which the inference apparatus 1 performs the predetermined inference.

I-3. Step S301

In step S301 above, the controller 11 obtains learning data 591 including multiple learning datasets 5910. Each learning dataset 5910 may be generated with any method selected as appropriate in each embodiment. For example, various situations in which predetermined inference is to be performed are created either actually or virtually in the target environment, and the same type of data as the environment data 63 may be obtained in the created various situations as the training environment data 5911. The same type of data as the target data 61 may be obtained as the training target data 5912, together with the training environment data 5911. In the target environment, the predetermined inference is performed on the obtained training target data 5912. In this situation, the predetermined inference may be performed manually by, for example, an operator. The result (true result) from the predetermined inference performed on the training target data 5912 is then associated with the training environment data 5911 and the training target data 5912. Each learning dataset 5910 is generated in this manner.

I-4. Step S302

In step S302 above, the controller 11 trains the computational model 511 through machine learning (supervised learning) using the obtained learning data 591. In the first example, the controller 11 trains, for each set of learning data 591, the computational model 511 through machine learning using the value of each combining parameter P output from the output layer 5113 in response to an input of the training environment data 5911 (and the training target data 5912) into the input layer 5111. The output value of each combining parameter P causes the result from combining the inference result from each inference model (trained machine learning model 45) for the training target data 5912 to fit the true data 5913. The controller 11 thus generates a trained computational model 521 capable of estimating the value of each combining parameter P to fit the predetermined inference in the target environment using the environment data (and the target data).

The specific procedure for supervised learning may be the same as the procedure for the machine learning model 401 described above. The controller 11 first prepares the computational model 511 to be used for machine learning. The configuration of the machine learning model 511 to be prepared and the default values of the computational parameters may be preset using a template or may be input by an operator. For retraining, the controller 11 may prepare the computational model 511 based on the training-result data previously obtained through past supervised learning.

The controller 11 then uses the training environment data 5911 included in each learning dataset 5910 as input data, and uses the true data 5913 as a supervisory signal to perform a training process for training the neural network in the computational model 511. The training process may further use the training target data 5912 as input data. The training process of the computational model 511 may be basically the same as the training process of the machine learning model 401 described above.

In the first step, the controller 11 inputs, for each learning dataset 5910, the training environment data 5911 into the input layer 5111 in the computational model 511. For the process based further on the target data 61, the controller 11 may further input the training target data 5912 into the input layer 5111 included in the computational model 511. The controller 11 then determines neuronal firing in each of the layers 5111 to 5113 sequentially from the layer on the input end. Through the computational operation, the controller 11 obtains, from the output layer 5113, an output value corresponding to the value of each combining parameter P calculated by the computational model 511 being trained in accordance with the training environment data 5911 (and the training target data 5912).

In the second step, the controller 11 performs the processing in step S203 above on the corresponding training target data 5912. More specifically, the controller 11 inputs the corresponding training target data 5912 into each inference model and causes each inference model to perform predetermined inference using the training target data 5912. The controller 11 thus obtains an inference result from each inference model for the training target data 5912. In the present embodiment, the controller 11 obtains an inference result from each trained machine learning model 45 for the target data 5912.

The controller 11 performs the processing in step S204 above on the inference result from each trained machine learning model 45 using the value of each combining parameter P obtained in the first step. More specifically, the controller 11 weights the inference result from each trained machine learning model 45 using the value of the corresponding combining parameter P obtained in the first step. The controller 11 then combines the weighted inference result from each trained machine learning model 45 together. The controller 11 thus generates an inference result in the target environment. The controller 11 then calculates the error between the generated inference result and the true data 5913. A loss function may be used to calculate the error.

In the third step, the controller 11 uses the error back propagation method to calculate an error in the coupling weights between neurons and an error in the values of the computational parameters by back propagation of the gradients of the calculated errors into the computational model 511. In the fourth step, the controller 11 updates the value of each computational parameter for the computational model 511 based on each calculated error. The computational parameters may be updated by the degree adjusted based on the learning rate.

The controller 11 repeats the first to fourth steps to adjust, for each learning dataset 5910, the values of the computational parameters for the computational model 511 using the value of each combining parameter P output from the output layer 5113 in response to an input of the training environment data 5911 (and the training target data 5912) into the input layer 5111. The output value of each combining parameter P causes the result from combining the inference result from each inference model (trained machine learning model 45) for the training target data 5912 to fit the true data 5913. For example, the controller 11 may repeat, for each learning dataset 5910, the above first to fourth steps until the sum of the error of each generated inference result is less than or equal to a threshold. In some embodiments, the controller 11 may repeat the above first to fourth steps a predetermined number of times. The controller 11 can thus generate the trained computational model 521 capable of estimating the value of each combining parameter P to fit the predetermined inference in the target environment using the environment data (and the target data).

I-5. Others

When the method of machine learning is supervised learning, the computational model 511 may not rely on a neural network but may have other configurations. For example, the computational model 511 may be a regression model, a support vector machine, or a decision tree model. The method of supervised learning may be other than described in the above example but may be selected as appropriate for the configuration of the computational model 511.

II. Second Example

Figure 10D:
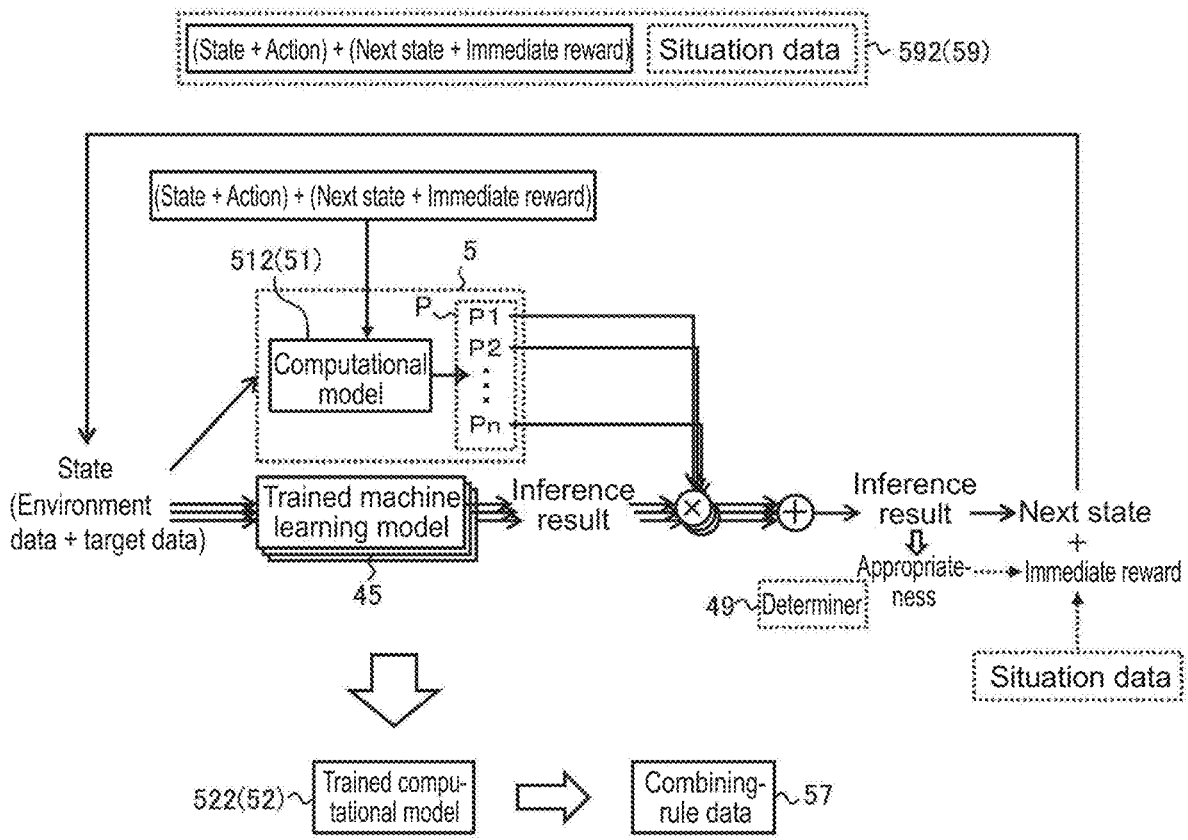
FIG. 10D is a diagram illustrating a computational model and a machine learning method according to one or more embodiments.

FIG. 10D is a schematic diagram of a computational model 51 showing its configuration and a machine learning method in a second example. In the second example, the method of machine learning is reinforcement learning as in the third example for the machine learning model 40. In FIG. 10D, examples of the learning data 59, the computational model 51, and the trained computational model 52 are learning data 592, a computational model 512, and a trained computational model 522 for ease of explanation.

II-1. Example Configuration of Computational Model

The computational model 512 may have the same configuration as the machine learning model 403 described above. The computational model 512 may be value-based, policy-based, or both value-based and policy-based. Each function may include a data table or a functional expression. The computational model 512 being a functional expression may include a neural network, a linear function, or a decision tree.

II-2. Example Structure of Training Data

The method of reinforcement learning of the computational model 512 may be the same as for the machine learning model 403 described above except the data used and the process for deriving an inference result in the target environment. The training environment may be created manually or automatically as appropriate. In training the computational model 512 through reinforcement learning, the states observed by an agent correspond to the environment data 63 and the target data 61.

The agent uses the computational model 512 to calculate the value of each combining parameter P based on the observed current state (input data). As in step S203 above, the agent inputs the target data included in the observed current state into each inference model, and causes each inference model to perform predetermined inference on the target data. The agent thus obtains an inference result from each inference model for the target data. In the present embodiment, the agent obtains an inference result from each trained machine learning model 45 for the target data. The agent then weights the inference result from each trained machine learning model 45 using the value of the corresponding combining parameter P obtained by the computational model 512. The agent then combines the weighted inference result from each trained machine learning model 45 together. The agent thus generates an inference result in the target environment.

The agent determines an action to be performed based on the generated inference result. In some embodiments, the action to be performed may be determined randomly. The state to be observed changes to the next state once the determined action is performed. The agent may possibly receive an immediate reward from the training environment. Through repeated trial and error for determining and performing the action, the agent updates the computational model 512 to maximize the total immediate reward. This reinforces an optimum action and defines a policy (trained computational model 522) for calculating the value of each combining parameter P that enables the selection of such an action.

In the second example, the learning data 592 includes state-change data resulting from the trial-and-error process. The state-change data indicates the state change from the current state to the next state through the action, from which an immediate reward may possibly be obtained. Similarly to the local learning data 303 described above, a single set of state-change data may be data representing the trajectories of all state changes for a single episode, or may be data representing state changes of a predetermined number of times (one or more times).

Similarly to the machine learning model 403 trained through reinforcement learning described above, the computational model 512 may also be trained through reinforcement learning using a reward function to calculate an immediate reward. The reward function may be expressed using, for example, a data table, a functional expression, or a rule. The reward function being a functional expression may include a neural network, a linear function, or a decision tree. The reward function may be manually defined, for example, by an operator, in accordance with the details of predetermined inference to be performed through the series of processing steps described above.

In some embodiments, the reward function may be defined to provide an immediate reward based on the appropriateness of the inference result obtained through the series of processing steps described above. The appropriateness of an inference result may be expressed in a predetermined number of grades, such as five grades or ten grades. In some embodiments, the appropriateness of an inference result may be expressed using a set of continuous values. The appropriateness of an inference result may be provided manually by, for example, an operator. In some embodiments, the appropriateness of the inference result may be evaluated based on a predetermined criterion using a determiner 49. The predetermined criterion may be the same as for the machine learning model 403 described above. The determiner 49 may be the same as the determiner 48 used in reinforcement learning of the machine learning model 403 described above.

In some embodiments, the reward function may be estimated through inverse reinforcement learning using situation data obtained from an expert. The details of the situation data, the method of generating the situation data, and the method of inverse reinforcement learning may be similar to the situation data used to define the reward function in training the machine learning model 403 through reinforcement learning described above but are not limiting. For the reward function using inverse reinforcement learning, the learning data 592 may further include situation data used for inverse reinforcement learning.

II-3. Steps S301 and S302

In step S301 above, the controller 11 may obtain the state-change data above through the trial-and-error process using the computational model 512 that is being trained. In some embodiments, the state-change data may be generated by another computer. In this case, in step S301 above, the controller 11 may obtain the state-change data generated by the other computer through, for example, a network or the storage medium 91.

In step S302 above, the controller 11 updates the values of the computational parameters for the computational model 512 to maximize the value based on the obtained state-change data. The values of the computational parameters for the computational model 512 may be adjusted with any method selected as appropriate for the configuration of the computational model 512. For the computational model 512 including a neural network, for example, the values of the computational parameters for the computational model 512 may be adjusted in a manner similar to the manner described in the first example by, for example, the error back propagation method.

The controller 11 repeats the processing in steps S301 and S302 and adjusts the value of each computational parameter for the computational model 512 to maximize the resultant value (expected value) (e.g., until the update is less than or equal to a threshold). More specifically, training the computational model 512 includes repeatedly correcting the value of each computational parameter included in the computational model 512 to have a higher reward until the predetermined condition is satisfied. The controller 11 can thus generate the trained computational model 522 capable of estimating the value of each combining parameter P to fit the predetermined inference in the target environment using the environment data (and the target data). The method of reinforcement learning may be the same as for the machine learning model 403 described above.

For inverse reinforcement learning, the controller 11 further obtains situation data in step S301 above before the above reinforcement learning process. The situation data may be generated by the inference apparatus 1 or by another computer. When the situation data is generated by another computer, the controller 11 may obtain the situation data generated by the other computer through, for example, a network or the storage medium 91. The controller 11 then performs inverse reinforcement learning using the obtained situation data to define a reward function. The controller 11 uses the reward function defined through inverse reinforcement learning to perform the above reinforcement learning process. The controller 11 can thus generate, using the reward function defined by inverse reinforcement learning, the trained computational model 522 capable of estimating the value of each combining parameter P to fit the predetermined inference in the target environment using the environment data (and the target data).

III. Brief Summary

In the present embodiment, the computational model 51 may have at least one configuration selected from the two configurations described above. The controller 11 can generate the trained computational model 52 using at least one of the above two methods of machine learning. After training the computational model 51 and generating the trained computational model 52, the controller 11 advances the processing to step S303.

Step S303

Referring back to FIG. 10B, in step S303, the controller 11 operates as the storing unit 118 and generates information about the result from training the computational model 51 through machine learning, or the trained computational model 52. In the examples of FIGS. 10C and 10D, the controller 11 generates information about the trained computational model (521 and 522). The controller 11 stores information about the generated trained computational model 52 into a predetermined storage area.

The predetermined storage area may be, for example, the RAM in the controller 11, the storage 12, an external storage, a storage medium, or a combination of these. The storage medium is, for example, a CD or a DVD. The controller 11 may store the information about the trained computational model 52 into the storage medium through the drive 17. The external storage may be, for example, a data server such as a NAS. In this case, the controller 11 may use the communication interface 13 to store the information about the trained computational model 52 into a data server through a network. The external storage may be connected to the inference apparatus 1.

The information about the generated trained computational model 52 may be stored as at least a part of the combining-rule data 57, or may be stored separately from the combining-rule data 57. Upon storage of the information about the trained computational model 52, the controller 11 ends the series of information processing steps for generating the trained computational model 52.

Further, the controller 11 may regularly update or newly generate the trained computational model 52 by periodically repeating the processing in steps S301 to S303 above. During the repeated processes, the learning data 59 may undergo changes, modifications, additions, and deletions as appropriate. The controller 11 may then use the updated or newly generated trained computational model 52 in subsequent inference processes.

With the first method, the trained computational model 52 trained through machine learning is built to cause the value of each calculated combining parameter P to fit the predetermined inference in the target environment. The value of each combining parameter P calculated by the built trained computational model 52 can be used to appropriately combine the inference result from each trained machine learning model 45 together to fit the target environment. The first method allows the predetermined inference to be performed appropriately in the target environment.

The number of parameters for the machine learning model 40 (trained machine learning model 45) is determined based on the number of dimensions of the target data (61 and 225) and the representation format of the inference result. The number of parameters for the machine learning model 40 increases more as at least one of the target data (61 and 225) or the details of the inference is more complex. In contrast, the number of parameters for the computational model 51 (trained computational model 52) is determined based on the number of dimensions of the environment data 63 and the number of trained machine learning models 45 used for the predetermined inference performed in the target environment. The information processing for the computational model 51 simply includes determining the value of each combining parameter P. This reduces the likelihood of more parameters being used for the computational model 51 as the target data (61 and 225) and the details of inference are more complex.

For example, an optimum observation method with a camera is to be estimated using image data obtained with the camera in a target environment defined based on brightness. In this case, the target data (61 and 225) is image data. The number of parameters for the machine learning model 40 is determined based on the number of pixels in the image data and the number of possible states of the camera. The number of parameters can be a number on the order of greater than 1,000. In contrast, the number of parameters for the computational model 51 is determined based on the number of dimensions of the brightness and the number of trained machine learning models 45. For tens of trained machine learning models 45 used to estimate the optimum observation method, the number of parameters is a number on the order of tens to hundreds at most.

Thus, the number of parameters for the computational model 51 that determines the value of each combining parameter P can be typically less than the number of parameters for the machine learning model 40 that directly performs predetermined inference. When, for example, the computational model 51 and the machine learning model 40 each include a neural network, and the method of machine learning is supervised learning, the scale of the neural network in the computational model 51 may be smaller than the scale of the neural network in the machine learning model 40. When, for example, the method of machine learning is reinforcement learning, the number of parameters defining the training environment is smaller in a situation in which the computational model 51 is trained than in a situation in which the machine learning model 40 is trained. The cost of machine learning depends on the number of parameters used. Thus, the cost of building the trained computational model 52 through machine learning can be lower than the cost of building a new trained machine learning model 45 to fit the target environment. The first method thus improves the accuracy of predetermined inference while reducing the cost of building an inference model for appropriately performing predetermined inference in a new environment.

(2) Second Method

Figure 11A:
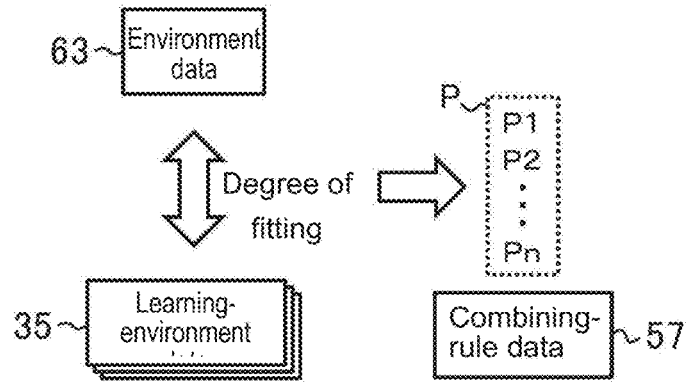
FIG. 11A is a diagram illustrating a method for determining values of combining parameters in one or more embodiments.

FIG. 11A is a schematic block diagram describing a situation of determining each combining parameter P with a second method. With the second method, the controller 11 determines the value of each combining parameter P based on a comparison between a target environment in which predetermined inference is to be performed and a training environment in which local learning data 30 used to derive each inference model is obtained. More specifically, the controller 11 calculates the degree of fitting between the environment data 63 and each set of learning-environment data 35, and determines the value of each combining parameter P for the corresponding inference model in accordance with the calculated degree of fitting.

Figure 11B:
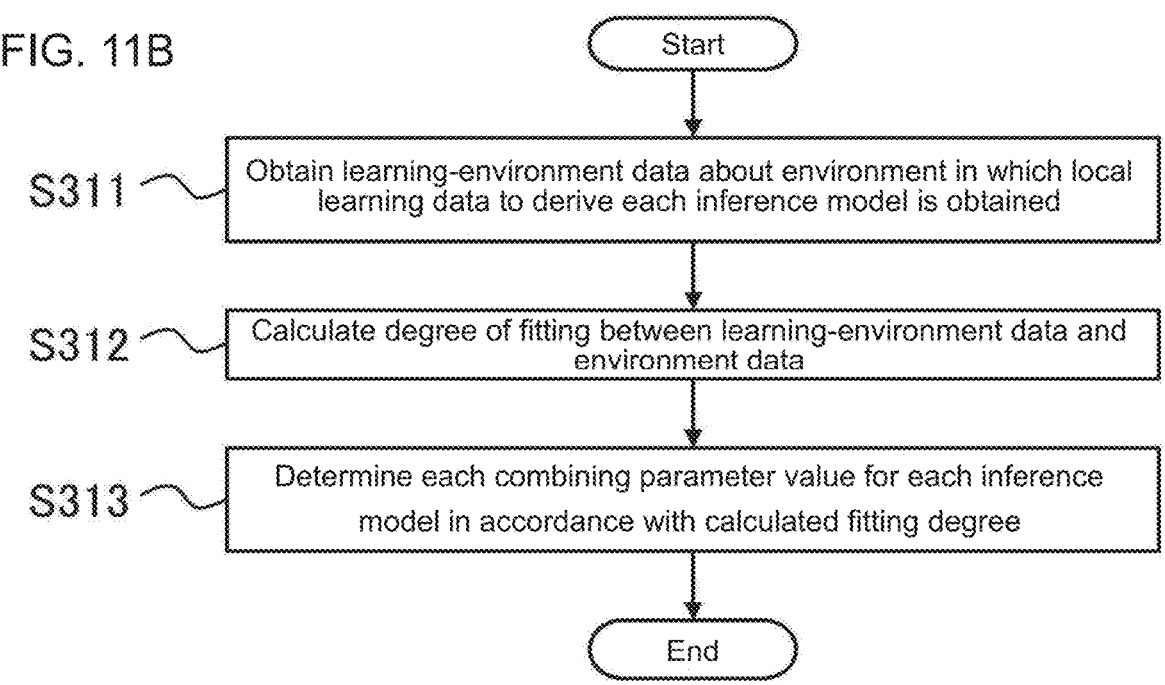
FIG. 11B is a flowchart illustrating a combining parameter determination procedure with a method such as is shown in FIG. 11A.

FIG. 11B is a flowchart of a subroutine for determining the value of each combining parameter P with the second method. With the second method, the processing in step S211 above includes the processing in steps S311 to S313 described below. However, the procedure below is a mere example, and each of its steps may be modified in any possible manner. In the procedure below, steps may be eliminated, substituted, or added as appropriate in each embodiment.

In step S311, the controller 11 obtains learning-environment data 35 about an environment in which the local learning data 30 used to derive each inference model is obtained. As described above, in the present embodiment, the learning-environment data 35 for each trained machine learning model 45 may be provided from each local learner apparatus 2 to the inference apparatus 1 at any selected time. The controller 11 may obtain each set of learning-environment data 35 as appropriate. After obtaining each set of learning-environment data 35, the controller 11 advances the processing to step S312.

In step S312, the controller 11 calculates the degree of fitting between each set of learning-environment data 35 and the environment data 63. The degree of fitting may be in any format that allows determination as to whether the target environment and the training environment are close to each other and may be selected as appropriate in each embodiment. For example, the controller 11 may calculate the degree of fitting between the learning-environment data 35 and the environment data 63. For example, the controller 11 may calculate a distance (norm) between the learning-environment data 35 and the environment data 63 and calculate the degree of fitting in accordance with the calculated distance. In this case, the controller 11 may calculate the degree of fitting to be a smaller value as the calculated distance is larger, and may calculate the degree of fitting to be a larger value as the calculated distance is smaller. The correspondence between the distance and the degree of fitting may be expressed using, for example, a data table, a functional expression, or a rule. The correspondence may be defined manually by, for example, an operator, or may be derived automatically with a known method, such as fitting. In some embodiments, the controller 11 may calculate the reciprocal of the calculated distance as the degree of fitting. The degree of fitting may be expressed in a predetermined number of grades, or by a set of continuous values. After obtaining each degree of fitting, the controller 11 advances the processing to step S313.

In step S313, the controller 11 determines the value of each combining parameter P for the corresponding inference model in accordance with the corresponding calculated degree of fitting. An inference model derived from local learning data 30 obtained in a training environment closer to the target environment is expected to have higher reliability in the target environment. In contrast, an inference model derived from local learning data 30 obtained in a training environment greatly different from the target environment is expected to have lower reliability in the target environment. Thus, the controller 11 may calculate the value of each combining parameter P to be a larger value as the degree of fitting is larger, and calculate the value of each combining parameter P to be a smaller value as the degree of fitting is smaller. The correspondence between the distance and the degree of fitting may be expressed using, for example, a data table, a functional expression, or a rule. The correspondence may be defined manually by, for example, an operator, or may be derived automatically with a known method, such as fitting. In some embodiments, the controller 11 may use each calculated degree of fitting as the value of each combining parameter P.

The controller 11 thus determines the value of each combining parameter P for the corresponding inference model in accordance with the corresponding calculated degree of fitting. The controller 11 may store information indicating the determined value of each combining parameter P as at least a part of the combining-rule data 57, or may store the information separately from the combining-rule data 57. Upon determining the value of each combining parameter P, the controller 11 ends the subroutine for the processing in step S211. After determining the value of each combining parameter P in the present embodiment, the controller 11 combines the inference result from each trained machine learning model 45 together by performing the processing in step S212 and subsequent steps.

Unlike the first method, the second method eliminates the burden of generating the trained computational model 52. The value of each combining parameter P can be determined appropriately through the simple processing of comparing the target environment with the training environment. The second method thus reduces, with such a simple process, the cost of building an inference model for appropriately performing predetermined inference in a new environment.

(3) Third Method

Figure 12A:
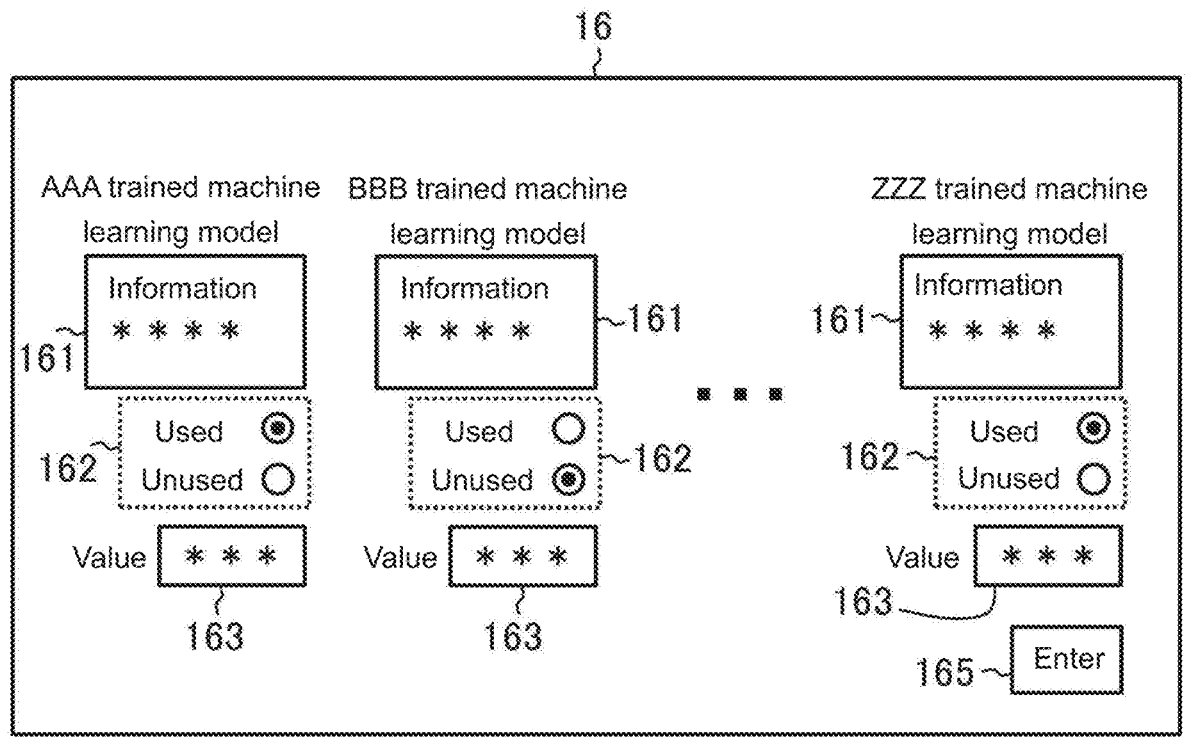
FIG. 12A is a diagram illustrating a method for determining values of combining parameters in one or more embodiments.

FIG. 12A is a schematic block diagram describing a situation of determining each combining parameter P with a third method. With the third method, the controller 11 receives the value of a combining parameter P specified by an operator through the input device 15 and sets the value of the target combining parameter P to the specified value. FIG. 12A schematically illustrates an example screen for receiving the specified value of the combining parameter P.

Figure 12B:
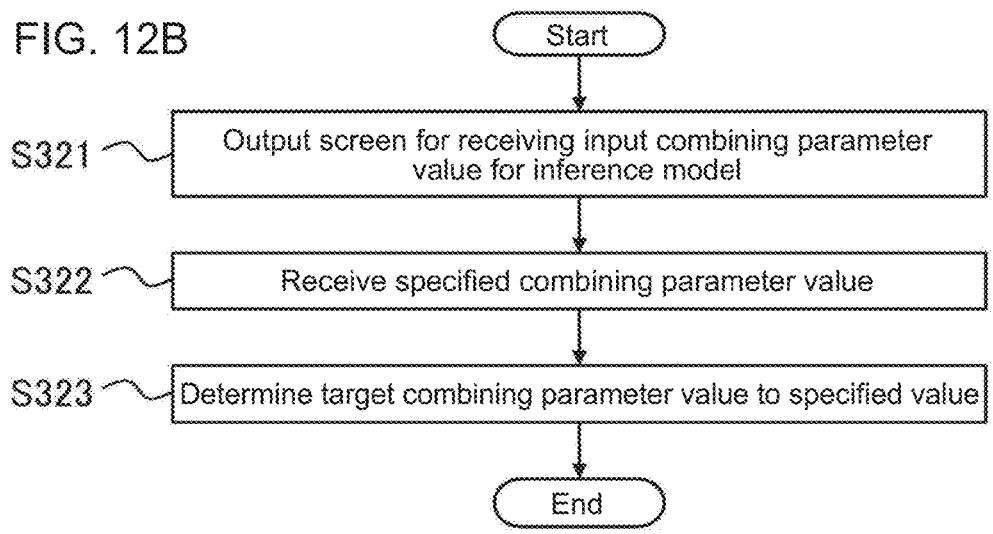
FIG. 12B is a flowchart illustrating a combining parameter determination procedure with a method such as is shown in FIG. 12A.

FIG. 12B is a flowchart of a subroutine for setting the value of each combining parameter P with the third method. The controller 11 operates as the parameter setter 119 and performs the processing in steps S321 to S323 described below. However, the procedure below is a mere example, and each of its steps may be modified in any possible manner. In the procedure below, steps may be eliminated, substituted, or added as appropriate in each embodiment.

In step S321, the controller 11 outputs a screen for receiving the specified value of a combining parameter P for an inference model. In step S322, the controller 11 receives the value of at least one of the multiple combining parameters P specified through the screen.

In the present embodiment, the controller 11 outputs the screen shown in FIG. 12A to the output device 16. The screen for receiving the parameter value may be output to a device other than the output device 16. The screen for receiving the parameter value may be output to, for example, an output device included in another computer. The screen shown in FIG. 12A includes a display field 161, a select field 162, an input field 163, and an enter button 165.

The information about each inference model appears in the display field 161. For example, the details of the learning-environment data 35 may appear in the display field 161. For example, the degree of fitting calculated as described above may appear in the display field 161. The select field 162 can receive a selection indicating whether the model is to be used for the inference process. In the present embodiment, the controller 11 determines the trained machine learning model 45 to be used for the inference process as specified in the select field 162.

The input field 163 receives a specified value of a combining parameter P for the target inference model. An operator operates the input device 15 and enters an intended value in the input field 163 for the target inference model to specify the value of the corresponding combining parameter P. The value of the combining parameter P may be selected from a predetermined number of grades, or may be specified using a set of continuous values. The target inference model may be unselected by, for example, entering an invalid value (e.g., 0) into the input field 163. The select field 162 may be eliminated in this case.

The enter button 165 is used to end the operation of specifying the value of the combining parameter P. After specifying the value of the combining parameter P, the operator operates the input device 15 and operates the enter button 165. In response to an operation of the enter button 165, the controller 11 ends the processing in step S322 and advances the processing to step S323.

In step S323, the controller 11 sets the value of the target combining parameter P to the specified value. The controller 11 may store information about the specified setting details as at least a part of the combining-rule data 57 or separately from the combining-rule data 57. After setting the value of the target combining parameter P, the controller 11 ends the subroutine for setting the value of the combining parameter P. After setting the value of each combining parameter P in the present embodiment, the controller 11 combines the inference result from each trained machine learning model 45 together by performing the processing in step S212 and subsequent steps. In step S212 above, the controller 11 weights the inference result from each corresponding trained machine learning model 45 using the set value of the corresponding target combining parameter P.

The third method determines the value of at least one of the combining parameters P for the inference result from each trained machine learning model 45 as specified by an operator. The predetermined inference performed in the target environment can thus reflect an intention of an operator (e.g., an intention for placing a higher priority on the specific trained machine learning model 45).

(4) Brief Summary

In the present embodiment, the controller 11 can determine the value of each combining parameter P in step S211 with at least one of the three methods described above. The three methods described above may be selectively used as appropriate. For example, the controller 11 may determine the value of each combining parameter P with the first method or the second method, and then correct the value of at least one of the multiple combining parameters P with the third method.

Grouping Inference Models

Figure 13A:
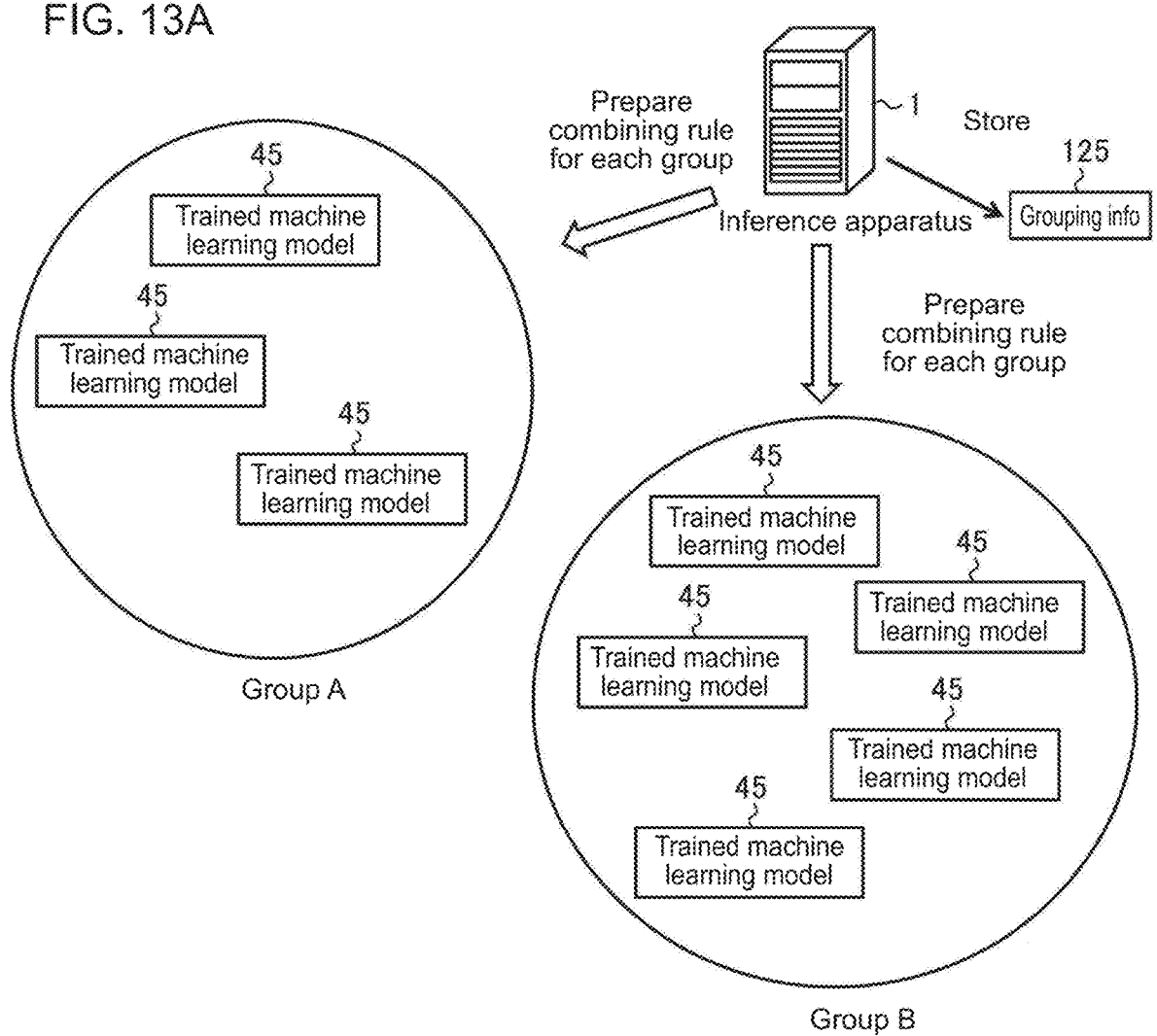
FIG. 13A is a schematic describing illustrating a process for grouping trained machine learning models in one or more embodiments.

The grouping of each inference model will now be described with reference to FIG. 13A. FIG. 13A is a schematic diagram of a situation for grouping each inference model. In the present embodiment, each trained machine learning model 45 that is an example of an inference model is generated by the corresponding local learner apparatus 2. Of multiple trained machine learning models 45, one trained machine learning model 45 may be generated for a purpose different from other trained machine learning models 45 to perform inference different from inference intended by the other trained machine learning models 45. In this case, an inference result from one trained machine learning model 45 may not be combined easily with inference results from other trained machine learning models 45.

In the present embodiment, the controller 11 may operate as the group determiner 1110 and assign each estimation model (each trained machine learning model 45 in the present embodiment) to at least one of multiple groups. The groups may be determined as appropriate for the type or the purpose of the inference or the target environment. FIG. 13A is a schematic diagram describing a situation in which each trained machine learning model 45 is assigned to two groups, namely, group A and group B. The controller 11 generates grouping information 125 indicating a group assigned to each trained machine learning model 45. The grouping information 125 may be stored in, for example, a predetermined storage area. The predetermined storage area may be, for example, the RAM in the controller 11, the storage 12, an external storage, a storage medium, or a combination of these.

The combining rule 5 is prepared for each group accordingly. In step S203 above, the controller 11 may identify a group to be used in the target environment from multiple groups determined and may perform a process for obtaining the above inference result for a trained machine learning model 45 included in the identified group. In step S204 above, the controller 11 may combine an inference result from each trained machine learning model 45 included in the identified group under the combining rule 5. The combining process can thus be performed for each group in accordance with its purpose.

The grouping may be performed with any method selected as appropriate in each embodiment. In the present embodiment, the controller 11 can assign each inference model to at least a group selected from multiple groups with one of the two methods described below.

(1) First Grouping Method

Figure 13B:
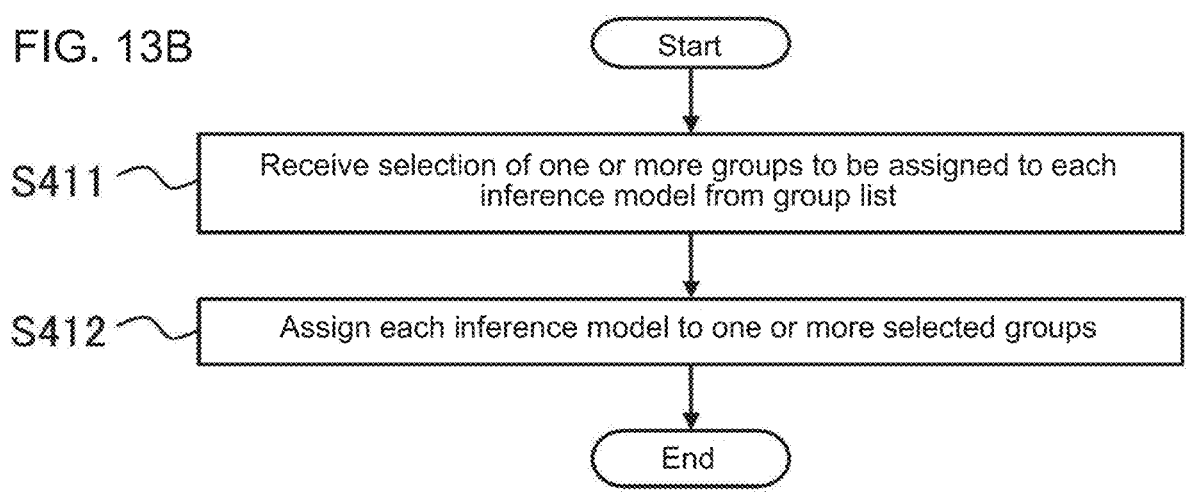
FIG. 13B is a flowchart illustrating a grouping procedure performed by an inference apparatus according to one or more embodiments.

A first method of grouping will be described with reference to FIG. 13B. FIG. 13B is a flowchart of a grouping procedure for assigning a group to each inference model with the first grouping method. With the first grouping method, the controller 11 assigns each inference model to at least one group by selecting an intended group from a list of multiple groups.

Each inference model may be assigned to at least one of multiple groups with the first grouping method through the processing in steps S411 and S412 below. However, the procedure below is a mere example, and each of its steps may be modified in any possible manner. In the procedure below, steps may be eliminated, substituted, or added as appropriate in each embodiment.

In step S411, the controller 11 receives a selection of one or more groups to be assigned to each inference model from a list of multiple groups. For example, the controller 11 may output a list of multiple groups to each output device 16. An operator may operate the input device 15 to select, from the list, one or more groups to be assigned to each inference model. In this manner, the controller 11 thus receives a selection of one or more groups to be assigned to each inference model from the list of multiple groups.

Selecting the group(s) may not be performed by the inference apparatus 1. For example, selecting the group(s) may be performed by each local learner apparatus 2. The controller 11 may distribute the list of multiple groups to each local learner apparatus 2 in a specific example. The controller 11 may cause each local learner apparatus 2 to select one or more groups from the list of multiple groups.

Each group in the list may be defined in accordance with the attributes of local learning data 30, each local learner apparatus 2, and the user of the local learner apparatus 2. For estimating an optimum observation method with a sensor, for example, the sensor may be used to monitor the state of a manufacturing line at a factory. In this case, the groups may be determined in accordance with the attributes including the line number, the factory name, and the company name. New groups may be added to the list through an operator operation or in response to a request from each local learner apparatus 2.

In step S412, the controller 11 assigns each inference model to one or more selected groups based on the information obtained in step S411. Upon the assignment to one or more groups, the controller 11 ends the series of processing steps for the group assignment with the first grouping method. The first grouping method allows, with a simple process, the controller 11 to group each inference model.

(2) Second Grouping Method

Figure 13C:
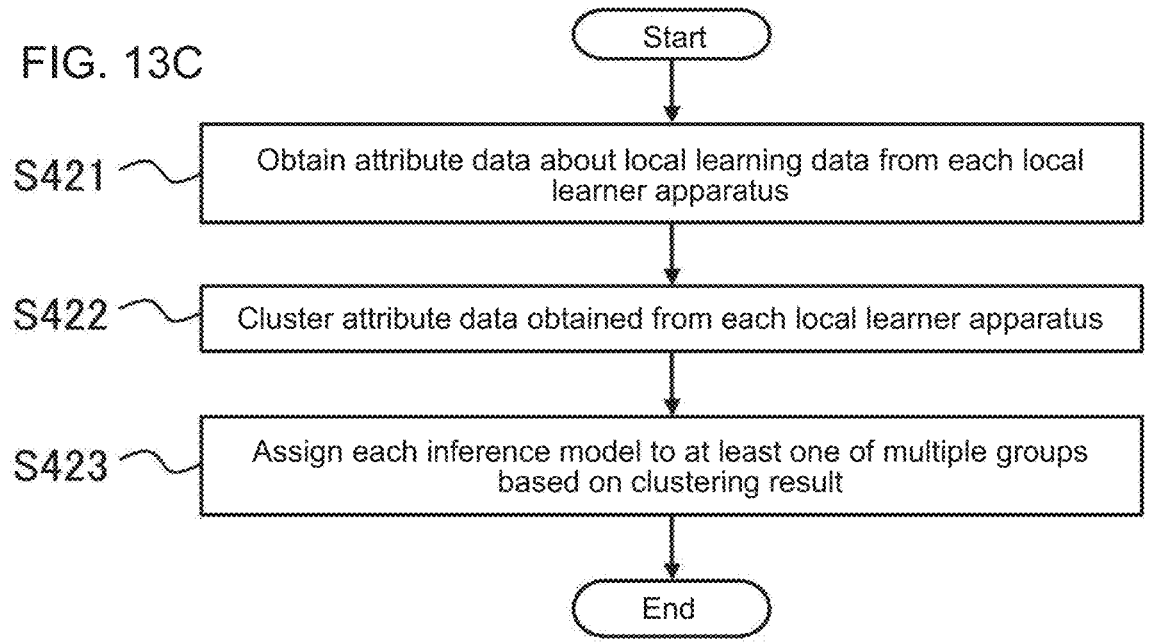
FIG. 13C is a flowchart further illustrating a grouping procedure performed by an inference apparatus according to one or more embodiments.

A second method of grouping will now be described with reference to FIG. 13C. FIG. 13C is a flowchart of a grouping procedure for assigning a group to each inference model with the second grouping method. With the second grouping method, the controller 11 assigns each inference model to an appropriate group in accordance with the attributes of the local learning data 30.

Each inference model may be assigned to at least one of multiple groups with the second grouping method through the processing in steps S421 to S423 below. However, the procedure below is a mere example, and each of its steps may be modified in any possible manner. In the procedure below, steps may be eliminated, substituted, or added as appropriate in each embodiment.

Step S421

In step S421, the controller 11 obtains attribute data about the local learning data 30 from each local learner apparatus 2. The attribute data may be obtained in the same manner as the above learning-environment data 35. The controller 11 may obtain attribute data from each local learner apparatus 2 as appropriate.

The attribute data may include any information about the local learning data 30. The attribute data may include information indicating the type of data included in the local learning data 30, information indicating the characteristics in the data, and information indicating the use purpose of the data. The attribute data may also include the learning-environment data 35. The attribute data may be generated at least either when the local learning data 30 is obtained in step S101 above or when the learning-environment data 35 is obtained in step S103 above. After obtaining the attribute data, the controller 11 advances the processing to step S422.

Steps S422 and S423

In step S422, the controller 11 clusters the attribute data obtained from each local learner apparatus 2. The clustering may be performed with any method selected as appropriate in each embodiment. The clustering may be performed with a known method such as k-means clustering.

In step S423, the controller 11 assigns each inference model to at least one of multiple groups based on the result of clustering. In one example, the controller 11 assigns, to the same group, each inference model having the attribute data assigned to the same class. In this case, each group may be determined in accordance with the class of the attribute data. The controller 11 may also assign each inference model to two or more groups based on the clustering result.

Upon the group assignment based on the clustering result being performed, the controller 11 ends the series of processing steps for the group assignment with the second grouping method. With the second grouping method, the controller 11 assigns each inference model to an appropriate group in accordance with the attributes of the local learning data 30.

The controller 11 can assign each inference model to an appropriate group using at least one of the above two methods. The grouping may be performed with any method selected as appropriate in each embodiment.

Features

As described above, the inference apparatus 1 according to the present embodiment uses, in the processing in steps S203 and S204 above, the multiple trained machine learning models 45 that have already been built, rather than building a new inference model, to perform predetermined inference in the target environment. In the combining process in steps S211 to S213 above, the inference apparatus 1 according to the present embodiment adjusts the priority on inference of each trained machine learning model 45 in the target environment indicated by the environment data 63. The inference apparatus 1 according to the present embodiment can customize the knowledge about the predetermined inference obtained in various environments to fit the new environment. The predetermined inference can thus be performed appropriately in the target environment based on the customized knowledge, or in other words, based on the result obtained by combining the weighted inference result of each trained machine learning model 45.

In the present embodiment, a new inference model to perform the predetermined inference appropriately in the target environment can be built using multiple trained machine learning models 45 derived from the local learning data 30 obtained in different environments. This eliminates the burden of collecting new training data in the target environment and deriving a new inference model, or in particular, generating a new trained machine learning model, from the collected new training data. The structure according to the present embodiment reduces the cost of building an inference model for appropriately performing predetermined inference in a new environment.

4. Modifications

The embodiments of the present invention described in detail above are mere examples of the present invention in all respects. The embodiments may be variously modified or altered without departing from the scope of the present invention. For example, the embodiments may be modified in the following forms. The same components as those in the above embodiments are hereafter given the same numerals, and the operations that are the same as those in the above embodiments will not be described. The modifications described below may be combined as appropriate.

4.1

The inference apparatus 1 and each local learner apparatus 2 in the above embodiment may be used in any situation in which any inference is performed using an inference model. The situation in which any inference is performed may be, for example, a situation in which an optimum observation method with a sensor is estimated, a situation in which a path to be traveled by a movable object is predicted, a situation in which a conversation strategy to fit a user is estimated, or a situation in which a motion command for a robot device to fit a task is estimated. Four modifications in such situations will now be described.

(A) Estimating Optimum Observation Method with Sensor

Figure 14:
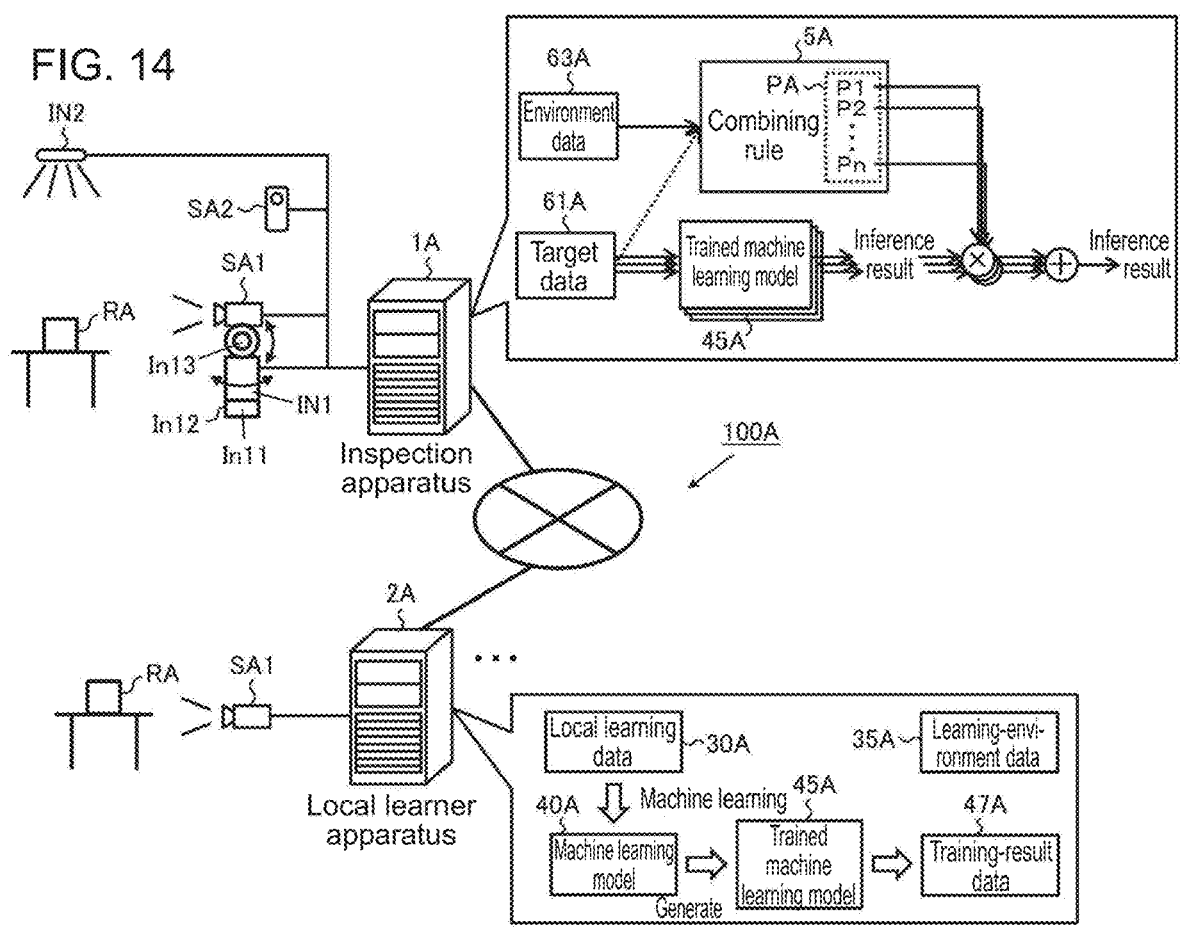
FIG. 14 is a schematic diagram illustrating an inference system according to one or more embodiments in another situation.

FIG. 14 is a schematic diagram of an inspection system 100A according to a first modification in one situation. In the present modification, the structure in the above embodiment is used in estimating an optimum observation method with a sensor. As shown in FIG. 14, the inspection system 100A according to the present modification includes an inspection apparatus 1A and multiple local learner apparatuses 2A. In the same manner as in the above embodiment, the inspection apparatus 1A and the local learner apparatuses 2A may be connected to each other with a network.

The inspection apparatus 1A corresponds to the inference apparatus 1 described above. The local learner apparatuses 2A correspond to the local learner apparatuses 2 described above. The inspection apparatus 1A may have the same structure as the inference apparatus 1 described above, and the local learner apparatuses 2A may have the same structure as the local learner apparatuses 2 described above, except the data to be used and the details of the inference. The inspection apparatus 1A may have the same hardware and software configurations as the inference apparatus 1 described above. The local learner apparatuses 2A may have the same hardware and software configurations as the local learner apparatuses 2 described above.

In the present modification, a sensor SA1 is connected to the inspection apparatus 1A and the local learner apparatuses 2A. The predetermined inference in the present modification includes estimating the method of changing from a current observation state in which an attribute of a target RA is observable with the sensor SA1 to an appropriate observation state in which observation data satisfying a predetermined condition is to be obtained with the sensor SA1. The sensor SA1 may be, for example, a camera, a microphone, or a vital sensor. The camera may be, for example, a typical digital camera for obtaining RGB images, a depth camera for obtaining depth images, or an infrared camera for imaging the amount of infrared radiation. A target RA may be, for example, a product, a plant, or a person.

The predetermined condition may be defined as appropriate for the purpose of observation with the sensor SA1. For example, observation data may be obtained with the sensor SA1 for evaluating the quality of the target RA. In this case, the predetermined condition may be defined in accordance with the performance of inference in evaluating the quality of the observation data obtained with the sensor SA1. Evaluating the quality of the target RA may include inspecting a product (e.g., defect detection), inspecting the growth state of a plant (e.g., a crop), or inspecting the health status of a person. For inspecting a product, for example, the predetermined condition may be defined in accordance with the performance of intended inspection associated with the observation data obtained with the sensor, including whether the defect detection can be performed or whether the accuracy of the defect detection satisfies a predetermined criterion. The performance of the intended inspection is determined based on the observation data obtained with the sensor SA1.

Each local learner apparatus 2A in the present modification generates a trained machine learning model 45A capable of estimating the method of changing to an appropriate observation state with the sensor SA1. In contrast, the inspection apparatus 1A according to the present modification estimates an optimum observation method with the target sensor SA1 in the target environment using each trained machine learning model 45A derived from local learning data 30A obtained in a different environment by the corresponding local learner apparatus 2A. In the present modification, the target sensor SA1 for estimating the optimum observation method is the sensor SA1 connected to the inspection apparatus 1A. However, the target sensor SA1 may not be limited to this example. The inspection apparatus 1A may estimate the optimum observation method with a sensor SA1 connected to another computer.

The inspection apparatus 1A according to the present modification obtains target data 61A to be used for predetermined inference, and environment data 63A about a target environment for performing the predetermined inference. The target data 61A to be used for the predetermined inference in the present modification is about the current observation state with the target sensor SA1. The environment data 63A about the target environment in which the predetermined inference is performed in the present modification is about the target observation environment in which the target sensor SA1 observes the attributes of the target RA.

In the present modification, the inspection apparatus 1A is further connected to another sensor SA2. The other sensor SA2 is used to observe the target observation environment, unlike the target sensor SA1 for estimating the optimum observation method. Thus, the inspection apparatus 1A can obtain environment data 63A from the other sensor SA2. For a target observation environment including brightness, temperature, or humidity, the other sensor SA2 may be, for example, a camera, a photometer, an illuminance meter, a thermometer, or a hygrometer.

The inspection apparatus 1A according to the present modification inputs the obtained target data 61A into each trained machine learning model 45A to cause each trained machine learning model 45A to estimate the method of changing to an appropriate observation state with the sensor SA1. The inspection apparatus 1A according to the present modification obtains an estimation result about the changing method to an appropriate observation state with the sensor SA1 from each trained machine learning model 45A. The inspection apparatus 1A in the present modification then combines the estimation result from each trained machine learning model 45A together under a combining rule 5A.

As in the above embodiment, the combining rule 5A includes multiple combining parameters PA each defining the priority on the estimation result from the corresponding trained machine learning model 45A in the target environment. The inspection apparatus 1A according to the present modification determines the value of each combining parameter PA in accordance with the environment data 63A. In addition to the environment data 63A, the target data 61A may be used further. The inspection apparatus 1A according to the present modification then weights the estimation result from each trained machine learning model 45 using the determined value of the corresponding combining parameter PA. The inspection apparatus 1A according to the present modification then combines the weighted inference result from each trained machine learning model 45A together.

The inspection apparatus 1A according to the present modification can generate a result of estimating the method of changing from the current observation state with the target sensor SA1 to an appropriate observation state in the target environment. Estimating the method of changing to the appropriate observation state may include directly estimating the changing method, or indirectly estimating the changing method by first estimating the appropriate observation state and then calculating the difference between the estimated appropriate observation state and the current observation state to derive the appropriate observation state.

Each symbol in FIG. 14 schematically shows a scene of image inspection of a product. The target RA may be a product manufactured in a production line. The sensor SA1 may be a camera. The observation data obtained with the sensor SA1 may be image data. For image inspection based on brightness, the other sensor SA2 may be a photometer or an illuminometer. The predetermined condition may be defined to cause, for example, the target RA (product) to be captured in the image data for appropriate inspection of an attribute of the target RA (e.g., the presence of a defect or the type of a defect).

In the present modification, the inspection apparatus 1A is further connected to a panhead IN1 and an illuminator IN2. The sensor S1 is installed on the panhead IN1. The panhead IN1 includes a base In11, a first joint In12, and a second joint In13. Each joint (In12 and In13) may include a drive, such as a servo motor. The first joint In12 is connected to the base In11 and has its tip rotating about the axis of the base. The second joint In13 is connected to the first joint In12 and has its tip rotating in the back-and-forth direction. The panhead IN1 has this structure to change the orientation and arrangement of the sensor S1 as controlled by a computer. The illuminator IN2 may have the structure to change the brightness of the observation environment by adjusting the amount of light output as controlled by a computer.

The panhead IN1 and the illuminator IN2 allow the observation state with the sensor SA1 to be changed, or more specifically, the installation angle of the sensor SA1 and the brightness around the target RA to be changed. The panhead IN1 and the illuminator IN2 are each an example of an intervening device in an aspect of the present invention. However, the intervening device may have any structure that can change the observation state with the target sensor SA1 by intervening in the observation state. For intervening in temperature or humidity, the intervening device may be an air conditioner, a humidifier, or a heater. For intervening in the position or orientation of at least one of the target RA or the sensor SA1, the intervening device may be a conveyor unit or a robotic arm.

Generating Trained Machine Learning Model

Each local learner apparatus 2A in the present modification generates the trained machine learning model 45A through the processing in steps S101 to S104 in the same manner as each local learner apparatus 2 described above. In step S101, each local learner apparatus 2A obtains the local learning data 30A. In step S102, each local learner apparatus 2A trains a machine learning model 40A through machine learning using the obtained local learning data 30A. The machine learning model 40A may have the same structure as and use the same method of machine learning as the machine learning model 40 described above.

Examples of machine learning include supervised learning (first example) or reinforcement learning (third example). The local learning data 30A used in supervised learning includes multiple learning datasets each including a set of training data and true data. The training data is of the same type as the target data 61A above and may include data about the current observation state with the sensor SA1. The true data may include an inference result for the training data (true result), or more specifically the data indicating the method of changing from the current observation state to an appropriate observation state. Each learning dataset may be generated with the same method as described in the above embodiment. Each local learner apparatus 2A trains the machine learning model 40A through supervised learning using the obtained local learning data 30A. The method of supervised learning may be the same as in the above embodiment.

For reinforcement learning, the machine learning model 40A may be value-based, policy-based, or both value-based and policy-based. The state to be observed may be an observation state with the sensor SA1, and the action to be performed by an agent may be a change in the observation state with the sensor SA1. The reward function may be defined manually by, for example, an operator. In some embodiments, the reward function may be defined to provide an immediate reward based on the appropriateness of the estimation result from the machine learning model 40A.

As in the above embodiment, the appropriateness may be provided manually by, for example, an operator. In some embodiments, the appropriateness may be evaluated based on a predetermined criterion using a determiner. The determiner may perform an intended estimation process on the observation data obtained with the sensor SA1. For example, the determiner may detect a defect in a product from image data. The reward function may return, based on the results of multiple trials of the estimation process, a value indicating a positive immediate reward in response to the accuracy of the estimation process greater than or equal to a threshold, and a value indicating a negative immediate reward in response to the accuracy of the estimation process less than a permissible value (e.g., defect detection impossible). In some embodiments, the reward function may be estimated through inverse reinforcement learning using situation data representing a demonstration by an expert. In the present modification, the situation data may include data indicating a method of changing the sensor SA1 obtained by an operation performed by an expert. Each local learner apparatus 2A adjusts the value of each computational parameter of the machine learning model 40A to maximize the obtained value (expected value) in the training environment defined as appropriate. The method of reinforcement learning may be the same as in the above embodiment.

Each local learner apparatus 2A can train the machine learning model 40A through machine learning with any of the above methods. In this manner, each local learner apparatus 2A generates the trained machine learning model 45A capable of estimating a method of changing from a current observation state in which an attribute of a target RA is observable with the sensor SA1 to an appropriate observation state in which observation data satisfying a predetermined condition is to be obtained with the sensor SA1.

In step S103, each local learner apparatus 2A obtains learning-environment data 35A about an environment in which the local learning data 30A is obtained. The learning-environment data 35A is of the same type as the environment data 63A obtained by the inspection apparatus 1A. The learning-environment data 35A may be obtained in the same manner as the environment data 63A. For example, each local learner apparatus 2A may be further connected to a sensor of the same type as the other sensor SA2, and may obtain the learning-environment data 35A from the sensor. In step S104, each local learner apparatus 2A generates information about the generated trained machine learning model 45A as training-result data 47A. Each local learner apparatus 2A stores, into a predetermined storage area, the training-result data 47A in a manner associated with the learning-environment data 35A.

In the present modification, the local learning data 30A for each local learner apparatus 2A may be obtained in a different environment. The trained machine learning model 45A may then be generated based on the obtained local learning data 30A. This generates multiple trained machine learning models 45A derived to estimate an optimum observation method with the sensor SA1 using local learning data 30A obtained in a different environment.

Hardware Configuration of Inspection Apparatus

Figure 15:
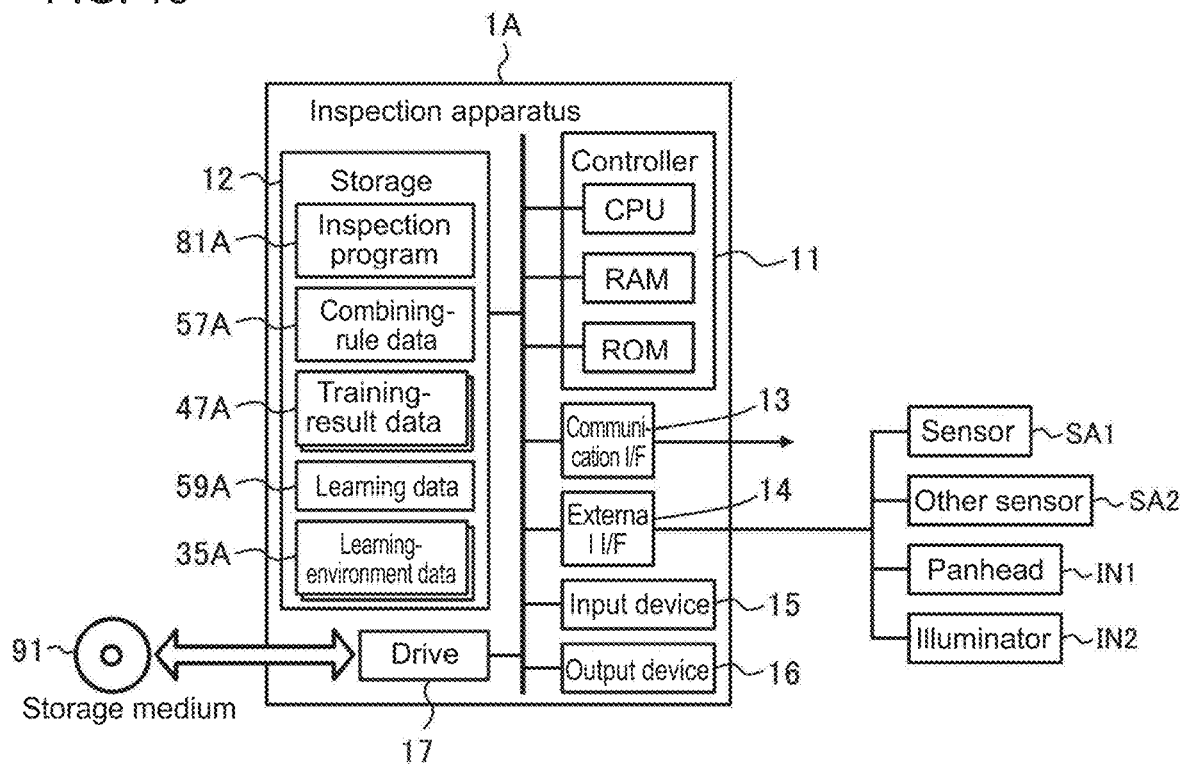
FIG. 15 is a schematic diagram illustrating an inspection apparatus according to another embodiment showing an example hardware configuration.

FIG. 15 is a schematic diagram of the inspection apparatus 1A according to the present modification showing its example hardware configuration. As shown in FIG. 15, similarly to the inference apparatus 1 described above, the inspection apparatus 1A according to the present modification is a computer including a controller 11, a storage 12, a communication interface 13, an external interface 14, an input device 15, an output device 16, and a drive 17 that are electrically connected to one another. The inspection apparatus 1A is connected to the sensor SA1, the other sensor SA2, the panhead IN1, and the illuminator IN2 with the external interface 14. However, the inspection apparatus 1A may have any other hardware configuration. For the specific hardware configuration of the inspection apparatus 1A, components may be eliminated, substituted, or added as appropriate in each embodiment. The inspection apparatus 1A may also be an information processor dedicated to a relevant service, or may be a general-purpose server, a general-purpose PC, or a programmable logic controller (PLC).

The storage 12 included in the inspection apparatus 1A according to the present modification stores various items of information such as an inspection program 81A, combining-rule data 57A, training-result data 47A, learning data 59A, and learning-environment data 35A. The inspection program 81A, the combining-rule data 57A, the training-result data 47A, the learning data 59A, and the learning-environment data 35A correspond to the inference program 81, the combining-rule data 57, the training-result data 47, the learning data 59, and the learning-environment data 35 in the above embodiment. At least one of the inspection program 81A, the combining-rule data 57A, the training-result data 47A, the learning data 59A, or the learning-environment data 35A may be stored in a storage medium 91. The inspection apparatus 1A may obtain at least one of the inspection program 81A, the combining-rule data 57A, the training-result data 47A, the learning data 59A, or the learning-environment data 35A from the storage medium 91.

Software Configuration of Inspection Apparatus

Figure 16A:
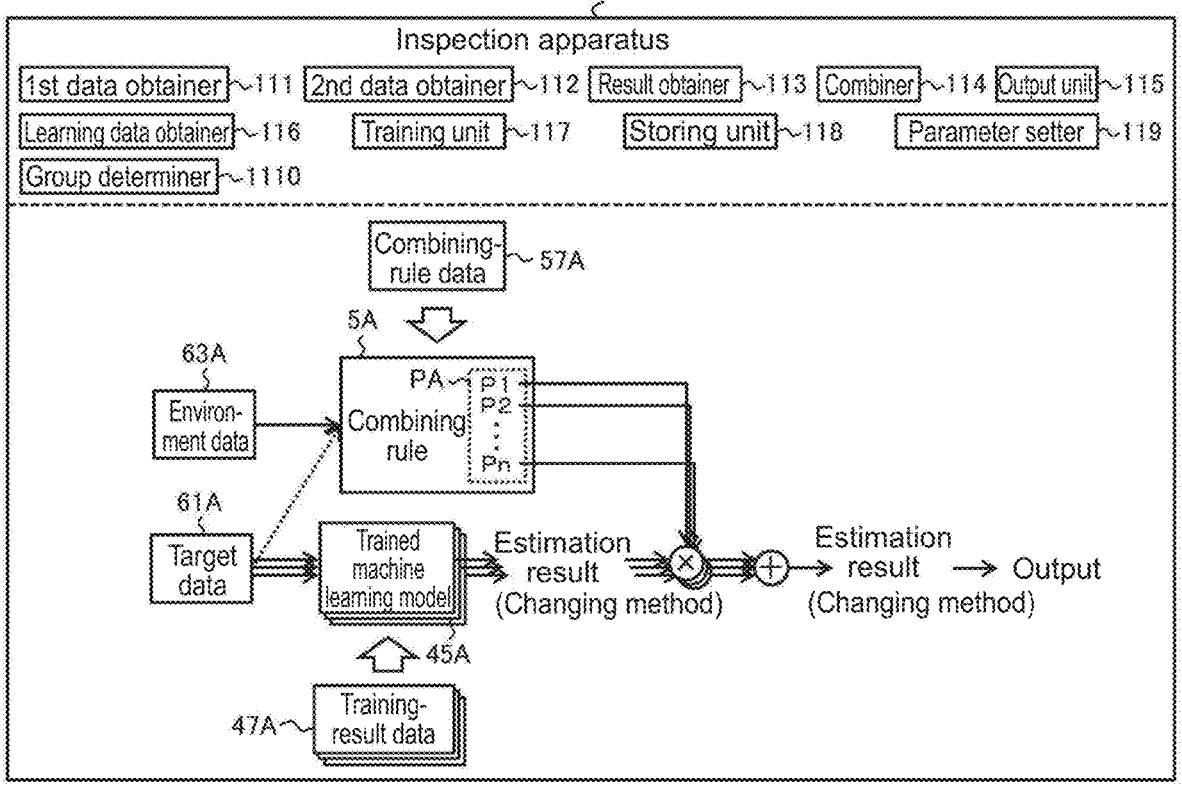
FIG. 16A is a schematic diagram illustrating an inspection apparatus according to another embodiment showing an example software configuration.
Figure 16B:
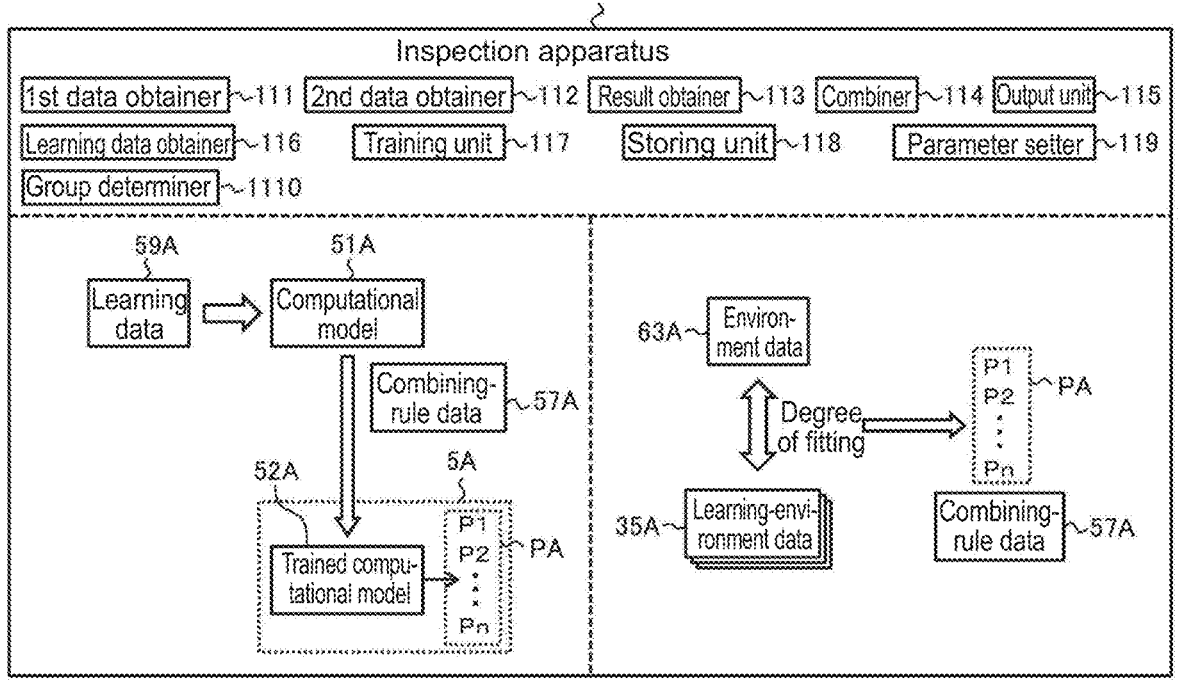
FIG. 16B is a schematic diagram further illustrating an inspection apparatus according to another embodiment showing an example software configuration.

FIGS. 16A and 16B are schematic diagrams of the inspection apparatus 1A according to the present modification showing its example software configuration. In the same manner as in the above embodiment, the software configuration of the inspection apparatus 1A is implemented by the controller 11 executing the inspection program 81A. As shown in FIGS. 16A and 16B, the inspection apparatus 1A has the same software configuration as the inference apparatus 1, except the data to be used and the details of the inference. The inspection apparatus 1A thus performs the series of inference steps in the same manner as the inference apparatus 1.

Step S201

In step S201, as shown in FIG. 16A, the controller 11 in the inspection apparatus 1A obtains the target data 61A. The target data 61A may be any data about the current observation state with the target sensor SA1 and may be selected as appropriate in each embodiment. The target data 61A may include data indicating an attribute of the installation state of the target sensor SA1, data indicating an attribute of the operational setting of the target sensor SA1, and observation data obtained with the target sensor SA1. The attributes of the installation state of the target sensor SA1 may include the installation angle of the sensor SA1, the distance between the sensor SA1 and the observation target (target RA), and the observation attribute that affects the observation with the sensor SA1 (e.g., brightness, temperature, and humidity). The attributes of the operational settings of the target sensor SA1 may include the set value for the measurement range of the sensor SA1, the set value for the resolution of the measurement range, and the set value for the sampling frequency. For the sensor SA1 being a camera, for example, the attributes of the operational settings may include an aperture value, a shutter speed, and a zoom magnification.

The target data 61A may be obtained with any method selected as appropriate in each embodiment. For example, the target data 61A may be obtained from the target sensor SA1. For example, the target data 61A may be obtained from another sensor that observes an environmental attribute (e.g., the other sensor SA2). In the present modification, the panhead IN1 and the illuminator IN2 each as the intervening device are connected to the inspection apparatus 1A. The target data 61A may be obtained from at least one of each intervening device or the sensor (not shown) that observes the state of each intervening device. The target data 61A may be obtained based on, for example, an input of an operator. The controller 11 may obtain the target data 61A directly from each device or indirectly through another computer.

Step S202

In step S202, the controller 11 obtains the environment data 63A. The environment data 63A may be any data about the target observation environment in which the attribute of the target RA is observed with the target sensor SA1 and may be selected as appropriate in each embodiment. The environment data 63A may include data indicating attributes associated with the specifications (or performance) of the target sensor SA1, data indicating an attribute of the observation target (target RA), and an environmental attribute that affects the observation with the target sensor SA1. The attributes associated with the specifications (or performance) of the target sensor SA1 may include the sensitivity limit of the sensor SA1, the dynamic range, the definable range of the spatial resolution, and the definable range of the sampling frequency. The attributes of the observation target (target RA) may include the type of observation target and the purpose of observation. The type of observation target may be, for example, the type of a product or a workpiece or the type of a plant. The purpose of observation is, for example, defect detection or quality inspection.

The environment data 63A may be obtained with any method selected as appropriate in each embodiment. The environment data 63A may be obtained based on, for example, an input of an operator. For example, the environment data 63A may be obtained from the target sensor SA1. For example, the environment data 63A may be obtained from observation data obtained with the target sensor SA1. For example, the environment data 63A may be obtained from another sensor that observes the environmental attribute (e.g., the other sensor SA2). The controller 11 may obtain the environment data 63A directly from each device or indirectly through another computer.

Step S203

In step S203, the controller 11 refers to each set of training-result data 47A to define the corresponding trained machine learning model 45A. The controller 11 then inputs the target data 61A into each trained machine learning model 45A and performs a computational operation of each trained machine learning model 45A. The controller 11 receives an output from each trained machine learning model 45A as an estimation result about the changing method to an appropriate observation state with the sensor SA1 from each trained machine learning model 45A.

Step S204

In step S204, the controller 11 refers to the combining-rule data 57A to define the combining rule 5A. The controller 11 combines the inference result from each trained machine learning model 45A together under the combining rule 5A. More specifically, in step S211, the controller 11 determines the value of each combining parameter PA in accordance with the environment data 63A. In addition to the environment data 63A, the target data 61A may be used further. The value of each combining parameter PA may be determined with any of the first to third methods described below.

(1) First Method

With the first method, as shown in FIG. 16B, the controller 11 obtains the learning data 59A. The controller 11 trains a computational model 51A through machine learning using the learning data 59A. The computational model 51A may have the same configuration as and use the same method of machine learning as the computational model 51 described above. The computational model 51A may have the configuration and use the method of machine learning selected from one of the two examples described above.

In the first example, the learning data 59A, similarly to the learning data 59, may include multiple learning datasets each including a set of training environment data, training target data, and true data. The training environment data is of the same type as the environment data 63A. The training target data is of the same type as the target data 61A. The true data may include an inference result for the training target data (true result), or more specifically the data representing the method of changing from the current observation state to an appropriate observation state in the target environment. Each learning dataset may be generated with the same method as described in the above embodiment. The controller 11 trains the computational model 51A through machine learning using the obtained learning data 59A. The method of machine learning may be the same as in the first example.

In the second example, the computational model 51A may be value-based, policy-based, or both value-based and policy-based. As in the above embodiment, the state to be observed corresponds to the environment data 63A and the target data 61A. The action performed by the agent may be to change the observation state with the sensor SA1. The agent can obtain an inference result from each trained machine learning model 45A through the above series of processing steps and combine each obtained inference result to generate an inference result in the target environment. The agent may determine an action to be performed based on the generated inference result.

The reward function may be defined manually by, for example, an operator. In some embodiments, the reward function may be defined to provide an immediate reward based on the appropriateness of the estimation result generated through the series of processing steps described above. The appropriateness may be provided manually by, for example, an operator. In some embodiments, the appropriateness may be evaluated based on a predetermined criterion using a determiner. The determiner may be the same as the determiner in reinforcement learning of the machine learning model 40A described above. In some embodiments, the reward function may be estimated through inverse reinforcement learning using situation data representing a demonstration by an expert. The situation data may be the same as the situation data used to define the reward function in training the machine learning model 40A through reinforcement learning described above. The controller 11 adjusts the value of each computational parameter of the computational model 51A to maximize the obtained value (expected value) in the training environment defined as appropriate. The method of reinforcement learning may be the same as in the above embodiment.

The controller 11 can train the computational model 51A through machine learning with any of the above methods. The controller 11 can thus generate a trained computational model 52A capable of estimating the value of each combining parameter PA to fit estimation of an optimum observation method with the sensor SA1 in the target observation environment using the environment data 63A (and the target data 61A). The controller 11 may store information about the generated trained computational model 52A into a predetermined storage area. The information about the trained computational model 52A may be stored as at least a part of the combining-rule data 57A, or may be stored separately from the combining-rule data 57A.

With the first method, the controller 11 determines the value of each combining parameter PA using the trained computational model 52A generated as described above. In step S211, the controller 11 inputs the environment data 63A into the trained computational model 52A. The controller 11 may also input the target data 61A into the trained computational model 52A. The controller 11 performs a computational operation of the trained computational model 52A. The controller 11 can receive an output from the trained computational model 52A as the value of each combining parameter PA of each trained machine learning model 45A.

(2) Second Method

With the second method, the controller 11 determines the value of each combining parameter PA based on a comparison between the target environment and each training environment. More specifically, the controller 11 obtains the learning-environment data 35A for each trained machine learning model 45A. The controller 11 then calculates the degree of fitting between each set of learning-environment data 35A and the environment data 63A. The degree of fitting may be in the same format or representation as in the above embodiment. In step S211 above, the controller 11 determines the value of each combining parameter PA for the corresponding trained machine learning model 45A in accordance with the corresponding calculated degree of fitting. The value of each combining parameter PA may be determined in accordance with the degree of fitting with the same method as described in the above embodiment.

(3) Third Method

With the third method, the controller 11 receives the value of a combining parameter PA specified by an operator and sets the value of the target combining parameter PA to the specified value. The screen for receiving the specified value may be the same as in the above embodiment (FIG. 12A).

Referring back to FIG. 16A, the controller 11 can determine the value of each combining parameter PA in step S211 with at least one of the three methods described above. In step S212, the controller 11 weights the estimation result from each trained machine learning model 45A using the determined value of the corresponding combining parameter PA. When at least one of the combining parameters PA is set with the third method above, the controller 11 uses the set value to weight the estimation result from the trained machine learning model 45A corresponding to the target combining parameter PA in step S212. In step S213, the controller 11 then combines the weighted estimation result from each trained machine learning model 45A together. Combining each estimation result together includes averaging of the weighted values or selecting from the weighted values based on majority rules as in the above embodiment. This allows generation of a result of estimating the method of changing from the current observation state with the target sensor SA1 to an appropriate observation state in the target environment.

Step S205

In step S205, the controller 11 outputs information about the generated estimation result. In the same manner as in the above embodiment, the output destination and the details of the information to be output may be determined as appropriate in each embodiment. The controller 11 may directly output the estimation result generated in step S204 to the output device 16, or may perform information processing based on the generated estimation result.

For example, the controller 11 may generate, based on the estimation result generated in step S204, prompt information for prompting the user to change the observation state with the target sensor SA1 with the method of changing to the estimated appropriate observation state as the information about the estimation result. The controller 11 may output the generated prompt information to the output device. The output device to which the information is to be output may be the output device 16 included in the inspection apparatus 1A or an output device included in another computer. The other computer may be a computer located near the user, or a terminal device carried by the user. This output method allows a user with no expertise to optimize the observation state with the sensor SA1 in the target environment.

The inspection apparatus 1A is connected to the intervening device that changes the observation state with the target sensor SA1. In this case, the controller 11 may generate, based on the generated estimation result, command information for causing the intervening device to perform an operation to change the observation state with the target sensor SA1 with the method of changing to the estimated appropriate observation state as the information about the estimation result. The controller 11 may then transmit the command information to the intervening device to cause the intervening device to perform the operation of changing the observation state with the target sensor SA1 using the estimated changing method. The controller 11 may directly control the operation of the intervening device. For the intervening device including the control apparatus in some embodiments, the controller 11 may transmit command information to the control apparatus to cause the control apparatus to control the operation of the intervening device to indirectly control the operation of the intervening device. This output method can automatically optimize the observation state with the sensor SA1.

In the present modification, the inspection apparatus 1A is connected to the panhead IN1 and the illuminator IN2 each as the intervening device. The controller 11 may change the observation state with the target sensor SA1 by controlling the operation of at least one of the panhead IN1 or the illuminator IN2 based on the estimation result generated in step S204. At least one of the installation angle of the target sensor SA1 or the brightness around the target RA can thus be optimized.

Similarly to the above embodiment, the controller 11 in the inspection apparatus 1A may assign each trained machine learning model 45A to at least one of multiple groups. The controller 11 may thus perform the combining process for each group in accordance with its purpose. The grouping may be performed with any of the above two methods.

Inference Process by Local Learner Apparatus

Each local learner apparatus 2A in the present modification can estimate the optimum observation method with the sensor SA1 using the trained machine learning model 45A through the processing in steps S111 to S113 in the same manner as each local learner apparatus 2 described above. The target sensor SA1 for which the optimum observation method is to be estimated by each local learner apparatus 2A is typically the sensor SA1 connected to each local learner apparatus 2A. However, the target sensor SA1 may not be limited to this example. Each local learner apparatus 2A may estimate the optimum observation method with a sensor SA1 connected to another computer.

In step S111, each local learner apparatus 2A obtains training data used for the estimation. The method for obtaining the target data may be the same as in step S201 for the inspection apparatus 1A. In step S112, each local learner apparatus 2A inputs target data into the trained machine learning model 45A and performs a computational operation of the trained machine learning model 45A. Each local learner apparatus 2A can receive an output from the trained machine learning model 45A as the result of estimating the method of changing from a current observation state with the sensor SA1 to an appropriate observation state.

In step S113, each local learner apparatus 2A outputs information about the estimation result. The output destination and the details of the information to be output may be selected as appropriate in each embodiment. Each local learner apparatus 2A may directly output the estimation result obtained in step S112 to the output device, or may perform information processing based on the obtained estimation result.

The processing in step S113 may be performed in the same manner as the processing in step S205 for the inspection apparatus 1A described above. For example, each local learner apparatus 2A may generate prompt information for prompting the user to change the observation state with the sensor SA1 with the method of changing to the estimated appropriate observation state and output the generated prompt information to the output device. Each local learner apparatus 2A may be further connected to the intervening device such as the panhead IN1 or the illuminator IN2. In this case, each local learner apparatus 2A may generate command information for causing the intervening device to perform an operation to change the observation state with the sensor SA1 with the method of changing to the estimated appropriate observation state as the information about the estimation result. Each local learner apparatus 2A may then transmit the command information to the intervening device to cause the intervening device to perform the operation of changing the observation state with the sensor SA1 with the estimated changing method.

Features

The structure according to the present modification reduces, in a situation in which an attribute of the target RA is observed with the sensor SA1, the cost of building an inference model for appropriately estimating an optimum observation method with the sensor SA1 in a new environment. The observation state with the sensor SA1 is observed using the other sensor SA2 to obtain the environment data 63A sufficiently reflecting the observation state with the sensor SA1. This improves the accuracy of the inspection apparatus 1A for estimating the optimum observation method with the target sensor SA1.

Further, the inspection apparatus 1A performs an output process to allow the observation state with the target sensor SA1 to be optimized either automatically or manually by the user. The observation state with the sensor SA1 in each environment is thus optimized systematically without involving manual standardization. Thus, the structure according to the present modification can optimize the method of observing the attributes of the target RA for, for example, detecting a defect of a product or inspecting the quality of a plant at a lower cost in various environments. This allows high-quality inspection with reduced variations in various environments.

The present modification may be modified as appropriate. For example, the environment data 63A may be obtained from a device other than the other sensor SA2. In this case, the other sensor SA2 may be eliminated. The panhead IN1 or the illuminator IN2 may be eliminated when the observation state is not changed by the intervening device. The inspection apparatus 1A and each device (the sensor SA1, the other sensor SA2, the panhead IN1, and the illuminator IN2) may be connected to each other with the communication interface. The inspection apparatus 1A may output both the prompt information and the command information in step S205 above. The prompt information or the command information may be eliminated.

(B) Predicting Path to be Traveled by Movable Object

Figure 17:
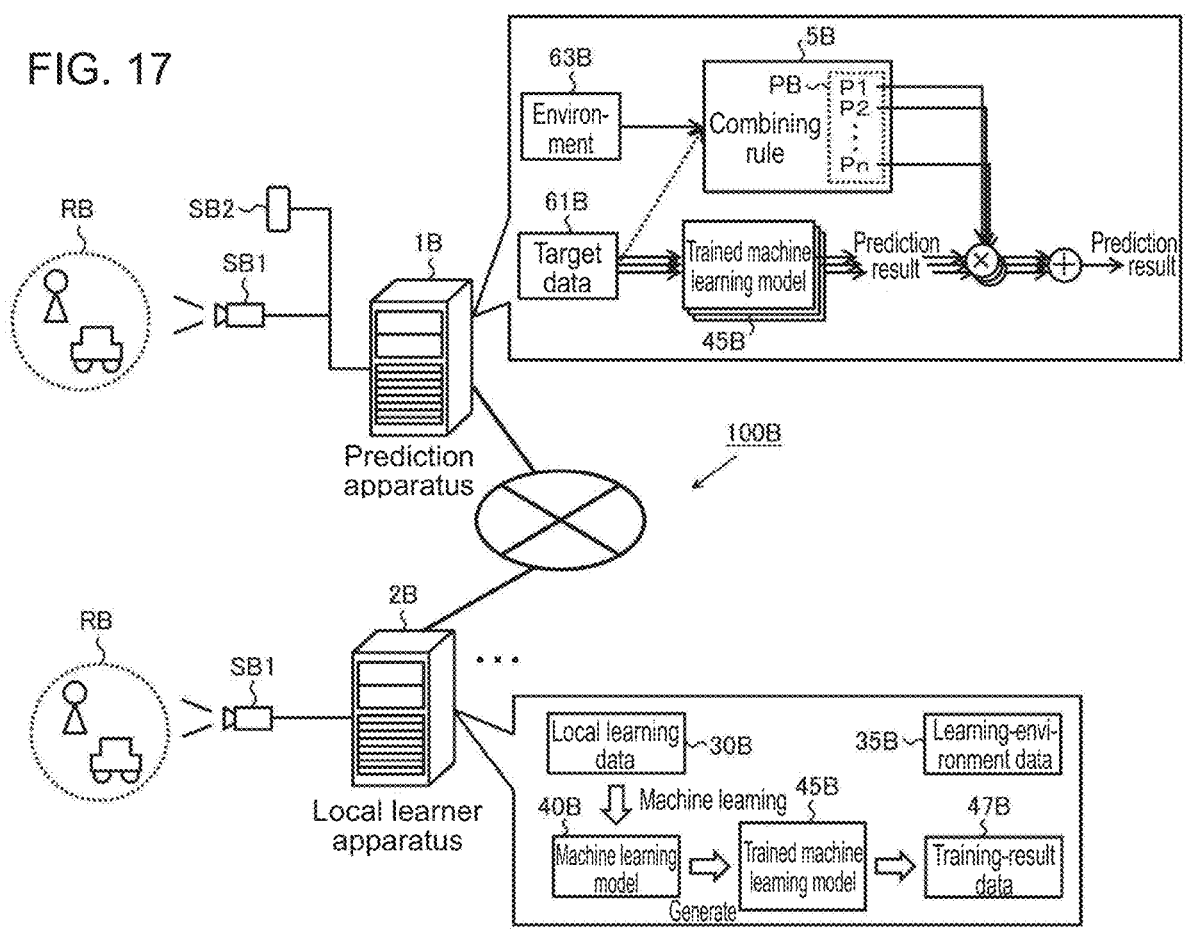
FIG. 17 is a schematic diagram illustrating an inference system according to one or more embodiments in another situation.

FIG. 17 is a schematic diagram of a prediction system 100B according to a second modification in one situation. In the present modification, the structure in the above embodiment is used in predicting a path to be traveled by a movable object. As shown in FIG. 17, the prediction system 100B according to the present modification includes a prediction apparatus 1B and multiple local learner apparatuses 2B. In the same manner as in the above embodiment, the prediction apparatus 1B and the local learner apparatuses 2B may be connected to each other with a network.

The prediction apparatus 1B corresponds to the inference apparatus 1 described above. The local learner apparatuses 2B correspond to the local learner apparatuses 2 described above. The prediction apparatus 1B may have the same configuration as the inference apparatus 1 described above, and the local learner apparatuses 2B may have the same configuration as the local learner apparatuses 2 described above, except the data to be used and the details of the inference. The prediction apparatus 1B may have the same hardware and software configurations as the inference apparatus 1 described above. The local learner apparatuses 2B may have the same hardware and software configurations as the local learner apparatuses 2 described above.

The predetermined inference in the present modification includes predicting a path to be traveled by a movable object RB based on the state of the movable object RB. The movable object RB may be any object that is movable and may be selected as appropriate in each embodiment. Examples of the movable object RB include an organism (e.g., a human) and a machine (e.g., a vehicle). In the present modification, a sensor SB1 is connected to the prediction apparatus 1B and the local learner apparatuses 2B. The state of the movable object RB is observed by the sensor SB1. The sensor SB1 may be, for example, a camera or a beacon. The camera may be, for example, a typical digital camera for obtaining RGB images, a depth camera for obtaining depth images, or an infrared camera for imaging the amount of infrared radiation.

Each local learner apparatus 2B in the present modification generates a trained machine learning model 45B capable of predicting the path to be traveled by the movable object RB based on the state of the movable object RB. In contrast, the prediction apparatus 1B according to the present modification predicts the path to be traveled by the movable object RB in the target environment using each trained machine learning model 45B derived from local learning data 30B obtained in a different environment by each local learner apparatus 2B.

The prediction apparatus 1B according to the present modification obtains target data 61B to be used for the predetermined inference and environment data 63B about the target environment for performing the predetermined inference. The target data 61B to be used for the predetermined inference in the present modification is about the state of the target movable object RB to be observed with the sensor SB1. The environment data 63B about the target environment in which the predetermined inference is performed in the present modification is about the target observation environment in which the sensor SB1 observes the movable object RB.

In the present modification, the prediction apparatus 1B is further connected to another sensor SB2. The other sensor SB2 is different from the sensor SB1 for observing the state of the movable object RB. The other sensor SB2 is used to observe the target observation environment for the target movable object RB to be observed with the sensor SB1. Thus, the prediction apparatus 1B can obtain the environment data 63B from the other sensor SB2. For a target observation environment including weather or atmospheric pressure, the other sensor SB2 may be, for example, a weather sensor or a barometer.

The prediction apparatus 1B according to the present modification inputs the obtained target data 61B into each trained machine learning model 45B to cause each trained machine learning model 45B to predict a path to be traveled by the movable object RB. The prediction apparatus 1B according to the present modification can thus obtain a prediction result from each trained machine learning model 45B for the path to be traveled by the movable object RB. The prediction apparatus 1B according to the present modification then combines an estimation result from each trained machine learning model 45B together under a combining rule 5B.

As in the above embodiment, the combining rule 5B includes multiple combining parameters PB each defining the priority on the prediction result from the corresponding trained machine learning model 45B in the target environment. The prediction apparatus 1B according to the present modification determines the value of each combining parameter PB in accordance with the environment data 63B. In addition to the environment data 63B, the target data 61B may be used further. The prediction apparatus 1B according to the present modification weights the estimation result from each trained machine learning model 45B using the determined value of the corresponding combining parameter PB. The prediction apparatus 1B according to the present modification then combines the weighted estimation result from each trained machine learning model 45B together.

The prediction apparatus 1B according to the present modification can generate a result of predicting the path to be traveled by the movable object RB based on the state of the movable object RB in the target environment.

Generating Trained Machine Learning Model

Each local learner apparatus 2B according to the present modification generates the trained machine learning model 45B through the processing in steps S101 to S104 in the same manner as each local learner apparatus 2 described above. In step S101, each local learner apparatus 2B obtains the local learning data 30B. In step S102, each local learner apparatus 2B trains a machine learning model 40B through machine learning using the obtained local learning data 30B. The machine learning model 40B may have the same configuration as and use the same method of machine learning as the machine learning model 40 described above.

In the present modification, the method of machine learning may be selected from the first to third examples described above. In the first example, the local learning data 30B includes multiple learning datasets each including a set of training data and true data. The training data is of the same type as the target data 61B above and may include data about the state of the movable object RB observed with the sensor SB1. The true data may include an inference result for the training data (true result), or more specifically the data indicating a path traveled either actually or virtually by the movable object RB. Each learning dataset may be generated with the same method as described in the above embodiment. Each local learner apparatus 2B trains the machine learning model 40B through supervised learning using the obtained local learning data 30B. The method of supervised learning may be the same as in the above embodiment.

In the second example, the local learning data 30B includes multiple sets of training data. The training data thus includes data to be generated by the machine learning model 40B. The training data includes, for example, data indicating a path traveled either actually or virtually by the movable object RB. Each set of training data may be generated with the same method as described in the above embodiment. Each local learner apparatus 2B trains the machine learning model 40B and the other machine learning model through adversarial learning using the obtained local learning data 30B. The method of adversarial learning may be the same as in the above embodiment.

In the third example, the machine learning model 40B may be value-based, policy-based, or both value-based and policy-based. The state to be observed may be information about the path to be traveled by the movable object RB, and the action to be performed by the agent may be the travel of the movable object RB. The reward function may be defined manually by, for example, an operator. In some embodiments, the reward function may be defined to provide an immediate reward based on the appropriateness of the prediction result from the machine learning model 40B. As in the above embodiment, the appropriateness may be provided manually by, for example, an operator. In some embodiments, the appropriateness may be evaluated based on a predetermined criterion using a determiner. The determiner may evaluate the accuracy of a result from predicting the path to be traveled by the movable object RB. The reward function returns, based on the results of multiple trials of a prediction process, a value indicating a positive immediate reward in response to the accuracy of the path prediction greater than or equal to a threshold, and a value indicating a negative immediate reward in response to the accuracy of the path prediction less than a permissible value. In some embodiments, the reward function may be estimated through inverse reinforcement learning using situation data representing a demonstration by an expert. In the present modification, the situation data includes, for example, data indicating a path actually traveled by the movable object RB. Each local learner apparatus 2B adjusts the value of each computational parameter of the machine learning model 40B to maximize the obtained value (expected value) in the training environment defined as appropriate. The method of reinforcement learning may be the same as in the above embodiment.

Each local learner apparatus 2B can train the machine learning model 40B through machine learning with any of the above methods. Each local learner apparatus 2B generates a trained machine learning model 45B capable of predicting the path to be traveled by the movable object RB based on the state of the movable object RB.

In step S103, each local learner apparatus 2B obtains learning-environment data 35B about an environment in which the local learning data 30B is obtained. The learning-environment data 35B is of the same type as the environment data 63B obtained by the prediction apparatus 1B. The learning-environment data 35B may be obtained in the same manner as the environment data 63B. For example, each local learner apparatus 2B may be further connected to a sensor of the same type as the other sensor SB2, and may obtain the learning-environment data 35B from the sensor. In step S104, each local learner apparatus 2B generates information about the generated trained machine learning model 45B as training-result data 47B. Each local learner apparatus 2B stores, into a predetermined storage area, the training-result data 47B in a manner associated with the learning-environment data 35B.

In the present modification, the local learning data 30B for each local learner apparatus 2B may be obtained in a different environment. The trained machine learning model 45B may then be generated based on the obtained local learning data 30B. This generates multiple trained machine learning models 45B derived to estimate a path to be traveled by the movable object RB using the local learning data 30B obtained in different environments.

Hardware Configuration of Prediction Apparatus

Figure 18:
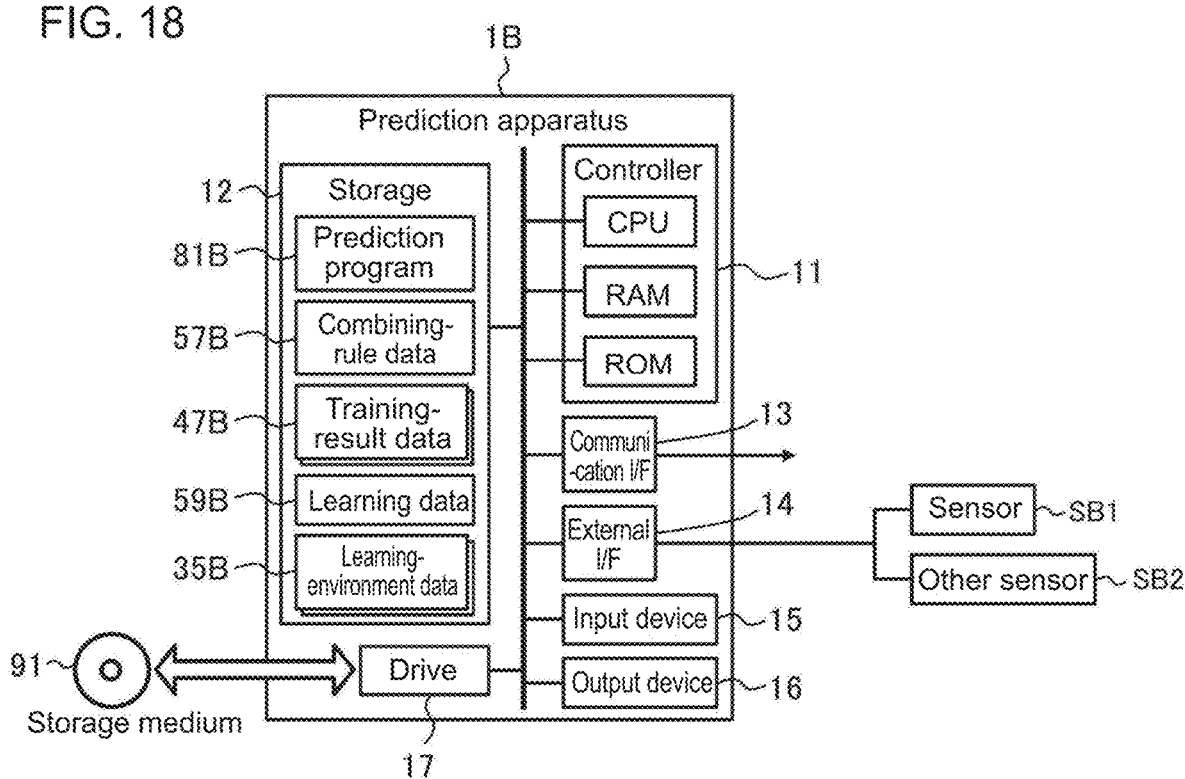
FIG. 18 is a schematic diagram illustrating a prediction apparatus according to another embodiment showing an example hardware configuration.

FIG. 18 is a schematic diagram of the prediction apparatus 1B according to the present modification showing its example hardware configuration. As shown in FIG. 18, similarly to the inference apparatus 1 described above, the prediction apparatus 1B according to the present modification is a computer including a controller 11, a storage 12, a communication interface 13, an external interface 14, an input device 15, an output device 16, and a drive 17 that are electrically connected to one another. The prediction apparatus 1B is connected to a sensor SB1 and another sensor SB2 through the external interface 14. However, the prediction apparatus 1B may have any other hardware configuration. For the specific hardware configuration of the prediction apparatus 1B, components may be eliminated, substituted, or added as appropriate in each embodiment. The prediction apparatus 1B may also be an information processor dedicated to a relevant service, or may be a general-purpose server or a general-purpose PC.

The storage 12 included in the prediction apparatus 1B according to the present modification stores various items of information such as a prediction program 81B, combining-rule data 57B, the training-result data 47B, learning data 59B, and the learning-environment data 35B. The prediction program 81B, the combining-rule data 57B, the training-result data 47B, the learning data 59B, and the learning-environment data 35B correspond to the inference program 81, the combining-rule data 57, the training-result data 47, the learning data 59, and the learning-environment data 35 in the above embodiment. At least one of the prediction program 81B, the combining-rule data 57B, the training-result data 47B, the learning data 59B, or the learning-environment data 35B may be stored in a storage medium 91. The prediction apparatus 1B may obtain at least one of the prediction program 81B, the combining-rule data 57B, the training-result data 47B, the learning data 59B, or the learning-environment data 35B from the storage medium 91.

Software Configuration of Prediction Apparatus

Figure 19A:
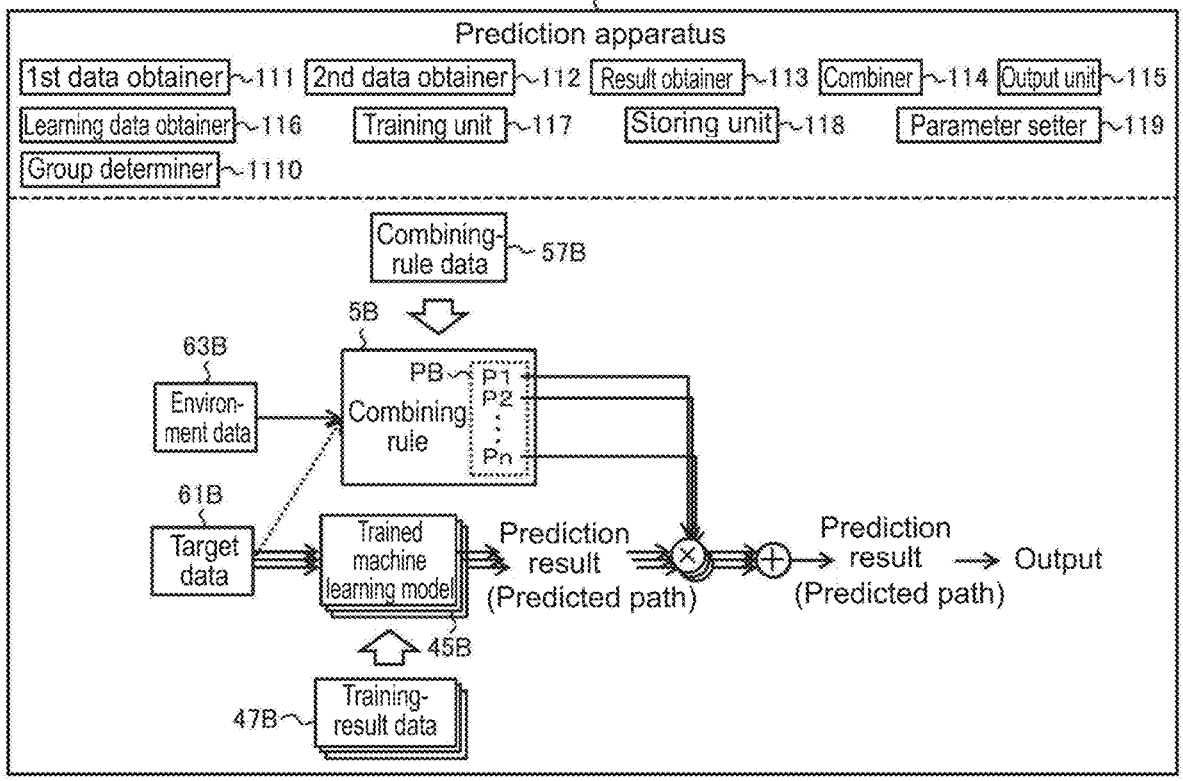
FIG. 19A is a schematic diagram illustrating a prediction apparatus according to another embodiment showing an example software configuration.
Figure 19B:
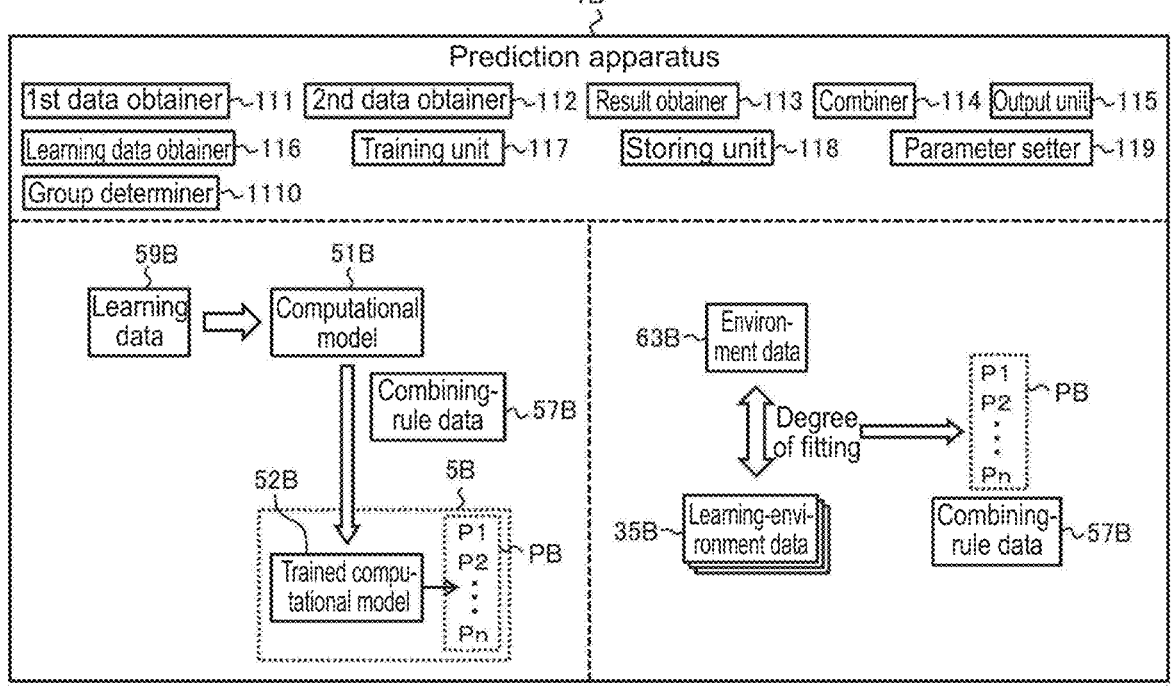
FIG. 19B is a schematic diagram illustrating a prediction apparatus according to another embodiment showing an example software configuration.

FIGS. 19A and 19B are schematic diagrams of the prediction apparatus 1B according to the present modification showing its example software configuration. In the same manner as in the above embodiment, the software configuration of the prediction apparatus 1B is implemented by the controller 11 executing the prediction program 81B. As shown in FIGS. 19A and 19B, the prediction apparatus 1B has the same software configuration as the inference apparatus 1 described above, except the data to be used and the details of the inference. The prediction apparatus 1B thus performs the series of inference steps in the same manner as the inference apparatus 1.

Step S201

In step S201, as shown in FIG. 19A, the controller 11 in the prediction apparatus 1B obtains the target data 61B. The target data 61B may be any data about the state of the target movable object RB observed with the sensor SB1 and may be selected as appropriate in each embodiment. The target data 61B may include observation data obtained with the sensor SB1 observing the state of the movable object RB, data indicating the state of the movable range (e.g., congestion) analyzed from the observation data, data indicating the current position of the movable object RB, or data indicating the current path on which the movable object RB has moved.

The target data 61B may be obtained with any method selected as appropriate in each embodiment. For example, the observation data may be obtained with the sensor SB1 as the target data 61B. For example, the target data 61B may be obtained by performing an analysis process on the observation data obtained by the sensor SB1. The target data 61B may be obtained based on, for example, an input of an operator. The controller 11 may obtain the target data 61B directly from each device or indirectly through another computer.

Step S202

In step S202, the controller 11 obtains the environment data 63B. The environment data 63B may be any data about the target observation environment in which the target movable object RB is observed with the sensor SB1 and may be selected as appropriate in each embodiment. The environment data 63B may include data indicating an attribute of the movable object RB, data indicating an attribute of the movable range, data indicating an environmental attribute that affects the travel, data indicating attributes associated with the specifications (or performance) of the sensor SB1, and data indicating an attribute of the observation condition for the sensor SB1. The attributes of the movable object RB may include information about the type of the movable object RB (e.g., a person, a vehicle, or a vehicle type) and the capability to travel by the movable object RB. For the movable object RB being a person, the traveling capability may be evaluated using the gender, age, height, or weight of the person. For the movable object RB being a vehicle, the traveling capability may be evaluated using the performance of the vehicle. The attributes of the movable range may include a destination location for the travel or the type of the path (road) to be traveled. The type of the path (road) to be traveled may include a pedestrian only road, a highway, or an ordinary road. An environmental attribute that affects the travel may include weather, congestion, a day of the week, or information indicating either a holiday or weekday. The attributes associated with the specifications (or performance) of the sensor SB1 may include the sensitivity limit of the sensor SB1, the dynamic range, the definable range of the spatial resolution, and the definable range of the sampling frequency. The attributes of the observation conditions for the sensor SB1 may include the installation angle of the sensor SB1 and an attribute associated with the operational setting of the sensor SB1. The attributes of the operational settings of the sensor SB1 may include the set value for the measurement range of the sensor SB1, the set value for the resolution of the measurement range, and the set value for the sampling frequency. For the sensor SB1 being a camera, for example, the attributes of the operational settings may include an aperture value, a shutter speed, and a zoom magnification.

The environment data 63B may be obtained with any method selected as appropriate in each embodiment. The environment data 63B may be obtained based on, for example, an input of an operator. For example, the environment data 63B may be obtained by performing an analysis process on the observation data obtained by the sensor SB1. For example, the environment data 63B may be obtained from another sensor that observes the target observation environment (e.g., the other sensor SB2). For example, the environment data 63B may be obtained from another information processor (server) that distributes information such as weather data. The controller 11 may obtain the environment data 63B directly from each device or indirectly through another computer.

Step S203

In step S203, the controller 11 refers to each set of training-result data 47B to define the corresponding trained machine learning model 45B. The controller 11 then inputs the target data 61B into each trained machine learning model 45B and performs a computational operation of each trained machine learning model 45B. The controller 11 can receive an output from each trained machine learning model 45B as the prediction result from each trained machine learning model 45B for the path to be traveled by the movable object RB.

Step S204

In step S204, the controller 11 refers to the combining-rule data 57B to define the combining rule 5B. The controller 11 combines the prediction result from each trained machine learning model 45B together under the combining rule 5B. More specifically, in step S211, the controller 11 determines the value of each combining parameter PB in accordance with the environment data 63B. In addition to the environment data 63B, the target data 61B may be used further. The value of each combining parameter PB may be obtained with any of the first to third methods described below.

(1) First Method

With the first method, as shown in FIG. 19B, the controller 11 obtains the learning data 59B. The controller 11 trains the computational model 51B through machine learning using the learning data 59B. The computational model 51B may have the same configuration as and use the same method of machine learning as the computational model 51 described above. The computational model 51B may have the configuration and use the method of machine learning selected from one of the two examples described above.

In the first example, the learning data 59B, similarly to the learning data 59, may include multiple learning datasets each including a set of training-environment data, training target data, and true data. The training environment data is of the same type as the environment data 63B. The training target data is of the same type as the target data 61B. The true data may include an inference result for the training target data (true result), or more specifically the data representing the path traveled either actually or virtually by the movable object RB in any state in the target environment. Each learning dataset may be generated with the same method as described in the above embodiment. The controller 11 trains the computational model 51B through machine learning using the obtained learning data 59B. The method of machine learning may be the same as in the first example.

In the second example, the computational model 51B may be value-based, policy-based, or both value-based and policy-based. As in the above embodiment, the state to be observed corresponds to the environment data 63B and the target data 61B. The action performed by the agent may be the travel of the movable object RB. The agent can obtain a prediction result from each trained machine learning model 45B through the above series of processing steps and combine each obtained prediction result to generate a prediction result for the path to be traveled by the movable object RB in the target environment. The agent may determine an action to be performed based on the generated estimation result.

The reward function may be defined manually by, for example, an operator. In some embodiments, the reward function may be defined to provide an immediate reward based on the appropriateness of the prediction result obtained through the series of processing steps described above. The appropriateness may be provided manually by, for example, an operator. In some embodiments, the appropriateness may be evaluated based on a predetermined criterion using a determiner. The determiner may be the same as the determiner in reinforcement learning of the machine learning model 40B described above. In some embodiments, the reward function may be estimated through inverse reinforcement learning using situation data representing a demonstration by an expert. The situation data may be the same as the situation data used to define the reward function in training the machine learning model 40B through reinforcement learning described above. The controller 11 adjusts the value of each computational parameter of the computational model 51B to maximize the obtained value (expected value) in the training environment defined as appropriate. The method of reinforcement learning may be the same as in the above embodiment.

The controller 11 can train the computational model 51B through machine learning with any of the above methods. The controller 11 can thus generate a trained computational model 52B capable of estimating the value of each combining parameter PB to fit prediction of a path to be traveled by the movable object RB in the target observation environment using the environment data 63B (and the target data 61B). The controller 11 may store information about the generated trained computational model 52B into a predetermined storage area. The information about the trained computational model 52B may be stored as at least a part of the combining-rule data 57B, or may be stored separately from the combining-rule data 57B.

With the first method, the controller 11 determines the value of each combining parameter PB using the trained computational model 52B generated as described above. In step S211, the controller 11 inputs the environment data 63B into the trained computational model 52B. The controller 11 may also input the target data 61B into the trained computational model 52B. The controller 11 then performs a computational operation of the trained computational model 52B. The controller 11 can receive an output from the trained computational model 52B as the value of each combining parameter PB of each trained machine learning model 45B.

(2) Second Method

With the second method, the controller 11 determines the value of each combining parameter PB based on a comparison between the target environment and each training environment. More specifically, the controller 11 obtains the learning-environment data 35B for each trained machine learning model 45B. The controller 11 then calculates the degree of fitting between each set of learning-environment data 35B and the environment data 63B. The degree of fitting may be in the same format or representation as in the above embodiment. In step S211 above, the controller 11 determines the value of each combining parameter PB for the corresponding trained machine learning model 45B in accordance with the corresponding calculated degree of fitting. The value of each combining parameter PB may be determined in accordance with the corresponding calculated degree of fitting with the same method as described in the above embodiment.

(3) Third Method

With the third method, the controller 11 receives the value of a combining parameter PB specified by an operator and sets the value of the target combining parameter PB to the specified value. The screen for receiving the specified value may be the same as in the above embodiment (FIG. 12A).

Referring back to FIG. 19A, the controller 11 can determine the value of each combining parameter PB in step S211 with at least one of the three methods described above. In step S212, the controller 11 weights the prediction result from each trained machine learning model 45B using the determined value of the corresponding combining parameter PB. When at least one of the combining parameters PB is set with the third method above, the controller 11 uses the set value to weight the prediction result from the trained machine learning model 45B corresponding to the target combining parameter PB in step S212. In step S213, the controller 11 then combines the weighted prediction result from each trained machine learning model 45B together. Combining each prediction result together may include averaging of the weighted values or selecting from the weighted values based on majority rules as in the above embodiment. This allows generation of a result of predicting the path to be traveled by the movable object RB based on the state of the movable object RB in the target environment.

Step S205

In step S205, the controller 11 outputs information about the generated prediction result. In the same manner as in the above embodiment, the output destination and the details of the information to be output may be determined as appropriate in each embodiment. The controller 11 may directly output the prediction result generated in step S204 to the output device 16, or may perform information processing based on the generated prediction result.

For example, the controller 11 may generate, as information about the prediction result, information indicating a recommended path to be traveled, such as a less congested path, based on the prediction result generated in step S204. The controller 11 may then output the information indicating the generated recommended path to another movable object.

Similarly to the above embodiment, the controller 11 in the prediction apparatus 1B may assign each trained machine learning model 45B to at least one of multiple groups. The controller 11 may thus perform the combining process for each group in accordance with its purpose. The grouping may be performed with any of the above two methods.

Inference Process by Local Learner Apparatus

Each local learner apparatus 2B in the present modification can predict the path to be traveled by the movable object RB using the trained machine learning model 45B through the processing in steps S111 to S113 in the same manner as each local learner apparatus 2 described above.

In step S111, each local learner apparatus 2B obtains target data used for the prediction. The method for obtaining the target data may be the same as in step S201 for the prediction apparatus 1B described above. In step S112, each local learner apparatus 2B inputs target data into the trained machine learning model 45B and performs a computational operation of the trained machine learning model 45B. Each local learner apparatus 2B can receive an output from the trained machine learning model 45B as the prediction result of the path to be traveled by the movable object RB.

In step S113, each local learner apparatus 2B outputs information about the estimation result. The output destination and the details of the information to be output may be selected as appropriate in each embodiment. Each local learner apparatus 2B may directly output the estimation result obtained in step S112 to the output device, or may perform information processing based on the obtained estimation result. The processing in step S113 may be performed in the same manner as the processing in step S205 for the prediction apparatus 1B described above.

Features

The structure in the present modification reduces, in a situation in which the travel of a movable object RB is observed with the sensor SB1, the cost of building an inference model for appropriately predicting the travel by the movable object RB in a new environment. The observation state with the sensor SB1 is observed using the other sensor SB2 to obtain the environment data 63B sufficiently reflecting the observation state with the sensor SB2. This structure improves the prediction accuracy of the prediction apparatus 1B for predicting a path to be traveled by the movable object RB.

The present modification may be modified as appropriate. For example, the environment data 63B may be obtained from a device other than the other sensor SB2. In this case, the other sensor SB2 may be eliminated. The prediction apparatus 1B and each device (the sensor SB1 and the other sensor SB2) may be connected to each other with the communication interface.

(C) Situations for Estimating Conversation Strategy to Fit User

Figure 20:
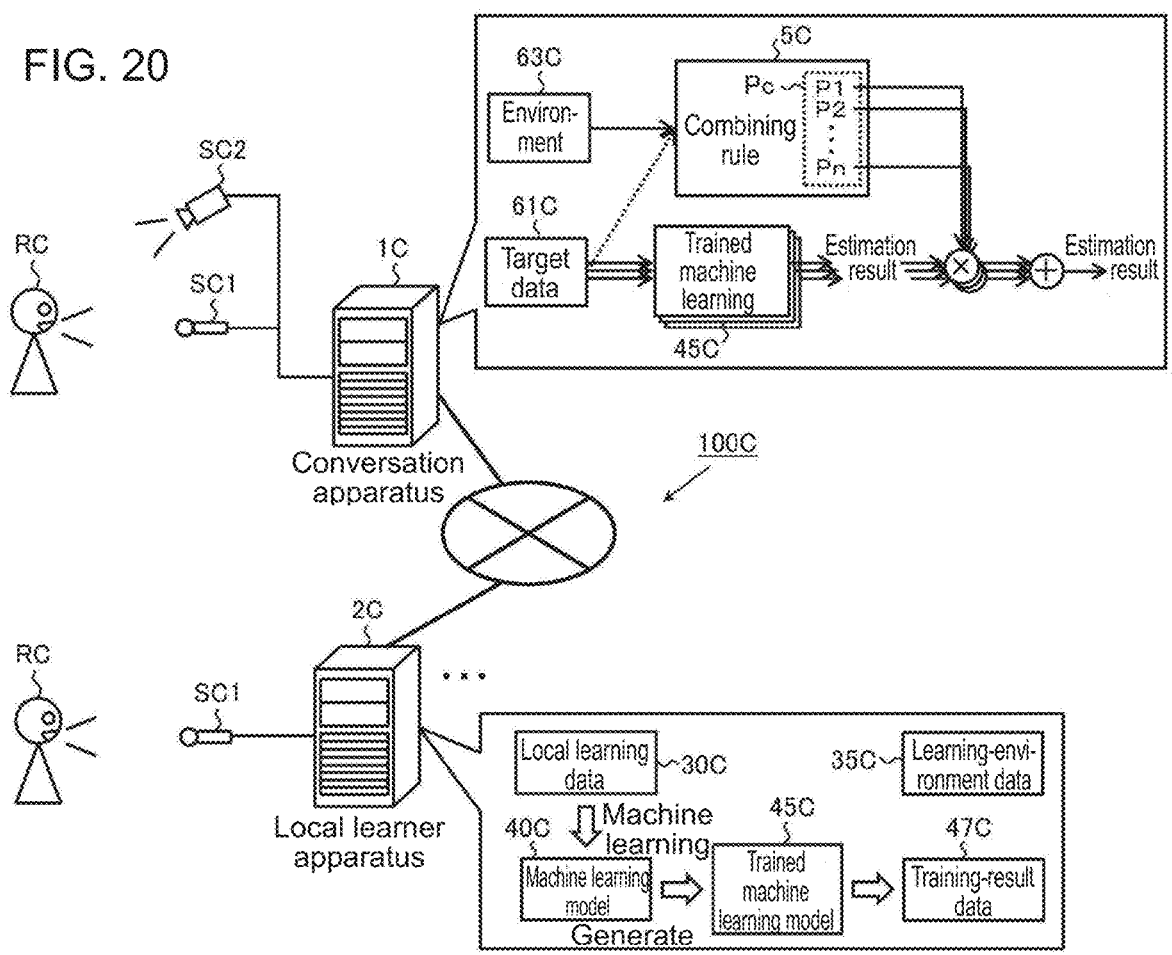
FIG. 20 is a schematic diagram illustrating an inference system according to one or more embodiments in another situation.

FIG. 20 is a schematic diagram of a conversation system 1000 according to a third modification in one situation. In the present modification, the structure in the above embodiment is used in estimating the conversation strategy to fit the user. As shown in FIG. 20, the conversation system 1000 according to the present modification includes a conversation apparatus 1C and multiple local learner apparatuses 2C. In the same manner as in the above embodiment, the conversation apparatus 1C and the local learner apparatuses 2C may be connected to each other with a network.

The conversation apparatus 1C corresponds to the inference apparatus 1 described above. The local learner apparatuses 2C correspond to the local learner apparatuses 2 described above. The conversation apparatus 1C may have the same configuration as the inference apparatus 1 described above, and the local learner apparatuses 2C may have the same configuration as the local learner apparatuses 2 described above, except the data to be used and the details of the inference. The conversation apparatus 1C may have the same hardware and software configurations as the inference apparatus 1 described above. The local learner apparatuses 2C may have the same hardware and software configurations as the local learner apparatuses 2 described above.

The predetermined inference in the present modification includes estimating, from a conversational action of a user RC, a conversation strategy to fit the user RC. The conversation strategy provides rules for creating each conversation. Examples of the conversation strategy include defining the details of a conversation, the timing of utterance, the frequency of conversations, and the tone of voice. The conversational action of the user may include any action associated with a conversation involving the user. Examples of the conversational action of the user include the details of a conversation and the frequency of conversations. The frequency of conversations may be expressed by, for example, the elapsed time from a previous conversation, an average time taken before a next conversation occurs, or the number of conversations that occur within a fixed period of time. In the present modification, a microphone SC1 is connected to each of the conversation apparatus 1C and the local learner apparatuses 2C. The conversational action of the user RC is observed with the microphone SC1.

The microphone SC1 is an example of a sensor to observe the conversational action of the user RC. The method of observing the conversational action of the user RC may be a method other than using a microphone. For example, the conversational action of the user RC may be observed with a video camera. For example, the conversational action of the user RC may be obtained with an input device, such as a keyboard.

Each local learner apparatus 2C in the present modification generates a trained machine learning model 45C capable of estimating a conversation strategy to fit the user RC based on the conversational action of the user RC. In contrast, the conversation apparatus 1C according to the present modification estimates the conversation strategy to fit the user RC using each trained machine learning model 45C derived from local learning data 30C obtained by each local learner apparatus 2C in a different environment.

The conversation apparatus 1C according to the present modification obtains target data 61C to be used for the predetermined inference and environment data 63C about the target environment for performing the predetermined inference. The target data 61C to be used for the predetermined inference in the present modification is about the conversational action of the target user RC. The environment data 63C about the target environment in which the predetermined inference is performed in the present modification is about the target conversational environment in which the target user RC performs the conversational action.

In the present modification, a camera SC2 as another sensor different from the microphone SC1 is further connected to the conversation apparatus 1C. The camera SC2 is used to observe the target conversational environment in which the target user RC performs the conversational action. Thus, the conversation apparatus 1C according to the present modification can obtain the environment data 63C from the camera SC2. The sensor for observing the target conversational environment may be other than a camera and may be selected as appropriate in each embodiment. For a target conversational environment including temperature or weather, the sensor may be, for example, a thermometer or a weather sensor.

The conversation apparatus 1C according to the present modification inputs the obtained target data 61C into each trained machine learning model 45C to cause each trained machine learning model 45C to estimate a conversation strategy to fit the user RC. The conversation apparatus 1C according to the present modification can thus obtain an estimation result from each trained machine learning model 45C for the conversation strategy to fit the user RC. The conversation apparatus 1C according to the present modification then combines an estimation result from each trained machine learning model 45C together under a combining rule 5C.

As in the above embodiment, the combining rule 5C includes multiple combining parameters Pc each defining the priority on the estimation result from the corresponding trained machine learning model 45C in the target environment. The conversation apparatus 1C according to the present modification determines the value of each combining parameter Pc in accordance with the environment data 63C. In addition to the environment data 63C, the target data 61C may be used further. The conversation apparatus 1C according to the present embodiment weights the estimation result from each trained machine learning model 45C using the determined value of the corresponding combining parameter Pc. The conversation apparatus 1C according to the present modification then combines the weighted inference result from each trained machine learning model 45C together.

The conversation apparatus 1C according to the present modification can generate a result of estimating the conversation strategy to fit the target user RC from the conversational action of the target user RC in the target environment.

Generating Trained Machine Learning Model

Each local learner apparatus 2C in the present modification generates the trained machine learning model 45C through the processing in steps S101 to S104 in the same manner as each local learner apparatus 2 described above. In step S101, each local learner apparatus 2C obtains the local learning data 30C. In step S102, each local learner apparatus 2C trains a machine learning model 40C through machine learning using the obtained local learning data 30C. The machine learning model 40C may have the same configuration as and use the same method of machine learning as the machine learning model 40 described above.

In the present modification, the method of machine learning may be selected from the first to third examples described above. In the first example, the local learning data 30C includes multiple learning datasets each including a set of training data and true data. The training data is of the same type as the target data 61C above and may include data about the conversational action of the user RC (participant). The true data may include an inference result for the training data (true result), or more specifically the data representing the conversation strategy to fit the user RC (participant). Each learning dataset may be generated with the same method as described in the above embodiment. Each local learner apparatus 2C trains the machine learning model 40C through supervised learning using the obtained local learning data 30C. The method of supervised learning may be the same as in the above embodiment.

In the second example, the local learning data 30C includes multiple sets of training data. The training data thus includes data to be generated by the machine learning model 40C. The training data includes, for example, data representing the conversation strategy to fit the user RC (participant). Each set of training data may be generated with the same method as described in the above embodiment. Each local learner apparatus 2C trains the machine learning model 40C and another machine learning model through adversarial learning using the obtained local learning data 30C. The method of adversarial learning may be the same as in the above embodiment.

In the third example, the machine learning model 40C may be value-based, policy-based, or both value-based and policy-based. The state to be observed may be information about the conversation strategy to fit the user RC, and the action to be performed by the agent may be a conversation with the user RC. The reward function may be defined manually by, for example, an operator. In some embodiments, the reward function may be defined to provide an immediate reward based on the appropriateness of the estimation result from the machine learning model 40C. As in the above embodiment, the appropriateness may be provided manually by, for example, an operator. In some embodiments, the appropriateness may be evaluated based on a predetermined criterion using a determiner. The determiner may evaluate the accuracy of a result from estimating a conversation strategy to fit the user RC. The reward function returns, based on the results of multiple trials of an estimation process, a value indicating a positive immediate reward in response to the accuracy of the conversation strategy estimation greater than or equal to a threshold, and a value indicating a negative immediate reward in response to the accuracy of the conversation strategy estimation less than a permissible value. The accuracy of estimating the conversation strategy may be evaluated based on an improvement in conversations between the agent and the user RC in a more beneficial direction, including an improvement in the frequency of conversations with the user RC. In some embodiments, the reward function may be estimated through inverse reinforcement learning using situation data representing a demonstration by an expert. In the present modification, the situation data may include data indicating a conversation strategy specified by an expert. Each local learner apparatus 2C adjusts the value of each computational parameter of the machine learning model 40C to maximize the obtained value (expected value) in the training environment defined as appropriate. The method of reinforcement learning may be the same as in the above embodiment.

Each local learner apparatus 2C can train the machine learning model 40C through machine learning with any of the above methods. Each local learner apparatus 2C can thus generate a trained machine learning model 45C capable of estimating a conversation strategy to fit the user RC based on the conversational action of the user RC.

In step S103, each local learner apparatus 2C obtains learning-environment data 35C about an environment in which the local learning data 30C is obtained. The learning-environment data 35C is of the same type as the environment data 63C obtained by the conversation apparatus 1C. The learning-environment data 35C may be obtained in the same manner as the environment data 63C. For example, each local learner apparatus 2C may be further connected to a camera of the same type as the camera SC2, and may obtain the learning-environment data 35C from the camera. In step S104, each local learner apparatus 2C generates information about the generated trained machine learning model 45C as training-result data 47C. Each local learner apparatus 2C stores, into a predetermined storage area, the training-result data 47C in a manner associated with the learning-environment data 35C.

In the present modification, the local learning data 30C for each local learner apparatus 2C may be obtained in a different environment. The trained machine learning model 45C may then be generated based on the obtained local learning data 30C. This generates multiple trained machine learning models 45C derived to estimate a conversation strategy to fit the user RC using the local learning data 30C obtained in different environments.

Hardware Configuration of Conversation Apparatus

Figure 21:
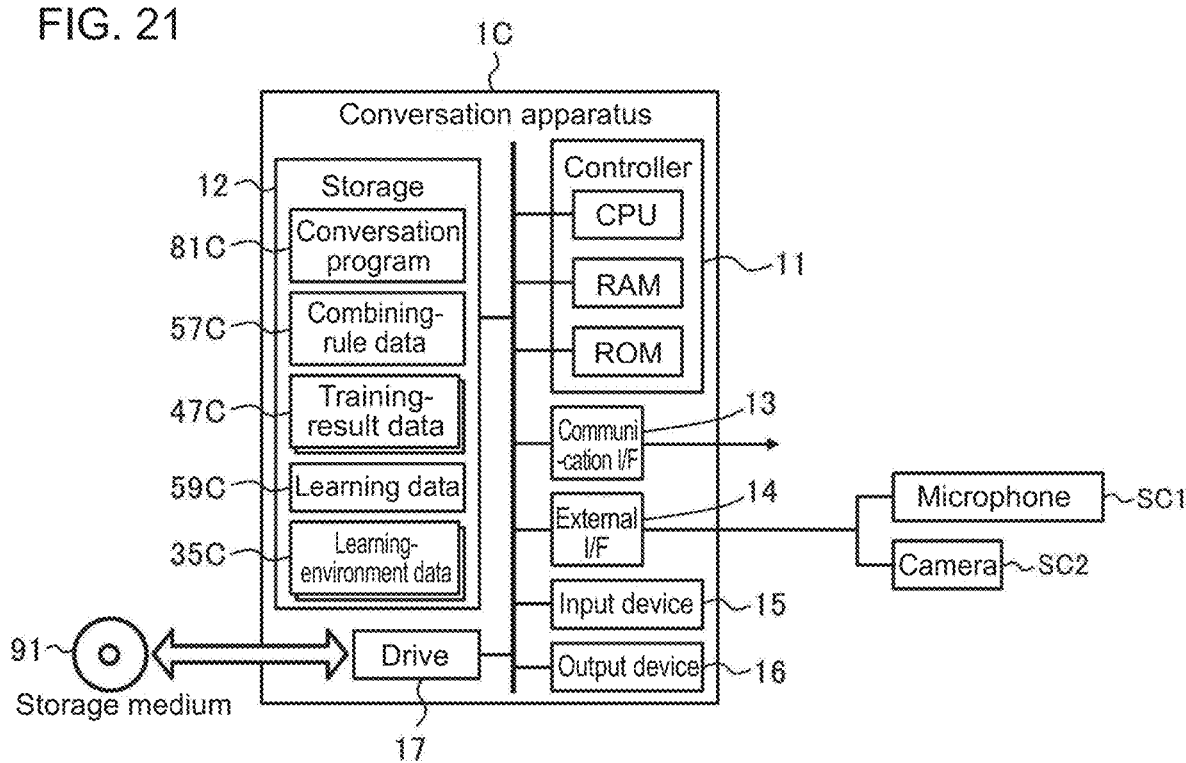
FIG. 21 is a schematic diagram illustrating a conversation apparatus according to another embodiment showing an example hardware configuration.

FIG. 21 is a schematic diagram of the conversation apparatus 1C according to the present modification showing its example hardware configuration. As shown in FIG. 21, the conversation apparatus 1C according to the present modification is a computer including a controller 11, a storage 12, a communication interface 13, an external interface 14, an input device 15, an output device 16, and a drive 17 that are electrically connected to one another. The conversation apparatus 1C is connected to the microphone SC1 and the camera SC2 through the external interface 14. However, the conversation apparatus 1C may have any other hardware configuration. For the specific hardware configuration of the conversation apparatus 1C, components may be eliminated, substituted, or added as appropriate in each embodiment. The conversation apparatus 1C may also be an information processor dedicated to a relevant service, or may be a general-purpose server or a general-purpose PC, a mobile phone, a smartphone, or a mobile PC.

The storage 12 included in the conversation apparatus 1C according to the present modification stores various items of information such as a conversation program 81C, combining-rule data 57C, the training-result data 47C, learning data 59C, and the learning-environment data 35C. The conversation program 81C, the combining-rule data 57C, the training-result data 47C, the learning data 59C, and the learning-environment data 35C correspond to the inference program 81, the combining-rule data 57, the training-result data 47, the learning data 59, and the learning-environment data 35 in the above embodiment. At least one of the conversation program 81C, the combining-rule data 57C, the training result data 47C, the learning data 59C, or the learning-environment data 35C may be stored in a storage medium 91. The conversation apparatus 1C may obtain at least one of the conversation program 81C, the combining-rule data 57C, the training-result data 47C, the learning data 59C, or the learning-environment data 35C from the storage medium 91.

Software Configuration of Conversation Apparatus

Figure 22A:
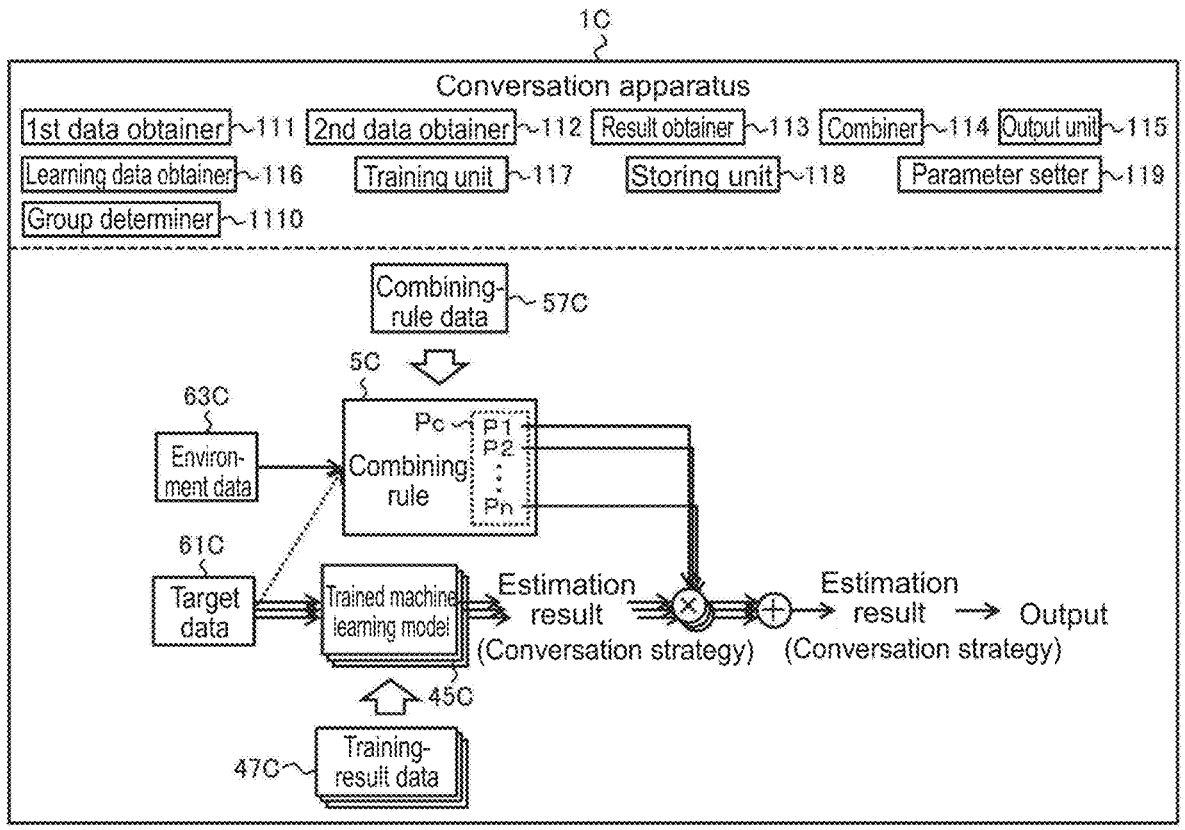
FIG. 22A is a schematic diagram illustrating a conversation apparatus according to another embodiment showing an example software configuration.
Figure 22B:
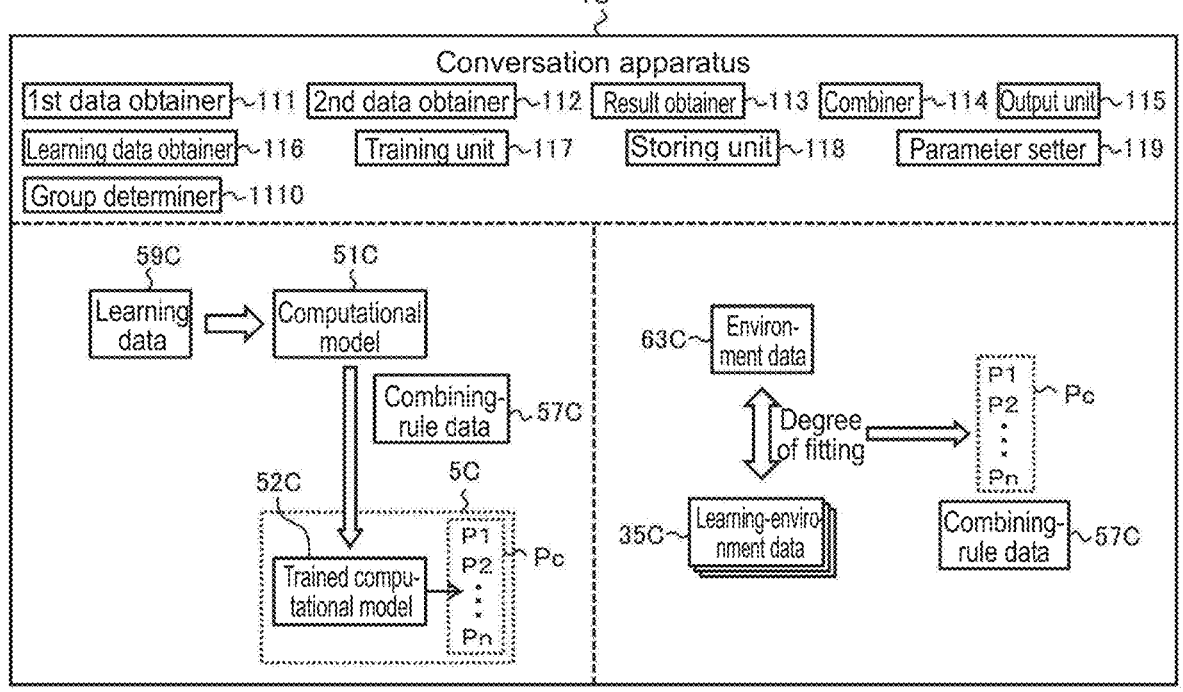
FIG. 22B is a schematic diagram illustrating a conversation apparatus according to another embodiment showing an example software configuration.

FIGS. 22A and 22B are schematic diagrams of the conversation apparatus 1C according to the present modification showing its example software configuration. In the same manner as in the above embodiment, the software configuration of the conversation apparatus 1C is implemented by the controller 11 executing the conversation program 81C. As shown in FIGS. 22A and 22B, the conversation apparatus 1C has the same software configuration as the inference apparatus 1, except the data to be used and the details of the inference. The conversation apparatus 1C thus performs the series of inference steps in the same manner as the inference apparatus 1.

Step S201

In step S201, as shown in FIG. 22A, the controller 11 in the conversation apparatus 1C obtains the target data 61C. The target data 61C may be any data about the conversational action of the target user RC and may be selected as appropriate in each embodiment. The target data 61C may include observation data obtained with a sensor for observing a conversational action of the target user RC and data representing conversation information analyzed from the observation data. The sensor for observing the conversational action may be, for example, a microphone, a camera, or a video camera. The conversation information analyzed from the observation data may include the details of the conversation, the frequency of conversations, and the distance between the conversation apparatus 1C and the user RC. A known method may be used to analyze the conversation information. The conversation information, such as the details of the conversation or the frequency of conversations, may be identified from the action of the user RC input through the input device 15.

The target data 61C may be obtained with any method selected as appropriate in each embodiment. For example, observation data obtained with a sensor for observing the conversational action may be obtained as the target data 61C. In the present modification, a microphone SC1 is connected to the conversation apparatus 1C. Thus, the controller 11 can obtain sound data obtained with the microphone SC1 as the target data 61C. For example, the target data 61C may be obtained by performing an analysis process on the observation data obtained with the sensor. In the present modification, an analysis process (e.g., speech analysis) may be performed on sound data obtained with the microphone SC1, and the analysis result (e.g., a character string of a conversation) may be obtained as the target data 61C. For example, the target data 61C may be obtained based on the action of the user RC input through the input device 15. The controller 11 may obtain the target data 61C directly from each device or indirectly through another computer.

Step S202

In step S202, the controller 11 obtains the environment data 63C. The environment data 63C may be any data about the target conversational environment in which the target user RC performs a conversational action and may be selected as appropriate in each embodiment. The environment data 63C may include data indicating an attribute of the user RC, data indicating an environmental attribute that affects the conversational action, and data indicating attributes associated with the specifications (or performance) of the sensor that observes the conversational action. The attributes of the user RC may include the age, gender, occupation, hometown, and personality of the user RC. An environmental attribute that affects the conversational action may include temperature, weather, a day of the week, or information indicating either a holiday or weekday. The attributes associated with the specifications of the target sensor may include the sensitivity limit of the sensor, the dynamic range, the definable range of the spatial resolution, and the definable range of the sampling frequency.

The environment data 63C may be obtained with any method selected as appropriate in each embodiment. The environment data 63C may be obtained based on, for example, an input of a user. For example, the environment data 63C may be obtained from a sensor for observing a conversational action. In the present modification, information about the specifications obtained from the microphone SC1 may be obtained as the environment data 63C. For example, the environment data 63C may be obtained by performing an analysis process on the observation data obtained with a sensor for observing a conversational action. In the present modification, an analysis process (e.g., speech analysis) may be performed on sound data obtained with the microphone SC1, and the analysis result (e.g., a result of discriminating the gender of a user) may be obtained as the environment data 63C. For example, the environment data 63C may be obtained from another sensor for observing a target conversational environment. In the present modification, a camera SC2 as another sensor is connected to the conversation apparatus 1C. Thus, the image data obtained with the camera SC2 may be obtained as the environment data 63C. For example, the environment data 63C may be obtained by performing an analysis process on the observation data obtained with the other sensor for observing a conversational action. In the present modification, an analysis process (e.g., an image analysis for discriminating an attribute of a user) may be performed on image data obtained with the camera SC2, and the analysis result (a result of discriminating the gender of a user) may be obtained as the environment data 63C. For example, the environment data 63C may be obtained from another information processor (server) that distributes information such as weather data. The controller 11 may obtain the environment data 63C directly from each device or indirectly through another computer.

Step S203

In step S203, the controller 11 refers to each set of training-result data 47C to define the corresponding trained machine learning model 45C. The controller 11 then inputs the target data 61C into each trained machine learning model 45C and performs a computational operation of each trained machine learning model 45C. The controller 11 can receive an output from each trained machine learning model 45C as the estimation result from each trained machine learning model 45C for the conversation strategy to fit the user RC.

Step S204

In step S204, the controller 11 refers to the combining-rule data 57C to define the combining rule 5C. The controller 11 combines the estimation result from each trained machine learning model 45C together under the combining rule 5C. More specifically, in step S211, the controller 11 determines the value of each combining parameter Pc in accordance with the environment data 63C. In addition to the environment data 63C, the target data 61C may be used further. The value of each combining parameter Pc may be determined with any of the first to third methods described below.

(1) First Method

With the first method, as shown in FIG. 22B, the controller 11 obtains the learning data 59C. The controller 11 trains a computational model 51C through machine learning using the learning data 59C. The computational model 51C may have the same configuration as and use the same method of machine learning as the computational model 51 described above. The computational model 51C may have the configuration and use the method of machine learning selected from one of the two examples described above.

In the first example, the learning data 59C, similarly to the learning data 59, may include multiple learning datasets each including a set of training environment data, training target data, and true data. The training environment data is of the same type as the environment data 63C. The training target data is of the same type as the target data 61C. The true data may include an inference result for the training target data (true result), or more specifically the data representing the conversation strategy to fit the user RC in the target environment. Each learning dataset may be generated with the same method as described in the above embodiment. The controller 11 trains the computational model 51C through machine learning using the obtained learning data 59C. The method of machine learning may be the same as in the first example.

In the second example, the computational model 51C may be value-based, policy-based, or both value-based and policy-based. As in the above embodiment, the state to be observed corresponds to the environment data 63C and the target data 61C. The action performed by the agent may be to have a conversation with the user RC. The agent can obtain an estimation result from each trained machine learning model 45C through the above series of processing steps and combines each obtained estimation result to generate an estimation result for the conversation strategy to fit the user RC in the target environment. The agent may determine the conversational action to be performed based on the generated estimation result (specifically, an estimated optimum conversation strategy).

The reward function may be defined manually by, for example, an operator. In some embodiments, the reward function may be defined to provide an immediate reward based on the appropriateness of the estimation result generated through the series of processing steps described above. The appropriateness may be provided manually by, for example, an operator. In some embodiments, the appropriateness may be evaluated based on a predetermined criterion using a determiner. The determiner may be the same as the determiner in reinforcement learning of the machine learning model 40C described above. In some embodiments, the reward function may be estimated through inverse reinforcement learning using situation data representing a demonstration by an expert. The situation data may be the same as the situation data used to define the reward function in training the machine learning model 40C through reinforcement learning described above. The controller 11 adjusts the value of each computational parameter of the computational model 51C to maximize the obtained value (expected value) in the training environment defined as appropriate. The method of reinforcement learning may be the same as in the above embodiment.

The controller 11 can train the computational model 51C through machine learning with any of the above methods. The controller 11 can thus generate a trained computational model 52C capable of estimating the value of each combining parameter Pc to fit estimation of a conversation strategy to fit the user RC in the target conversational environment using the environment data 63C (and the target data 61C). The controller 11 may store information about the generated trained computational model 52C into a predetermined storage area. The information about the trained computational model 52C may be stored as at least a part of the combining-rule data 57C, or may be stored separately from the combining-rule data 57C.

With the first method, the controller 11 determines the value of each combining parameter Pc using the trained computational model 52C generated as described above. In step S211, the controller 11 inputs the environment data 63C into the trained computational model 52C. The controller 11 may also input the target data 61C into the trained computational model 52C. The controller 11 then performs a computational operation of the trained computational model 52C. The controller 11 can receive an output from the trained computational model 52C as the value of each combining parameter Pc of each trained machine learning model 45C.

(2) Second Method

With the second method, the controller 11 determines the value of each combining parameter Pc based on a comparison between the target environment and each training environment. More specifically, the controller 11 obtains the learning-environment data 35C for each trained machine learning model 45C. The controller 11 then calculates the degree of fitting between each set of learning-environment data 35C and the environment data 63C. The degree of fitting may be in the same format or representation as in the above embodiment. In step S211 above, the controller 11 may determine the value of each combining parameter Pc for the corresponding trained machine learning model 45C in accordance with the corresponding calculated degree of fitting. The value of each combining parameter Pc may be determined in accordance with the corresponding calculated degree of fitting with the same method as described in the above embodiment.

(3) Third Method

With the third method, the controller 11 receives the value of a combining parameter Pc specified by an operator and sets the value of the target combining parameter Pc to the specified value. The screen for receiving the specified value may be the same as in the above embodiment (FIG. 12A).

Referring back to FIG. 22A, the controller 11 can determine the value of each combining parameter Pc in step S211 with at least one of the three methods described above. In step S212, the controller 11 weights the estimation result from each trained machine learning model 45C using the determined value of the corresponding combining parameter Pc. When at least one of the combining parameters Pc is set with the third method above, the controller 11 uses the set value to weight the estimation result from the trained machine learning model 45C corresponding to the target combining parameter Pc in step S212. In step S213, the controller 11 then combines the weighted estimation result from each trained machine learning model 45C together. Combining each estimation result together includes averaging of the weighted values or selecting from the weighted values based on majority rules as in the above embodiment. This allows generation of a result of estimating the conversation strategy to fit the target user RC in the target environment.

Step S205

In step S205, the controller 11 outputs information about the generated estimation result. In the same manner as in the above embodiment, the output destination and the details of the information to be output may be determined as appropriate in each embodiment. The controller 11 may directly output the estimation result generated in step S204 to the output device 16, or may perform information processing based on the generated estimation result.

For example, the controller 11 may have a conversation with the user RC based on the generated estimation result, or more specifically, the estimated conversation strategy to fit the user RC. The controller 11 may output the details of the conversation through the output device 16, such as a speaker or a display. The output of the conversation may be a sound output or an image output. The conversation may be output to a device other than the output device 16. The controller 11 may have a conversation with the user RC through another computer.

Similarly to the above embodiment, the controller 11 in the conversation apparatus 1C may assign each trained machine learning model 45C to at least one of multiple groups. The controller 11 may thus perform the combining process for each group in accordance with its purpose. The grouping may be performed with any of the above two methods.

Inference Process by Local Learner Apparatus

Each local learner apparatus 2C in the present modification can estimate the conversation strategy to fit the user RC using the trained machine learning model 45C through the processing in steps S111 to S113 in the same manner as each local learner apparatus 2 described above.

In step S111, each local learner apparatus 2C obtains target data used for the estimation. The method for obtaining the target data may be the same as in step S201 for the conversation apparatus 1C. In step S112, each local learner apparatus 2C inputs target data into the trained machine learning model 45C and performs a computational operation of the trained machine learning model 45C. Each local learner apparatus 2C can receive an output from the trained machine learning model 45C as the estimation result for the conversation strategy to fit the user RC.

In step S113, each local learner apparatus 2C outputs information about the estimation result. The output destination and the details of the information to be output may be selected as appropriate in each embodiment. Each local learner apparatus 2C may directly output the estimation result obtained in step S112 to the output device, or may perform information processing based on the obtained estimation result. Similarly to step S205 for the conversation apparatus 1C above, each local learner apparatus 2C may have, as an output process, a conversation with the user RC based on the estimated conversation strategy to fit the user RC.

Features

The structure according to the present modification reduces, in a situation in which a conversation is performed with the user RC, the cost of building an inference model for appropriately estimating a conversation strategy to fit the target user RC in a new environment. This thus shortens the time taken to build such an inference model.

A lengthy time taken to build an inference model that can appropriately estimate a conversation strategy to fit the user RC can cause repeated conversations to be performed based on a conversation strategy unfit for the user RC during such a building process of the inference model. Such conversations with the conversation apparatus may annoy the user RC, who may stop using the conversation apparatus. In contrast, the structure according to the present modification shortens the time taken to build an inference model that can appropriately estimate a conversation strategy to fit the user RC, thus increasing the usefulness of the conversation apparatus 1C.

The present modification may be modified as appropriate. When, for example, the target data 61C is obtained from a device other than the microphone SC1, the microphone SC1 may be eliminated. When the environment data 63C is obtained from a device other than camera SC2, the camera SC2 may be eliminated. The conversation apparatus 1C may be connected to each sensor (the microphone SC1 and the camera SC2) through a communication interface.

(D) Situations for Estimating Motion Command to Fit Task

Figure 23:
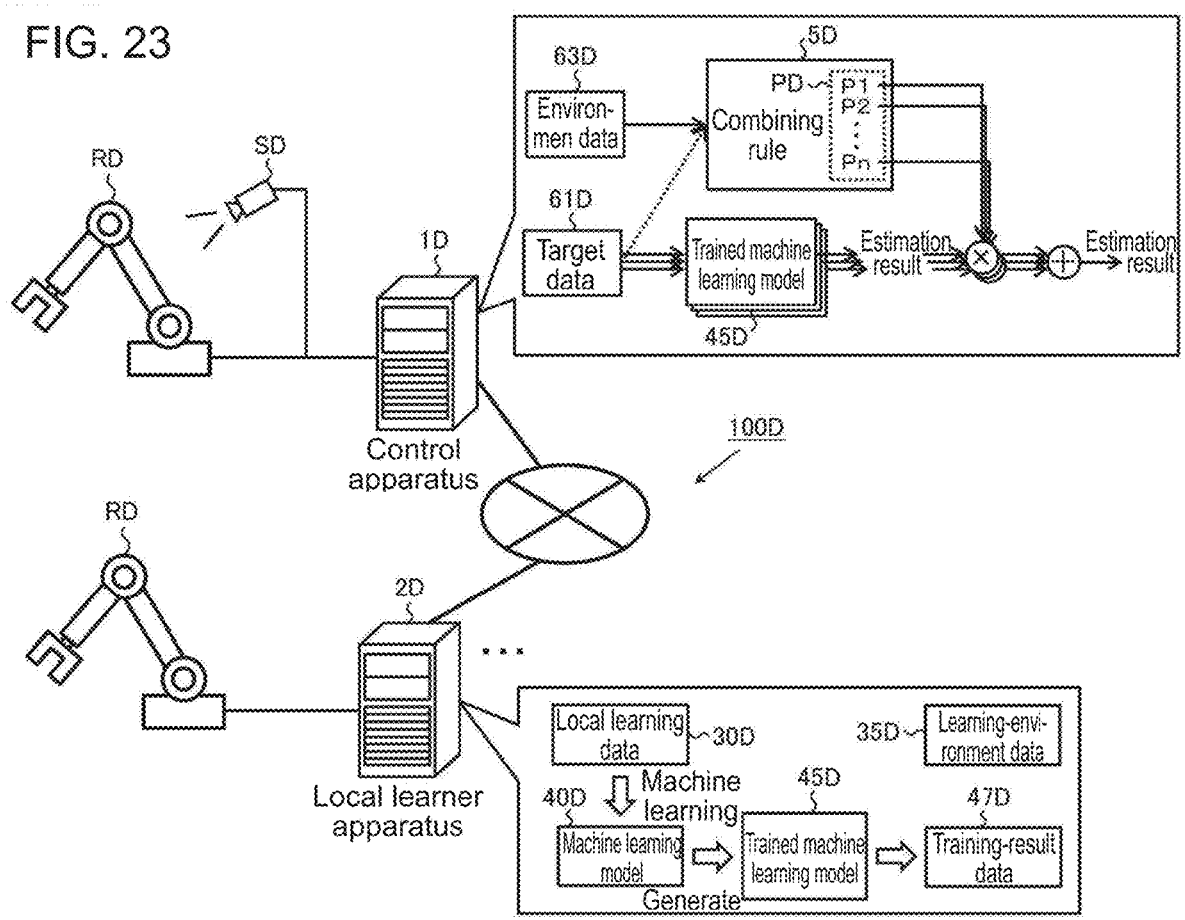
FIG. 23 is a schematic diagram illustrating an inference system according to one or more embodiments in another situation.

FIG. 23 is a schematic diagram of a control system 100D according to a fourth modification in one situation. In the present modification, the structure in the above embodiment is used in estimating the motion command to fit the task. As shown in FIG. 23, the control system 100D according to the present modification includes a control apparatus 1D and multiple local learner apparatuses 2D. In the same manner as in the above embodiment, the control apparatus 1D and the local learner apparatuses 2D may be connected to each other with a network.

The control apparatus 1D corresponds to the inference apparatus 1. The local learner apparatuses 2D correspond to the local learner apparatuses 2 in the above embodiment. The control apparatus 1D may have the same configuration as the inference apparatus 1 described above, and the local learner apparatuses 2D may have the same configuration as the local learner apparatuses 2 described above, except the data to be used and the details of the inference. The control apparatus 1D may have the same hardware and software configurations as the inference apparatus 1 described above. The local learner apparatuses 2D may have the same hardware and software configurations as the local learner apparatuses 2 described above.

Predetermined inference in the present modification includes estimating a motion command for a robot device RD to fit the task based on the state of the robot device RD. The robot device RD and the task may be of any type and may be selected as appropriate in each embodiment. Examples of the robot device RD include an industrial robot, equipment, and an autonomous driving vehicle. Examples of the equipment include an air conditioner and an illumination system. For the robot device RD being an industrial robot, the task may be, for example, to place a workpiece at a target position. For the robot device RD being a piece of equipment such as an air conditioner, the task may be determined as appropriate for the type of the equipment. The task may be, for example, to maintain a target at a predetermined temperature. For the robot device RD being an autonomous driving vehicle, the task may be, for example, to travel from a current location to a destination through autonomous driving. In the present modification, the robot device RD is connected to the control apparatus 1D, and the robot device RD is also connected to each local learner apparatus 2D. Thus, each of the control apparatus 1D and the local learner apparatuses 2D can control the operation of the corresponding robot device RD based on the estimated motion command.

Each local learner apparatus 2D in the present modification generates a trained machine learning model 45D capable of estimating a motion command for the robot device RD to fit the task. In contrast, the control apparatus 1D according to the present modification estimates a motion command for a target robot device RD to fit the task using each trained machine learning model 45D derived from local learning data 30D obtained by each local learner apparatus 2D in a different environment.

The control apparatus 1D according to the present modification obtains target data 61D to be used for the predetermined inference and environment data 63D about the target environment for performing the predetermined inference. The target data 61D to be used for the predetermined inference in the present modification is about the state of the target robot device RD. The environment data 63D about the target environment in which the predetermined inference is performed in the present modification is about the target task environment in which the target robot device RD performs the task.

In the present modification, a sensor SD is further connected to the control apparatus 1D. The sensor SD may be a camera and is used to observe the state of the target robot device RD. Thus, the control apparatus 1D according to the present modification can obtain the target data 61D from the sensor SD. The target task environment may be observed with the sensor SD or with another sensor. In this case, the control apparatus 1D according to the present modification may obtain environment data 63D from the sensor SD or from the other sensor.

The control apparatus 1D according to the present modification inputs the obtained target data 61D into each trained machine learning model 45D to cause each trained machine learning model 45D to estimate a motion command for the corresponding robot device RD to fit the task. The control apparatus 1D can thus obtain an estimation result from each trained machine learning model 45D for the motion command for the robot device RD to fit the task. The control apparatus 1D according to the present modification then combines an estimation result from each trained machine learning model 45D together under a combining rule 5D.

As in the above embodiment, the combining rule 5D includes multiple combining parameters PD each defining the priority on the estimation result from the corresponding trained machine learning model 45D in the target environment. The control apparatus 1D according to the present modification determines the value of each combining parameter PD in accordance with the environment data 63D. In addition to the environment data 63D, the target data 61D may be used further. The control apparatus 1D according to the present modification weights the estimation result from each trained machine learning model 45D using the determined value of the corresponding combining parameter PD. The control apparatus 1D according to the present modification then combines the weighted inference result from each trained machine learning model 45D together.

The control apparatus 1D according to the present modification can generate a motion command to fit the task for the target robot device RD in the target environment.

Generating Trained Machine Learning Model

Each local learner apparatus 2D in the present modification generates the trained machine learning model 45D through the processing in steps S101 to S104 in the same manner as each local learner apparatus 2 described above. In step S101, each local learner apparatus 2D obtains the local learning data 30D. In step S102, each local learner apparatus 2D trains a machine learning model 40D through machine learning using the obtained local learning data 30D. The machine learning model 40D may have the same configuration as and use the same method of machine learning as the machine learning model 40 described above.

In the present modification, the method of machine learning may be selected from the first to third examples described above. In the first example, the local learning data 30D includes multiple learning datasets each including a set of training data and true data. The training data is of the same type as the target data 61D above and may include data about the state of the robot device RD. The true data may include an inference result for the training data (true result), or more specifically the data representing the motion command for the robot device RD to fit the task. Each learning dataset may be generated with the same method as described in the above embodiment. Each local learner apparatus 2D trains the machine learning model 40D through supervised learning using the obtained local learning data 30D. The method of supervised learning may be the same as in the above embodiment.

In the second example, the local learning data 30D includes multiple sets of training data. The training data thus includes data to be generated by the machine learning model 40D. The training data includes, for example, data representing a motion command for the robot device RD to fit the task. Each local learner apparatus 2D trains the machine learning model 40D and the other machine learning model through adversarial learning using the obtained local learning data 30D. The method of adversarial learning may be the same as in the above embodiment.

In the third example, the machine learning model 40D may be value-based, policy-based, or both value-based and policy-based. The state to be observed may be the state of at least one of the inside or the outside of the robot device RD. The action performed by the agent may be an operation based on a motion command. The reward function may be defined manually by, for example, an operator. In some embodiments, the reward function may be defined to provide an immediate reward based on the appropriateness of the estimation result from the machine learning model 40D. As in the above embodiment, the appropriateness may be provided manually by, for example, an operator. In some embodiments, the appropriateness may be evaluated based on a predetermined criterion using a determiner. The determiner may evaluate the accuracy of a result from estimating a motion command to fit the task. The reward function returns, based on the results of multiple trials of the estimation process, a value indicating a positive immediate reward in response to the accuracy of estimation of a motion command greater than or equal to a threshold, and a value indicating a negative immediate reward in response to the accuracy of estimation of a motion command less than a permissible value. The accuracy of estimating the motion command may be evaluated based on the implementation status of the task, or more specifically, for example, whether the target task has been implemented appropriately. In some embodiments, the reward function may be estimated through inverse reinforcement learning using situation data representing a demonstration by an expert. In the present modification, the situation data may include data representing the trajectory of the robot device RD operated by an expert. Each local learner apparatus 2D adjusts the value of each computational parameter of the machine learning model 40D to maximize the obtained value (expected value) in the training environment defined as appropriate. The method of reinforcement learning may be the same as in the above embodiment.

Each local learner apparatus 2D can train the machine learning model 40D through machine learning with any of the above methods. Each local learner apparatus 2D in the present modification can generate the trained machine learning model 45D capable of estimating a motion command for the robot device RD to fit the task.

In step S103, each local learner apparatus 2D obtains learning-environment data 35D about an environment in which the local learning data 30D is obtained. The learning-environment data 35D is of the same type as the environment data 63D obtained by the control apparatus 1D. The learning-environment data 35D may be obtained in the same manner as the environment data 63D. In step S104, each local learner apparatus 2D generates information about the generated trained machine learning model 45D as training-result data 47D. Each local learner apparatus 2D stores, into a predetermined storage area, the training-result data 47D in a manner associated with the learning-environment data 35D.

In the present modification, the local learning data 30D for each local learner apparatus 2D may be obtained in a different environment. The trained machine learning model 45D may then be generated based on the obtained local learning data 30D. This generates multiple trained machine learning models 45D derived to estimate a motion command for the robot device RD to fit the task using the local learning data 30D obtained in different environments.

Figure 24:
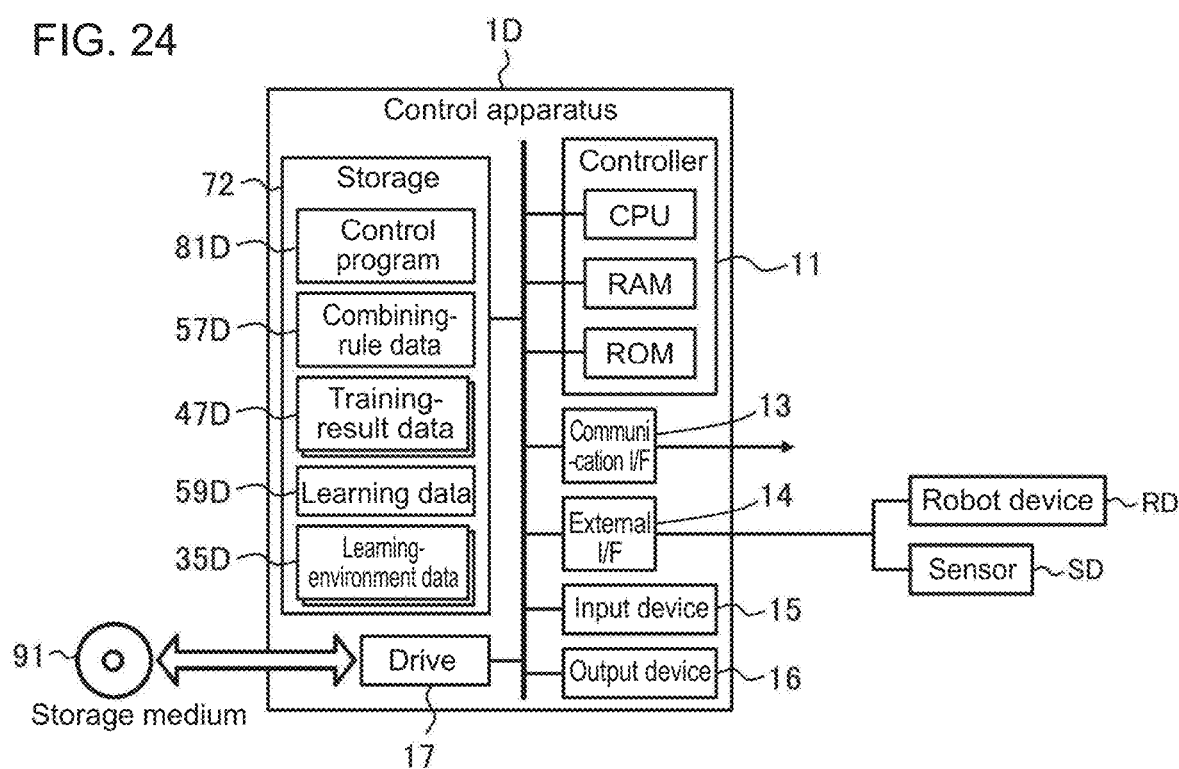
FIG. 24 is a schematic diagram illustrating a control apparatus according to another embodiment showing an example hardware configuration.

FIG. 24 is a schematic diagram of the control apparatus 1D according to the present modification showing its example hardware configuration. As shown in FIG. 24, the control apparatus 1D according to the present modification is a computer including a controller 11, a storage 12, a communication interface 13, an external interface 14, an input device 15, an output device 16, and a drive 17 that are electrically connected to one another. The control apparatus 1D is connected to the robot device RD and the sensor SD through the external interface 14. However, the control apparatus 1D may have any other hardware configuration. For the specific hardware configuration of the control apparatus 1D, components may be eliminated, substituted, or added as appropriate in each embodiment. The control apparatus 1D may also be an information processor dedicated to a relevant service, or may be a general-purpose server, a general-purpose PC, or a PLC.

The storage 12 included in the control apparatus 1D according to the present modification stores various items of information such as a control program 81D, combining-rule data 57D, the training-result data 47D, learning data 59D, and the learning-environment data 35D. The control program 81D, the combining-rule data 57D, the training-result data 47D, the learning data 59D, and the learning-environment data 35D correspond to the inference program 81, the combining-rule data 57, the training-result data 47, the learning data 59, and the learning-environment data 35 in the above embodiment. At least one of the control program 81D, the combining-rule data 57D, the training-result data 47D, the learning data 59D, or the learning-environment data 35D may be stored in a storage medium 91. The control apparatus 1D may obtain at least one of the control program 81D, the combining-rule data 57D, the training-result data 47D, the learning data 59D, or the learning-environment data 35D from the storage medium 91.

Software Configuration of Control Apparatus

Figure 25A:
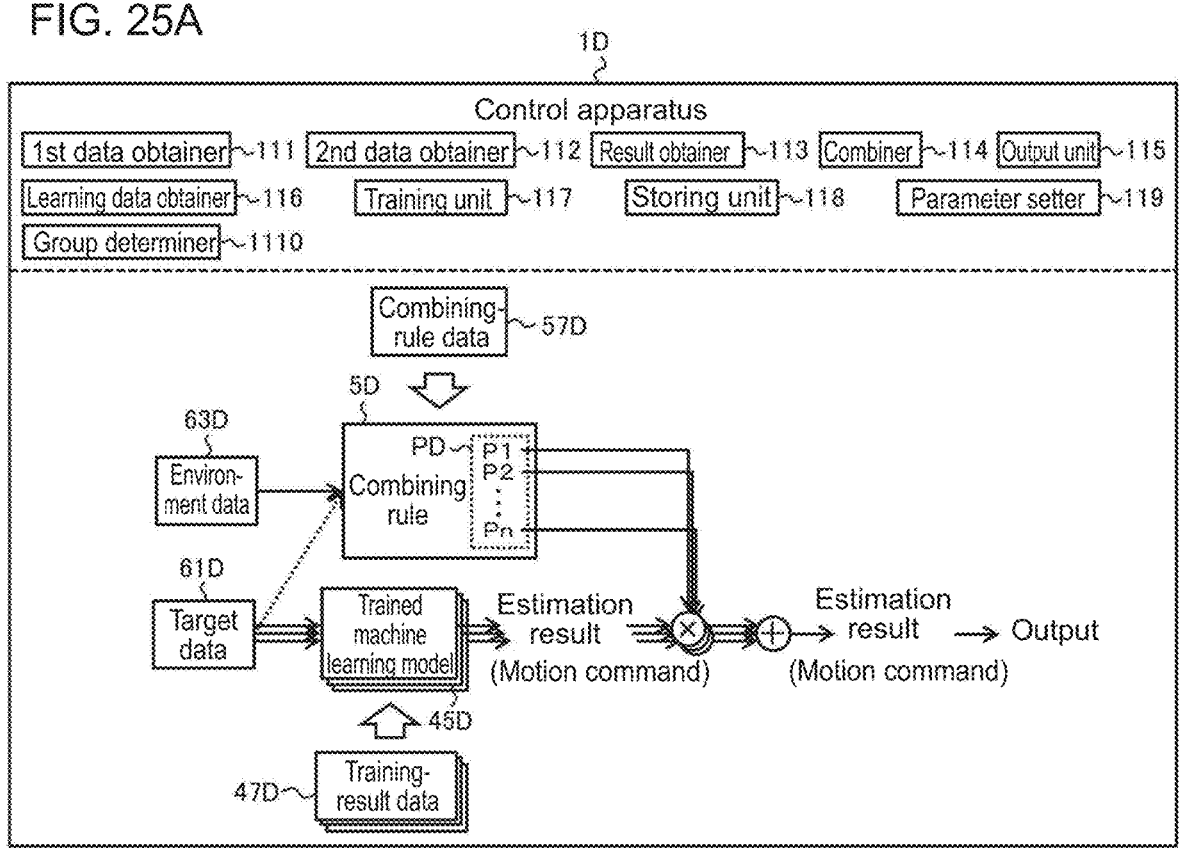
FIG. 25A is a schematic diagram illustrating a control apparatus according to another embodiment showing an example software configuration.
Figure 25B:
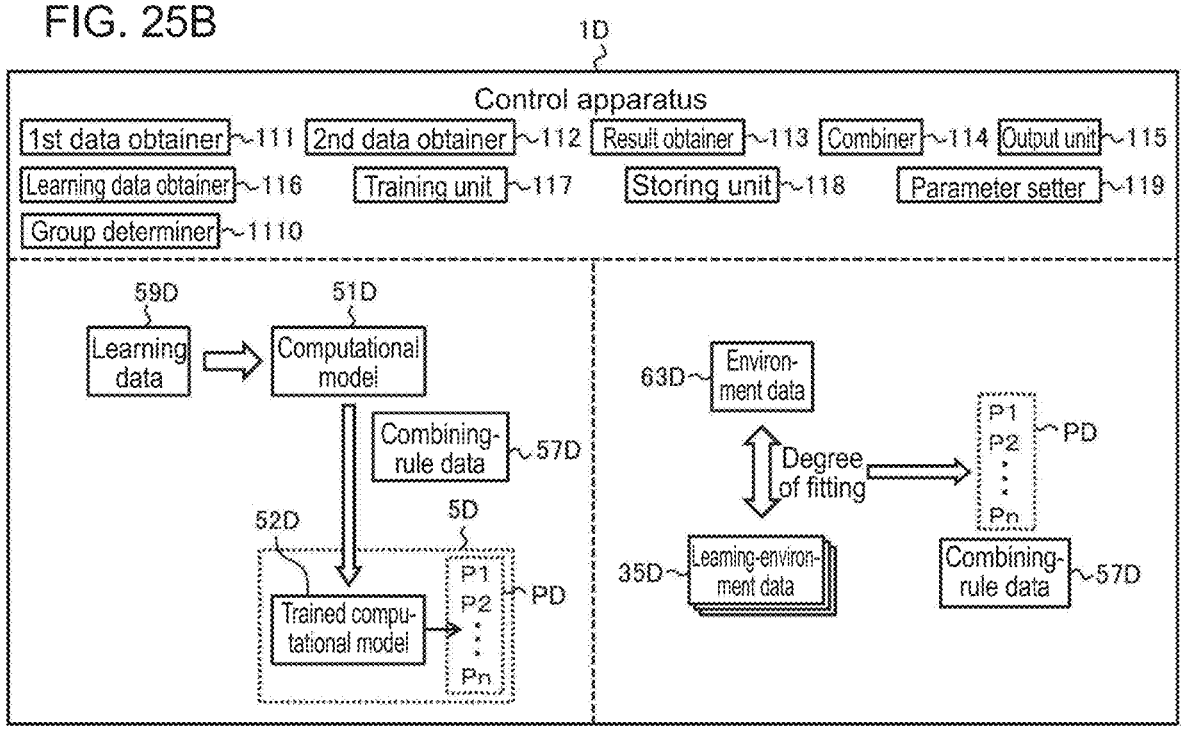
FIG. 25B is a schematic diagram illustrating a control apparatus according to another embodiment showing an example software configuration.

FIGS. 25A and 25B are schematic diagrams of the control apparatus 1D according to the present modification showing its example software configuration. In the same manner as in the above embodiment, the software configuration of the control apparatus 1D is implemented by the controller 11 executing the control program 81D. As shown in FIGS. 25A and 25B, the control apparatus 1D has the same software configuration as the inference apparatus 1, except the data to be used and the details of the inference. The control apparatus 1D thus performs the series of inference steps in the same manner as the inference apparatus 1.

Step S201

In step S201, as shown in FIG. 25A, the controller 11 in the control apparatus 1D obtains the target data 61D. The target data 61D may be any data about the state of a target robot device RD and may be selected as appropriate in each embodiment. The target data 61D may include data indicating the internal state of the robot device RD and data indicating the external state of the robot device RD.

For the robot device RD being an industrial robot, the internal state of the robot device RD may include the angle of each joint measured by an encoder or a force acting on an end-effector measured by a force sensor, and the external state of the robot device RD may include the state of a workpiece or the operating range of the workpiece. The state of the workpiece and the operating range may be observed with, for example, a sensor such as a camera.

For the robot device RD being a piece of equipment, the internal state of the robot device RD may include the operational setting (e.g., an air conditioning temperature) of the piece of equipment, and the external state of the robot device RD may include the operating range of the piece of equipment. For the piece of equipment device being an air conditioner, the operating range of the piece of equipment may include, for example, an indoor temperature obtained with a temperature sensor.

For the robot device RD being an autonomous driving vehicle, the internal state of the robot device RD may include, for example, the steering angle of the steering wheel, the degree of the acceleration, the degree of braking, any operation or no operation performed on the horn, and the external state of the robot device RD or more specifically the external state of the vehicle may include, for example, any obstacle or no obstacle being detected and the traveling road conditions. The external state of the vehicle may be observed with, for example, a camera or a Lidar sensor.

The target data 61D may be obtained with any method selected as appropriate in each embodiment. For example, data indicating the internal state may be obtained from the robot device RD as the target data 61D. For example, the target data 61D may be obtained from a sensor for observing the internal state of the robot device RD. A sensor for observing the internal state of the robot device RD may be, for example, an encoder or a force sensor. For example, the target data 61D may be obtained from a sensor for observing the external state of the robot device RD. A sensor for observing the external state of the robot device RD may be, for example, a camera, a Lidar sensor, or an infrared sensor. The target data 61D may be obtained based on, for example, an input of an operator. The controller 11 may obtain the target data 61D directly from each device or indirectly through another computer. In the present modification, the sensor SD for observing the external state of the robot device RD is connected to the control apparatus 1D. Thus, the controller 11 can obtain the target data 61D from the sensor SD.

Step S202

In step S202, the controller 11 obtains the environment data 63D. The environment data 63D may be any data about the target task environment in which the target robot device RD performs a task and may be selected as appropriate in each embodiment. The environment data 63D may include data indicating an attribute of the robot device RD, data indicating attributes associated with the specifications (or performance) of the sensor that observes the state of the robot device RD, and data indicating an attribute of the observation condition for the sensor.

The attributes of the robot device RD may include the type of the robot device RD and the performance of the robot device RD. For the robot device RD being an industrial robot, the performance of the robot device RD may be expressed by, for example, the drivable range and the load capacity. For the robot device RD being an air conditioner, the performance of the robot device RD may be expressed by, for example, the range of temperature control. For the robot device RD being an autonomous driving vehicle, the performance of the robot device RD may be expressed by, for example, the speed limit.

The attributes associated with the specifications of the sensor may include the sensitivity limit of the sensor, the dynamic range, the definable range of the spatial resolution, and the definable range of the sampling frequency. The attributes of the observation conditions of the sensor may include the installation angle of the sensor and an attribute associated with the operational setting of the sensor. The attributes of the operational settings of the sensor may include the set value for the measurement range of the sensor, the set value for the resolution of the measurement range, and the set value for the sampling frequency. For the sensor being a camera, for example, the attributes of the operational settings may include an aperture value, a shutter speed, and a zoom magnification.

The environment data 63D may be obtained with any method selected as appropriate in each embodiment. The environment data 63D may be obtained based on, for example, an input of an operator. For example, the environment data 63D may be obtained from the robot device RD or from another information processor (server) that provides information about the robot device RD. For example, the environment data 63D may be obtained from the sensor for observing the state of the robot device RD or from another information processor (server) that provides information about the robot device RD. The controller 11 may obtain the environment data 63D directly from each device or indirectly through another computer.

Step S203

In step S203, the controller 11 refers to each set of training-result data 47D to define the corresponding trained machine learning model 45D. The controller 11 then inputs the target data 61D into each trained machine learning model 45D and performs a computational operation of each trained machine learning model 45D. The controller 11 can receive an output from each trained machine learning model 45D as the estimation result from each trained machine learning model 45D for the motion command for the robot device RD to fit the task.

Step S204

In step S204, the controller 11 refers to the combining-rule data 57D to define the combining rule 5D. The controller 11 combines the inference result from each trained machine learning model 45D together under the combining rule 5D. More specifically, in step S211, the controller 11 determines the value of each combining parameter PD in accordance with the environment data 63D. In addition to the environment data 63D, the target data 61D may be used further. The value of each combining parameter PD may be determined with any of the first to third methods described below.

(1) First Method

With the first method, as shown in FIG. 25B, the controller 11 obtains the learning data 59D. The controller 11 trains the computational model 51D through machine learning using the learning data 59D. The computational model 51D may have the same configuration as and use the same method of machine learning as the computational model 51 described above. The computational model 51D may have the configuration and use the method of machine learning selected from one of the two examples described above.

In the first example, the learning data 59D, similarly to the learning data 59, may include multiple learning datasets each including a set of training environment data, training target data, and true data. The training environment data is of the same type as the environment data 63D. The training target data is of the same type as the target data 61D. The true data may include an inference result for the training target data (true result), or more specifically the data representing the motion command for the robot device RD to fit the task in the target environment. Each learning dataset may be generated with the same method as described in the above embodiment. The controller 11 trains the computational model 51D through machine learning using the obtained learning data 59D. The method of machine learning may be the same as in the first example.

In the second example, the computational model 51D may be value-based, policy-based, or both value-based and policy-based. As in the above embodiment, the state to be observed corresponds to the environment data 63D and the target data 61D. The action performed by the agent may be an operation based on a motion command. The agent can obtain an inference result from each trained machine learning model 45D through the above series of processing steps and combines each obtained inference result to generate an estimation result for the motion command for the robot device RD to fit the task in the target environment. The agent may determine an operation to be performed based on the generated estimation result (specifically, an estimated optimum motion command).

The reward function may be defined manually by, for example, an operator. In some embodiments, the reward function may be defined to provide an immediate reward based on the appropriateness of the estimation result generated through the series of processing steps described above. The appropriateness may be provided manually by, for example, an operator. In some embodiments, the appropriateness may be evaluated based on a predetermined criterion using a determiner. The determiner may be the same as the determiner in reinforcement learning of the machine learning model 40D described above. In some embodiments, the reward function may be estimated through inverse reinforcement learning using situation data representing a demonstration by an expert. The situation data may be the same as the situation data used to define the reward function in training the machine learning model 40D through reinforcement learning described above. The controller 11 adjusts the value of each computational parameter of the computational model 51D to maximize the obtained value (expected value) in the training environment defined as appropriate. The method of reinforcement learning may be the same as in the above embodiment.

The controller 11 can train the computational model 51D through machine learning with any of the above methods. The controller 11 can thus generate a trained computational model 52D capable of estimating the value of each combining parameter PD to fit estimation of a motion command to fit the task of the target robot device RD in the target task environment using the environment data 63D (and the target data 61D). The controller 11 may store information about the generated trained computational model 52D into a predetermined storage area. The information about the trained computational model 52D may be stored as at least a part of the combining-rule data 57D, or may be stored separately from the combining-rule data 57D.

With the first method, the controller 11 determines the value of each combining parameter PD using the trained computational model 52D generated as described above. In step S211, the controller 11 inputs the environment data 63D into the trained computational model 52D. The controller 11 may also input the target data 61D into the trained computational model 52D. The controller 11 then performs a computational operation of the trained computational model 52D. The controller 11 can receive an output from the trained computational model 52D as the value of each combining parameter PD of each trained machine learning model 45D.

(2) Second Method

With the second method, the controller 11 determines the value of each combining parameter PD based on a comparison between the target environment and each training environment. More specifically, the controller 11 obtains the learning-environment data 35D for each trained machine learning model 45D. The controller 11 then calculates the degree of fitting between each set of learning-environment data 35D and the environment data 63D. The degree of fitting may be in the same format or representation as in the above embodiment. In step S211 above, the controller 11 determines the value of each combining parameter PD for the corresponding trained machine learning model 45D in accordance with the corresponding calculated degree of fitting. The value of each combining parameter PD may be determined in accordance with the corresponding calculated degree of fitting with the same method as described in the above embodiment.

(3) Third Method

With the third method, the controller 11 receives the value of a combining parameter PD specified by an operator and sets the value of the target combining parameter PD to the specified value. The screen for receiving the specified value may be the same as in the above embodiment (FIG. 12A).

Referring back to FIG. 25A, the controller 11 can determine the value of each combining parameter PD in step S211 with at least one of the three methods described above. In step S212, the controller 11 weights the estimation result from each trained machine learning model 45D using the determined value of the corresponding combining parameter PD. When at least one of the combining parameters PD is set with the third method above, the controller 11 uses the set value to weight the estimation result from the trained machine learning model 45D corresponding to the target combining parameter PD in step S212. In step S213, the controller 11 then combines the weighted estimation result from each trained machine learning model 45D together. Combining each estimation result together includes averaging of the weighted values or selecting from the weighted values based on majority rules as in the above embodiment. This allows generation of a result of estimating a motion command to fit the task for the target robot device RD in the target environment.

Step S205

In step S205, the controller 11 outputs information about the generated estimation result. In the same manner as in the above embodiment, the output destination and the details of the information to be output may be determined as appropriate in each embodiment. The controller 11 may directly output the estimation result generated in step S204 to the output device 16, or may perform information processing based on the generated estimation result.

For example, the controller 11 may transmit the generated estimation result, which is the estimated motion command to fit the task to the robot device RD, as information about the estimation result to control the operation of the robot device RD in accordance with the estimated motion command. The controller 11 may directly control the operation of the robot device RD. In some embodiments, the robot device RD may include a controller. In this case, the controller 11 may indirectly control the robot device RD by transmitting a motion command to the controller.

For example, the controller 11 may generate prompt information for prompting the user to operate the robot device RD in accordance with the estimated operation command to fit the task as information about the estimation result. The controller 11 may output the generated prompt information to the output device. The output device to which the information is to be output may be the output device 16 included in the control apparatus 1D or an output device included in another computer. The other computer may be a computer located near the user, or a terminal device carried by the user.

Similarly to the above embodiment, the controller 11 in the control apparatus 1D may assign each trained machine learning model 45D to at least one of multiple groups. The controller 11 may thus perform the combining process for each group in accordance with its purpose. The grouping may be performed with any of the above two methods.

Inference Process by Local Learner Apparatus

Each local learner apparatus 2D in the present modification can estimate the motion command for the robot device RD to fit the task using the trained machine learning model 45D through the processing in steps S111 to S113 in the same manner as each local learner apparatus 2 described above.

In step S111, each local learner apparatus 2D obtains training data used for the estimation. The method for obtaining the target data may be the same as in step S201 for the control apparatus 1D described above. In step S112, each local learner apparatus 2D inputs target data into the trained machine learning model 45D and performs a computational operation of the trained machine learning model 45D. The control apparatus 2D can receive an output from the trained machine learning model 45D as the estimation result for the motion command for the robot device RD to fit the task.

In step S113, each local learner apparatus 2D outputs information about the estimation result. The output destination and the details of the information to be output may be selected as appropriate in each embodiment. Each local learner apparatus 2D may directly output the estimation result obtained in step S112 to the output device, or may perform information processing based on the obtained estimation result. For example, each local learner apparatus 2D may transmit the estimated motion command to fit the task to the robot device RD to control the operation of the robot device RD in accordance with the estimated motion command. For example, each local learner apparatus 2D may generate prompt information for prompting the user to operate the robot device RD in accordance with the estimated operation command to fit the task and output the generated prompt information to the output device.

Features

The structure according to the present modification reduces, in a situation in which an operation of the robot device RD is controlled, the cost of building an inference model for appropriately estimating a motion command for the target robot device RD to fit a task in a new environment. This structure reduces the cost of generating a sequence of motions to appropriately perform the task.

The present modification may be modified as appropriate. When, for example, the target data 61D is obtained from a device other than the sensor SD, the sensor SD may be eliminated. The control apparatus 1D may be connected to each device (the robot device RD and the sensor SD) through a communication interface.

4.2

In the above embodiment, the inference apparatus 1 generates the trained computational model 52 by training the computational model 51 through machine learning. However, a different apparatus may generate the trained computational model 52. Another computer different from the inference apparatus 1 may generate the trained computational model 52 by training the computational model 51 through machine learning.

Figure 26A:
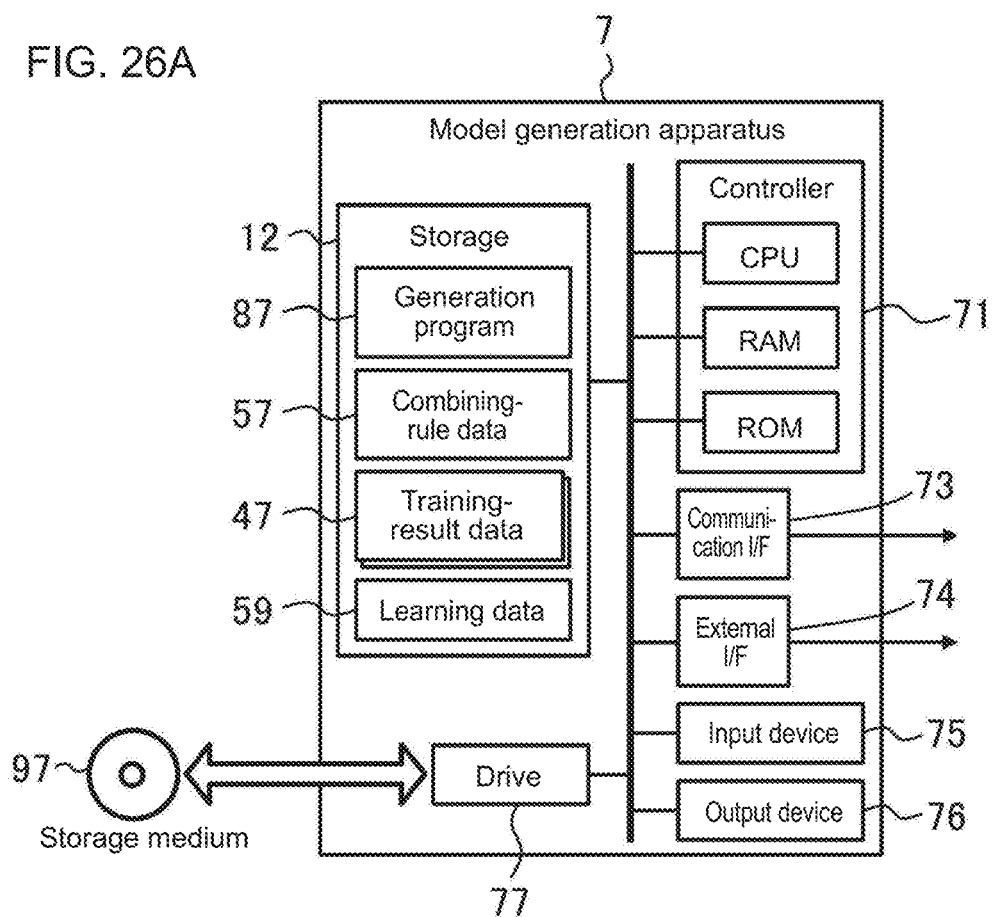
FIG. 26A is a schematic diagram illustrating a model generation apparatus according to another embodiment showing an example hardware configuration.

FIG. 26A is a schematic diagram of a model generation apparatus 7 according to the present modification showing its example hardware configuration. The model generation apparatus 7 is an example of another computer that generates the trained computational model 52. As shown in FIG. 26A, the model generation apparatus 7 according to the present modification is a computer including a controller 71, a storage 72, a communication interface 73, an external interface 74, an input device 75, an output device 76, and a drive 77 that are electrically connected to one another. The components of the model generation apparatus 7 from the controller 71 to the drive 77 may be the same as the corresponding components from the controller 11 to the drive 17 in the inference apparatus 1 described above. However, the model generation apparatus 7 may have any other hardware configuration. For the specific hardware configuration of the model generation apparatus 7, components may be eliminated, substituted, or added as appropriate in each embodiment. The model generation apparatus 7 may also be an information processor dedicated to a relevant service, or may be a general-purpose server or a general-purpose PC.

The storage 72 included in the model generation apparatus 7 according to the present modification stores various items of information such as a generation program 87, combining-rule data 57, training-result data 47, and learning data 59. The generation program 87 causes the model generation apparatus 7 to perform the information processing for training the computational model 51 through machine learning. The generation program 87 includes a series of instructions for this information processing. At least one of the generation program 87, the combining-rule data 57, the training-result data 47, or the learning data 59 may be stored in a storage medium 97. The storage medium 97 may be the same as the storage medium 91 described above. The model generation apparatus 7 may obtain at least one of the generation program 87, the combining-rule data 57, the training-result data 47, or the learning data 59 from the storage medium 97.

Figure 26B:
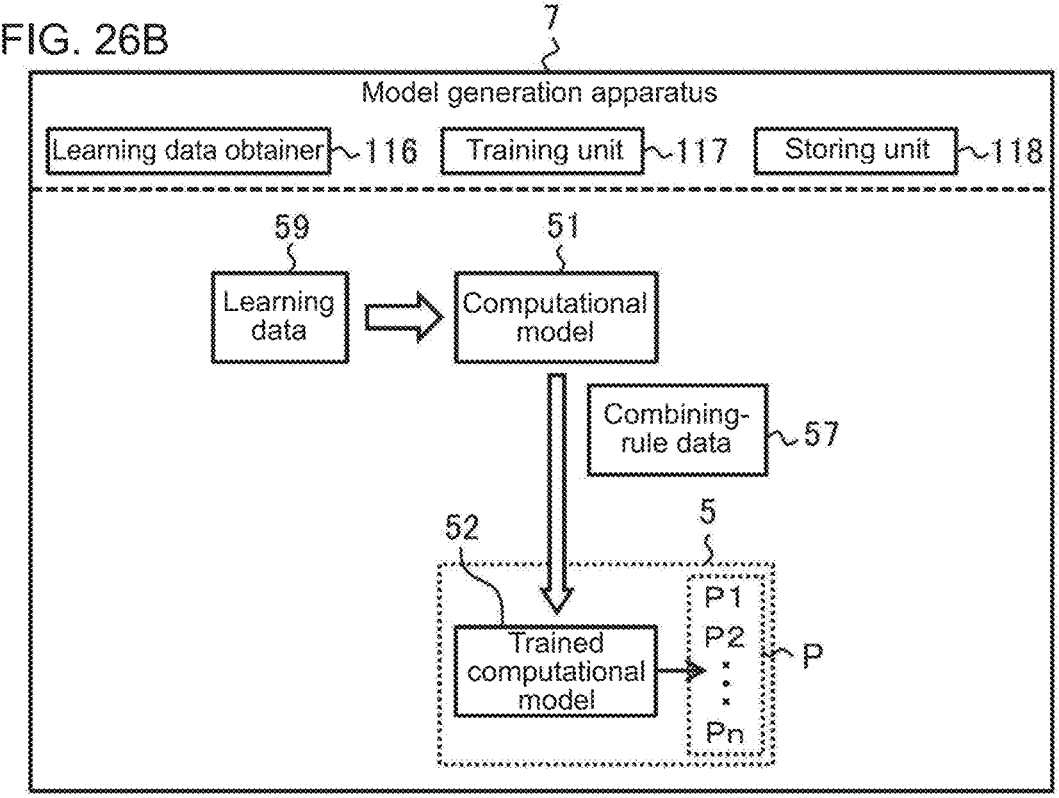
FIG. 26B is a schematic diagram illustrating a model generation apparatus according to another embodiment showing an example software configuration.

FIG. 26B is a schematic diagram of the model generation apparatus 7 according to the present modification showing its example software configuration. The controller 71 in the model generation apparatus 7 executes the generation program 87 stored in the storage 72. The model generation apparatus 7 thus operates as a computer including a learning data obtainer 116, a training unit 117, and a storing unit 118 as software modules. However, some or all of the software modules of the model generation apparatus 7 may be implemented by one or more dedicated processors. For the software configuration of the model generation apparatus 7, software modules may be eliminated, substituted, or added as appropriate in each embodiment.

The model generation apparatus 7 includes the learning data obtainer 116, the training unit 117, and the storing unit 118 as software modules to implement the processing in steps S301 to S303 above. In step S301, the controller 71 operates as the data obtainer 116 and obtains the learning data 59. In step S302, the controller 71 operates as the training unit 117 and trains the computational model 51 through machine learning using the learning data 59. In step S303, the controller 71 operates as the storing unit 118 and stores, into a predetermined storage area, information about the result from training the computational model 51 through machine learning, or the trained computational model 52. The information about the trained computational model 52 may be stored as at least a part of the combining-rule data 57. The controller 71 can thus generate the trained computational model 52 in the same manner as in the above embodiment.

The information about the generated trained computational model 52 may be provided to the inference apparatus 1 at any selected time. When the inference apparatus 1 is not designed to generate the trained computational model 52, the learning data obtainer 116, the training unit 117, and the storing unit 118 may be eliminated from the software configuration of the inference apparatus 1. The learning data 59 may also be eliminated from the information stored in the storage 12 in the inference apparatus 1.

This may also apply to the inspection apparatus 1A, the prediction apparatus 1B, the conversation apparatus 1C, and the control apparatus 1D according to the above modifications. In at least one of the inspection apparatus 1A, the prediction apparatus 1B, the conversation apparatus 1C, or the control apparatus 1D according to the above modifications, the trained computational models 52A to 52D may be generated by another computer. In this case, the learning data obtainer 116, the training unit 117, and the storing unit 118 may be eliminated from the software configuration.

4.3

In the above embodiment, each local learner apparatus 2 may perform both the generation process of generating the trained machine learning model 45 and the inference process of using the generated trained machine learning model 45. However, each local learner apparatus 2 may have another configuration. At least one of the multiple local learner apparatuses 2 may include multiple computers. In this case, the local learner apparatus 2 may include separate computers to perform the generation process and the inference process separately.

Figure 27:
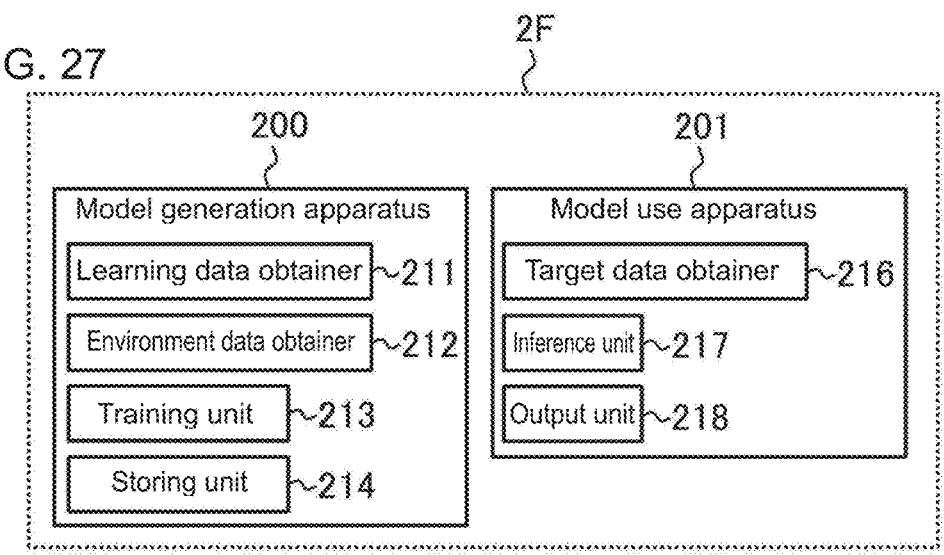
FIG. 27 is a schematic diagram illustrating a local learner apparatus according to another embodiment or embodiments showing an example configuration.

FIG. 27 is a schematic block diagram of a local learner apparatus 2F in the present modification showing its example configuration. In the present modification, the local learner apparatus 2F includes a model generation apparatus 200 that performs the above generation process and a model use apparatus 201 that performs the above inference process. The model generation apparatus 200 and the model use apparatus 201 may each have the same hardware configuration as each local learner apparatus 2 in the above embodiment.

The model generation apparatus 200 executes the training program 821 to operate as a computer including a learning data obtainer 211, an environment data obtainer 212, a training unit 213, and a storing unit 214 as software modules. The model generation apparatus 200 thus trains the machine learning model 40 through machine learning and generates the trained machine learning model 45.

The model use apparatus 201 executes the inference program 822 to operate as a computer including a target data obtainer 216, an inference unit 217, and an output unit 218 as software modules. The model use apparatus 201 thus generates a trained machine learning model 45 capable of performing predetermined inference.

At least one of the local learner apparatuses 2A to 2D in the above modifications may also include separate computers to perform the generation process and the inference processes separately as in the present modification.

4.4

In the above embodiment, the number of trained machine learning models 45 generated by the local learner apparatuses 2 may be determined as appropriate in each embodiment. At least one of the local learner apparatuses 2 may collect multiple sets of local learning data 30 and use each obtained set of local learning data 30 to generate multiple trained machine learning models 45. When a single local learner apparatus 2 generates multiple trained machine learning models 45, the single local learner apparatus 2 may generate multiple trained machine learning models 45 used by the inference apparatus 1.

In the above embodiment, each local learner apparatus 2 trains the machine learning model 40 through machine learning to generate the trained machine learning model 45. However, the machine learning model 40 may not be trained through machine learning (or specifically, the trained machine learning model 45 may not be generated) by each local learner apparatus 2. The machine learning model 40 may be trained through machine learning by a computer such as another information processor other than the inference apparatus 1 or each local learner apparatus 2.

In the above embodiment, the trained machine learning model 45 is used as an example of an inference model that performs predetermined inference. However, each inference model may not be the trained machine learning model but may have any configuration that can perform the predetermined inference and may be selected as appropriate in each embodiment. The inference model may be derived by a method other than machine learning. For example, the inference model may be derived manually. More specifically, a model heuristically determined by a human referring to the local learning data 30 may be used as the inference model.

The format and the details of an output (inference result) may not be identical for each inference model used for inference. At least either the format or the details of an output may differ for each inference model by a degree that allows the inference result from each inference model to be combined together. For example, multiple inference models for estimating motion commands for robot devices with different numbers of joints may be used to estimate motion commands for the robot devices in the target environment.

Figure 28:
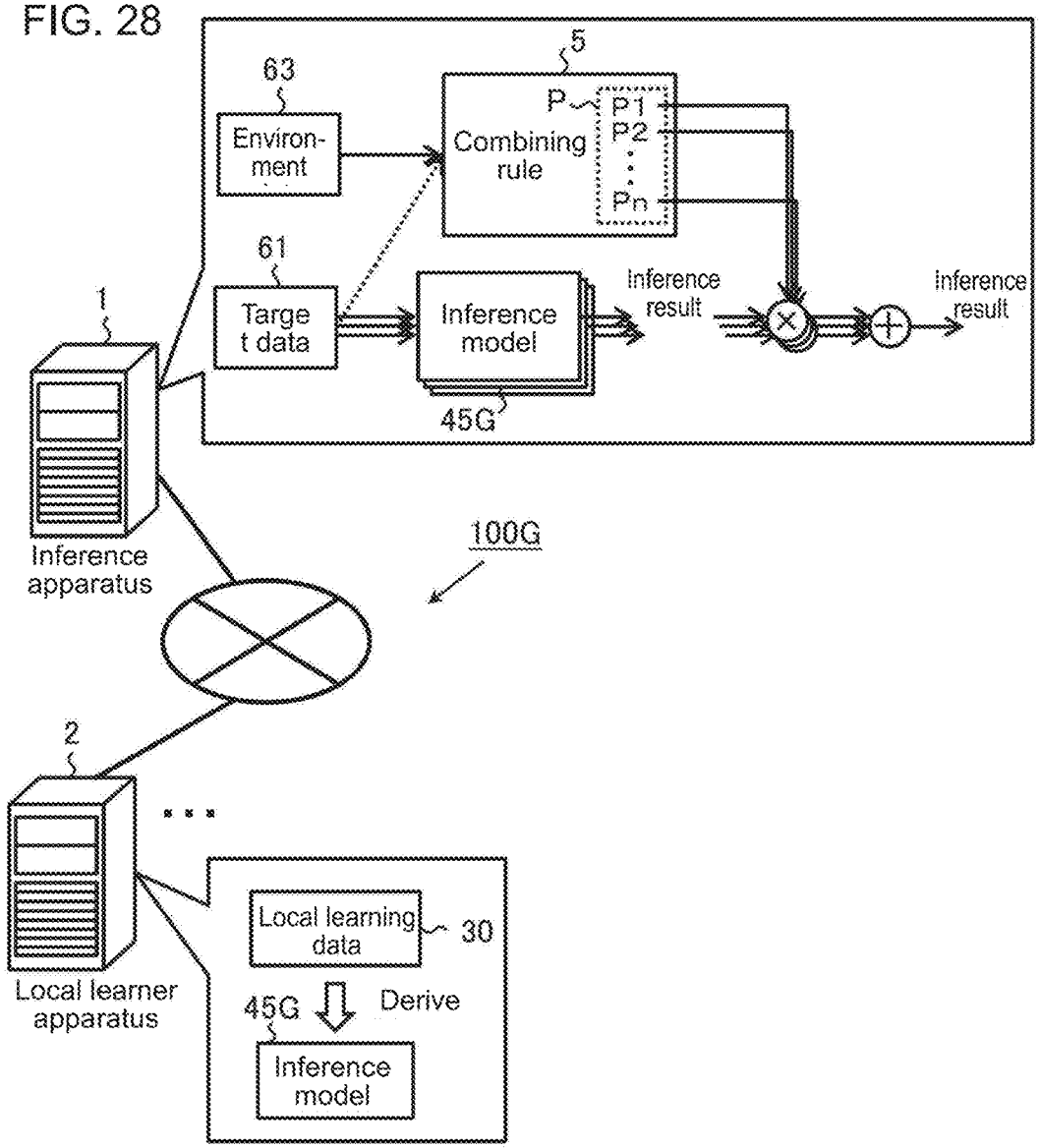
FIG. 28 is a schematic diagram illustrating an inference system according to one or more embodiments in another situation.

FIG. 28 is a schematic diagram of an inference system 100G according to the present modification in one situation. The inference system 100G according to the present modification may have the same structure as the inference system 100 described above, except that the trained machine learning model 45 is replaced by an inference model 45G. The inference model 45G may be expressed using, for example, a data table, a functional expression, or a rule.

The inference model 45G may be derived from the local learning data 30 with any method selected as appropriate in each embodiment. The inference model 45G may be derived by an operator operating the local learner apparatus 2. When the inference model 45G is derived manually, the training unit 117 may be eliminated from the software configuration of each local learner apparatus 2. The storing unit 118 may store, into a predetermined storage area, information about the inference model 45G derived manually. This modification reduces the burden of manually generating an inference model in a new environment.

This may also apply to the inspection system 100A, the prediction system 100B, the conversation system 1000, and the control system 100D according to the above modifications. At least one of the inspection system 100A, the prediction system 100B, the conversation system 1000, or the control system 100D described above may use inference models derived by a method other than machine learning. For example, the trained machine learning models 45A to 45D may be replaced with models heuristically determined by a human referring to the sets of local learning data 30A to 30D.

4.5

In the above embodiment, the inference apparatus 1 stores each inference model (each trained machine learning model 45). In step S203, the controller 11 obtains an inference result from each inference model by performing a computational operation of each inference model. However, an inference result from each inference model may be obtained with another method. At least one of the multiple inference models used in a predetermined inference may not be stored in the inference apparatus 1, but may be stored in another computer such as the local learner apparatus 2, an information processing device other than the local learner apparatus 2 and other components.

In this case, in step S203 above, the controller 11 may transmit the target data 61 to another computer and cause the other computer to perform a computational operation of the inference model. The controller 11 may then obtain an inference result from each inference model by receiving the computational results from the other computer. In this case, the corresponding training-result data 47 may be eliminated from the information stored in, for example, the storage 12 in the inference apparatus 1. This may also apply to the inspection system 100A, the prediction system 100B, the conversation system 1000, and the control system 100D according to the above modifications.

In the above embodiment, the first to third methods described above can be used for determining the value of each combining parameter P. However, any of the first to third methods above may be eliminated. When the second method based on the degree of fitting is eliminated, the learning-environment data 35 may be eliminated from the information stored in, for example, the storage 12 in the inference apparatus 1. The environment data obtainer 212 may be eliminated from the software configuration of each local learner apparatus 2. Further, the processing in step S103 may be eliminated from the procedure for generating the trained machine learning model 45, and associating the learning-environment data 35 may be eliminated from the processing in step S104. When the third method including determination as specified by an operator is not used, the parameter setter 119 may be eliminated from the software configuration of the inference apparatus 1. This may also apply to the inspection system 100A, the prediction system 100B, the conversation system 1000, and the control system 100D according to the above modifications.

In the above embodiment, the process for grouping the inference models may be eliminated. In this case, the group determiner 1110 may be eliminated from the software configuration of the inference apparatus 1. This may also apply to the inspection apparatus 1A, the prediction apparatus 1B, the conversation apparatus 1C, and the control apparatus 1D according to the above modifications.

5. Working Example

To verify the effectiveness of training the computational model 51 through machine learning, trained models according to a working example and a comparative example below were generated in a simulation environment for reinforcement learning provided by OpenAI. The present invention is not limited to the working example described below.

Figure 29:
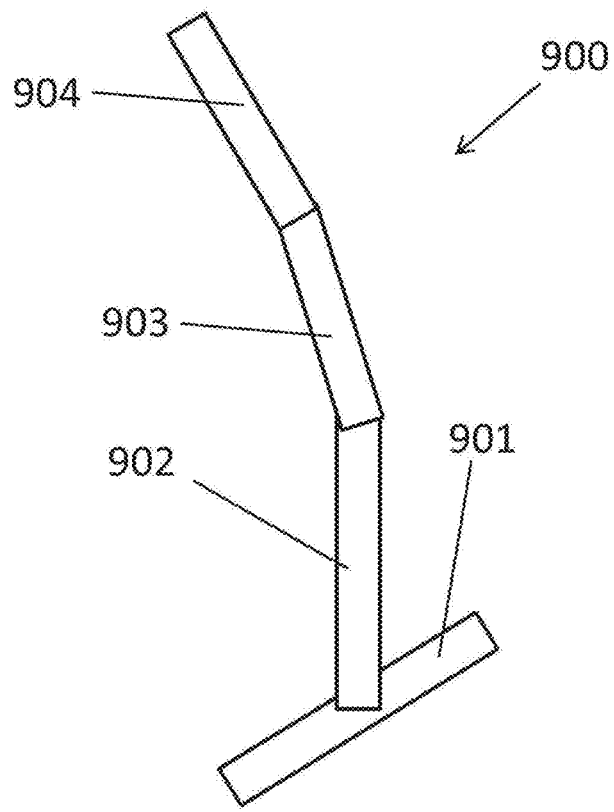
FIG. 29 is a schematic overall diagram illustrating a robot device used in simulations according to a working example and a comparative example in accordance with one or more embodiments.

A robot device (Hopper) used in the simulation environment in the working example and the comparative example will be first described with reference to FIG. 29. FIG. 29 is a schematic overall diagram of a robot device 900 used in the simulation environment for the working example and the comparative example. The robot device 900 includes multiple links connected by joints. Of these multiple links, the lowest link that contacts the ground is a foot 901, and a link that connects to the foot 901 is a leg 902. A link that connects to the leg 902 is a thigh 903. A link that connects to the thigh 903 is a body (torso) 904. The robot device 900 moves forward by moving these links. In the working example and the comparative example, the basic conditions below were used, under which the model was trained through reinforcement learning using a reward for a more motion in a predetermined time period.

Basic Conditions
  Method of reinforcement learning: policy-based proximal policy optimization (PPO)
  Number of environments to be observed in parallel: 8
  Maximum number of time steps for episode: 2,048
  Learning rate: 0.00025
  Definition of policy function: 4-layer fully coupled neural network including a second layer and a third layer as intermediate (hidden) layers
  Intermediate layers in policy function: second and third layers each with 64 channels
  Definition of value function: 4-layer fully coupled neural network including a second layer and a third layer as intermediate (hidden) layers
  Intermediate layers in value function: second and third layers each with 64 channels
  Activation function: tanh function (hyperbolic tangent function)
  Discount factor: 0.99
  Generalized advantage estimation (GAE) parameter: 0.95
  Clipping width: 0.2
  Batch size: 128
  Number of training epochs after each rollout: 10
  Entropy coefficient: 0
  Optimization algorithm: ADAM In the working example, four agents each meeting the above basic conditions were prepared. The four agents were then trained through reinforcement learning until a maximum reward was provided for the robot devices 900 having the dynamics under the first to fourth conditions shown in Table 1 below. This process generates four trained models.

TABLE 1

|  | Leg Length | Foot length | Weight of link | Joint attenuation |
|---|---|---|---|---|
| First condition | 0.47 | 0.36 | Default × 0.8 | 0.5 |
| Second condition | 0.44 | 0.33 | Default × 0.8 | 2.0 |
| Third condition | 0.5 | 0.39 | Default × 0.9 | 1.5 |
| Fourth condition | 0.53 | 0.42 | Default × 0.9 | 1.0 |

An agent with the above basic conditions operable as the combining rule 5 in the above embodiment was prepared. The inference results from the four trained models were combined together to generate a model for determining the operation of the robot device 900.

An agent with the above basic conditions was also prepared to generate a model according to a comparative example for determining the operation of the robot device 900.

The robot device 900 having the dynamics of interpolation conditions and the robot device 900 having the dynamics of extrapolation conditions shown in Table 2 below were prepared. The operation of each of the two robot devices 900 was trained through reinforcement learning three times using the model according to the working example or the model according to the comparative example. The average of the trials was then calculated. The interpolation conditions correspond to an experimental sample within the range of the above first to fourth conditions. The extrapolation conditions correspond to an experimental sample outside the range of the above first to fourth conditions.

TABLE 2

|  | Leg Length | Foot length | Weight of link | Joint attenuation |
|---|---|---|---|---|
| Interpolation condition | 0.5 | 0.39 | Default × 0.8 | 2 |
| Extrapolation condition | 0.41 | 0.3 | Default × 0.75 | 2.5 |

Figure 30A:
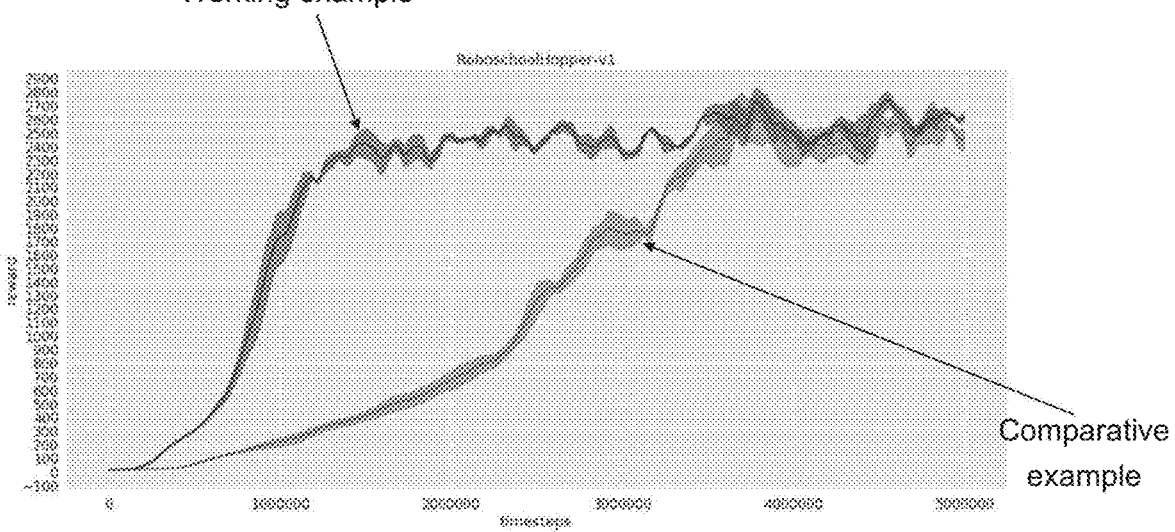
FIG. 30A is a graph illustrating results of reinforcement learning used to train a motion of a robot device having a dynamics of interpolation conditions in a working example and a comparative example in accordance with one or more embodiments.
Figure 30B:
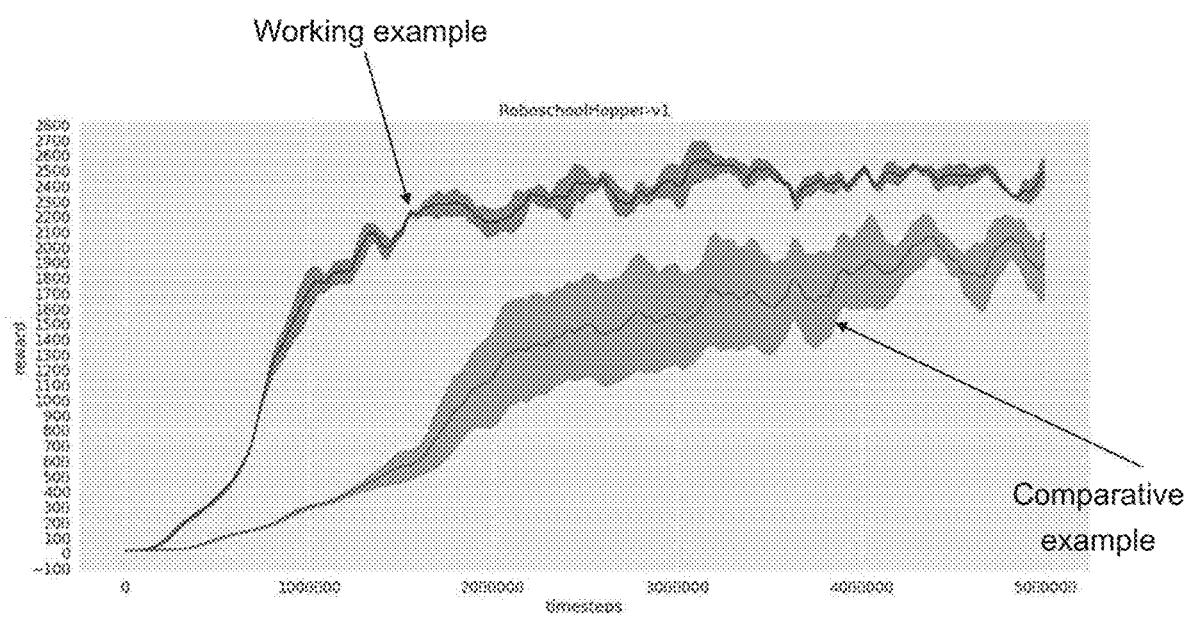
FIG. 30B is a graph illustrating results of reinforcement learning used to train a motion of a robot device having a dynamics of extrapolation conditions in a working example and a comparative example in accordance with one or more embodiments.

FIG. 30A is a graph showing the results of reinforcement learning used to train the motion of the robot device 900 having the dynamics of interpolation conditions in the working example and the comparative example. FIG. 30B is a graph showing the results of reinforcement learning used to train the motion of the robot device 900 having the dynamics of extrapolation conditions in the working example and the comparative example. The vertical axis indicates the reward obtained in each episode, and the horizontal axis indicates the number of episodes.

As shown in FIGS. 30A and 30B, the model was trained in the working example to yield the maximum reward in a much shorter time than the model in the comparison example both under the interpolation and extrapolation conditions. The results show that the computational model 51 in the above embodiment trained through machine learning also allows an inference model for performing appropriate estimation to be built in a shorter time and at a lower cost than generating a new trained machine learning model in a new environment.

REFERENCE SIGNS LIST

1 inference apparatus
11 controller 12 storage
13 communication interface
14 external interface
15 input device
16 output device
17 drive
91 storage medium
81 inference program
2 local learner apparatus
21 controller
22 storage
23 communication interface
24 external interface
25 input device
26 output device
27 drive
92 storage medium
821 training program
822 inference program
225 target data
30 local learning data
35 learning-environment data
40 machine learning model
45 trained machine learning model
47 training-result data
5 combining rule
P1 to Pn combining parameter
51 computational model
52 trained computational model
57 combining-rule data
59 learning data
61 target data
63 environment data

The invention claimed is:

1. An inference apparatus, comprising:
a processor configured with a program to perform operations comprising:
operation as a first data obtainer configured to obtain predetermined target data usable in predetermined inference;
operation as a second data obtainer configured to obtain environment data about a target environment in which the predetermined inference is to be performed;
operation as a result obtainer configured to provide the target data to a plurality of inference models and obtain an inference result for the target data from each of the plurality of inference models, each of the plurality of inference models being derived from local learning data obtained in a different environment, each of the plurality of inference models being configured to perform the predetermined inference using the target data; and
operation as a combiner configured to combine the inference result from each of the plurality of inference models under a combining rule to generate an inference result for the target data in the target environment, wherein
the combining rule comprises a plurality of combining parameters, each of the plurality of combining parameters defining a priority on an inference result from a corresponding inference model of the plurality of inference models in the target environment,
combining the inference result from each of the plurality of inference models under the combining rule including comprises
determining a value of each of the plurality of combining parameters using the obtained environment data,
weighting the inference result from each of the plurality of inference models using the determined value of each of the plurality of combining parameters, and
combining the weighted inference result from each of the plurality of inference models; and
the processor is configured with the program to perform operations further comprising operation as an output unit configured to output information about the inference result generated from the combining.

2. The inference apparatus according to claim 1, wherein each of the plurality of inference models comprises a trained machine learning model trained to perform the predetermined inference through machine learning using the local learning data.

3. The inference apparatus according to claim 1, wherein the processor is configured with the program to perform operations further comprising:
operation as a training unit configured to train, through machine learning, a computational model for calculating the value of each of the plurality of combining parameters using the environment data, the machine learning comprising training the computational model to calculate the value of each of the plurality of combining parameters to fit the predetermined inference in the target environment, wherein
the combining rule further comprises a trained computational model built through the machine learning, and
determining the value of each of the plurality of combining parameters using the environment data comprises providing the environment data to the trained computational model and causing the trained computational model to perform a computational operation to receive an output from the trained computational model as the value of each of the plurality of combining parameters.

4. The inference apparatus according to claim 3, wherein the machine learning to train the computational model comprises reinforcement learning using a reward defined in accordance with appropriateness of the inference result generated from the combining, and
training the computational model comprises repeatedly correcting a value of a computational parameter comprised in the computational model to have a higher reward.

5. The inference apparatus according to claim 1, wherein determining the value of each of the plurality of combining parameters using the environment data comprises
obtaining learning-environment data about an environment in which the local learning data used to derive each of the plurality of inference models is obtained,
calculating a degree of fitting between the obtained learning-environment data and the environment data, and
determining the value of each of the plurality of combining parameters for the corresponding inference model of the plurality of inference models using the calculated degree of fitting.

6. The inference apparatus according to claim 1, wherein the processor is configured with the program to perform operations further comprising:
operation as a parameter setter configured to receive a specified value of at least one combining parameter of the plurality of combining parameters, and set a value of the at least one combining parameter to the specified value, wherein weighting the inference result from each of the plurality of inference models comprises s weighting an inference result from an inference model corresponding to the at least one combining parameter using the set value.

7. The inference apparatus according to claim 1, wherein the predetermined inference comprises estimating a changing method of changing from a current observation state in which an attribute of a target is observable with a sensor to an appropriate observation state in which observation data satisfying a predetermined condition is to be obtained with the sensor,
the target data comprises data about a current observation state with a target sensor, and
the environment data comprises data about a target observation environment in which the target sensor observes the attribute of the target.

8. The inference apparatus according to claim 7, wherein the environment data is obtainable with a sensor different from the target sensor, and the sensor different from the target sensor observes the target observation environment.

9. The inference apparatus according to claim 7, wherein the inference apparatus is connected to an intervening device configured to change an observation state with the target sensor,
the information about the inference result comprises command information for causing the intervening device to perform an operation to change the observation state with the target sensor with the estimated changing method, and
the output unit transmits the command information to the intervening device to cause the intervening device to perform the operation to change the observation state with the target sensor with the estimated changing method.

10. The inference apparatus according to claim 7, wherein the information about the inference result comprises prompt information for prompting a user to change the observation state with the target sensor with the changing method, and
the output unit outputs the prompt information to an output device.

11. The inference apparatus according to claim 7, wherein the sensor comprises a camera,
the observation data comprises image data, and
the predetermined condition comprises a condition under which the target is comprised in the image data to allow an inspection of the attribute of the target.

12. The inference apparatus according to claim 1, wherein the predetermined inference comprises predicting a path to be traveled by a movable object based on a state of the movable object,
the target data includes data about a state of a target movable object observable with a sensor, and
the environment data comprises data about a target observation environment in which travel of the target movable object is observable with the sensor.

13. The inference apparatus according to claim 1, wherein the predetermined inference comprises estimating, from a conversational action of a user, a conversation strategy to fit the user,
the target data comprises data about a conversational action of a target user, and
the environment data comprises data about a conversational environment in which the target user performs the conversational action.

14. The inference apparatus according to claim 1, wherein the predetermined inference comprises estimating a motion command for a robot device to fit a task based on a state of the robot device,
the target data comprises data about a state of a target robot device, and
the environment data comprises data about a target task environment in which the target robot device performs the task.

15. An inference method implementable by a computer, the method comprising:
obtaining predetermined target data usable in predetermined inference;
obtaining environment data about a target environment in which the predetermined inference is to be performed;
providing the target data to a plurality of inference models and obtaining an inference result for the target data from each of the plurality of inference models, each of the plurality of inference models being derived from local learning data obtained in a different environment, each of the plurality of inference models being configured to perform the predetermined inference using the target data;
combining the inference result from each of the plurality of inference models under a combining rule to generate an inference result for the target data in the target environment,
the combining rule comprising a plurality of combining parameters, each of the plurality of combining parameters defining a priority on an inference result from a corresponding inference model of the plurality of inference models in the target environment,
combining the inference result from each of the plurality of inference models under the combining rule comprising
determining a value of each of the plurality of combining parameters using the obtained environment data,
weighting the inference result from each of the plurality of inference models using the determined value of each of the plurality of combining parameters, and
combining the weighted inference result from each of the plurality of inference models; and
outputting information about the inference result generated from the combining.

16. A non-transitory computer-readable storage medium storing an inference program, which when read and executed, causes computer to perform operations comprising:
obtaining predetermined target data usable in predetermined inference;
obtaining environment data about a target environment in which the predetermined inference is to be performed;
providing the target data to a plurality of inference models and obtaining an inference result for the target data from each of the plurality of inference models, each of the plurality of inference models being derived from local learning data obtained in a different environment, each of the plurality of inference models being configured to perform the predetermined inference using the target data;
combining the inference result from each of the plurality of inference models under a combining rule to generate an inference result for the target data in the target environment,
the combining rule comprising a plurality of combining parameters, each of the plurality of combining parameters defining a priority on an inference result from a corresponding inference model of the plurality of inference models in the target environment, combining the inference result from each of the plurality of inference models under the combining rule comprising determining a value of each of the plurality of combining parameters using the environment data, weighting the inference result from each of the plurality of inference models using the determined value of each of the plurality of combining parameters, and combining the weighted inference result from each of the plurality of inference models; and outputting information about the inference result generated from the combining.

17. The inference apparatus according to claim 2, wherein the processor is configured with the program to perform operations further comprising:

operation as a training unit configured to train, through machine learning, a computational model for calculating the value of each of the plurality of combining parameters using the environment data, the machine learning comprising training the computational model to calculate the value of each of the plurality of combining parameters to fit the predetermined inference in the target environment, wherein the combining rule further comprises a trained computational model built through the machine learning, and determining the value of each of the plurality of combining parameters using the environment data comprises providing the environment data to the trained computational model and causing the trained computational model to perform a computational operation to receive an output from the trained computational model as the value of each of the plurality of combining parameters.

18. The inference apparatus according to claim 2, wherein determining the value of each of the plurality of combining parameters using the environment data comprises obtaining learning-environment data about an environment in which the local learning data used to derive each of the plurality of inference models is obtained, calculating a degree of fitting between the obtained learning-environment data and the environment data, and determining the value of each of the plurality of combining parameters for the corresponding inference model of the plurality of inference models using the calculated degree of fitting.

19. The inference apparatus according to claim 2, wherein the processor is configured with the program to perform operations further comprising:

operation as a parameter setter configured to receive a specified value of at least one combining parameter of the plurality of combining parameters, and set a value of the at least one combining parameter to the specified value, wherein weighting the inference result from each of the plurality of inference models comprises s weighting an inference result from an inference model corresponding to the at least one combining parameter using the set value.

20. The inference apparatus according to claim 3, wherein the processor is configured with the program to perform operations further comprising:

operation as a parameter setter configured to receive a specified value of at least one combining parameter of the plurality of combining parameters, and set a value of the at least one combining parameter to the specified value, wherein weighting the inference result from each of the plurality of inference models comprises s weighting an inference result from an inference model corresponding to the at least one combining parameter using the set value.

* * * * *